(12) United States Patent
Yamamoto et al.

(10) Patent No.: US 6,184,597 B1
(45) Date of Patent: Feb. 6, 2001

(54) LINEAR MOTOR AND LINEAR COMPRESSOR

(75) Inventors: Hideo Yamamoto, Osaka; Koyo Shibuya, Nara; Koji Hamaoka, Osaka, all of (JP)

(73) Assignee: Matsushita Refrigeration Company, Osaka (JP)

( * ) Notice: Under 35 U.S.C. 154(b), the term of this patent shall be extended for 0 days.

(21) Appl. No.: 09/245,408

(22) Filed: Feb. 5, 1999

(30) Foreign Application Priority Data

Apr. 28, 1998 (JP) .................................................. 10-118358
Oct. 8, 1998 (JP) .................................................. 10-286228
Oct. 8, 1998 (JP) .................................................. 10-286260

(51) Int. Cl.$^7$ ........................... H02H 41/00; H02H 33/12
(52) U.S. Cl. ............................................... 310/14; 310/23
(58) Field of Search ................................ 310/12, 13, 14, 310/23, 30, 34; 335/279, 281, 282

(56) References Cited

U.S. PATENT DOCUMENTS 4,602,174 * 7/1986 Redlich .................................. 310/15
4,831,290 * 5/1989 Clauss et al. ........................... 310/12

FOREIGN PATENT DOCUMENTS

| 3-253778 | 11/1991 | (JP) . |
| 6-91727 | 11/1994 | (JP) . |
| 62-126280 | 6/1997 | (JP) . |
| 9-152215 | 6/1997 | (JP) . |

OTHER PUBLICATIONS

"Linear Compressors—A Maturing Technology" by Walt et al; May 1994; pp., 1–6.

\* cited by examiner

*Primary Examiner*—Thomas M. Dougherty
*Assistant Examiner*—Judson H. Jones
(74) *Attorney, Agent, or Firm*—Israel Gopstein

(57) ABSTRACT

A linear motor comprising prismatic inner yokes each constructed in a manner that a large number of sheets each having a generally rectangular configuration and having a high magnetic permeability are piled up each other and outer yokes each constructed in a manner that a number of sheets each having a generally rectangular configuration and having a high magnetic permeability are piled up each other. Each of coils is wound around a central portion of three magnetic pole portions of the outer yoke to alternately establish different magnetic poles along a direction of an axis of the linear motor. A surface of the outer yoke, holding the magnetic pole portions, is disposed in an opposed relation to the inner yoke to define a predetermined gap therebetween so that the inner yoke and the outer yoke form each of a plurality of yoke blocks. The yoke blocks are placed around the axis so that the sheet piling-up direction is perpendicular to a diametrical direction of a shaft. In addition, a moving element having a pair of permanent magnets magnetized radially so that their magnetizing directions are opposite to each other is movably located between the inner yoke and the outer yoke at a predetermined interval along the axis. This construction improves the motor efficiency and facilitates the manufacturing of the motor.

33 Claims, 38 Drawing Sheets

AXIAL DIRECTION

DIRECTIONS OF FACING OF INNER YOKE AND OUTER YOKE

LINEAR MOTOR AND LINEAR COMPRESSOR

BACKGROUND OF THE INVENTION

1. Field of the Invention

The present invention relates to a movable magnet type linear motor and further to a linear compressor.

2. Description of the Related Art

In recent years, linear motors have been in active development. Heretofore, in Europe and America, a linear motor has been studied for use in a Stirling engine to be used in the outer space. In the late years, the American SUNPOWER Co., Ltd. has developed a linear compressor and a movable magnet linear motor for a compressor to be used under common environments (Nicholas R. van der Walt, Reuven Unger: Linear Compressors-amturing technology, International Appliance Technical Conference, pp1–6, 1994).

FIG. 37 is a schematic illustration of a conventional linear motor.

The linear motor, generally designated at numeral 300, is made up of a cylindrical inner yoke 301, an outer yoke 304 including two magnetic pole portions 302, 303, a coil 306 wound around a central axis 305 and a moving element 308 having a cylindrical permanent magnet 307.

In this configuration, on supply of an alternating current to the coil 306, different magnetic poles alternately take place axially in the magnetic pole portions 302, 303, and the magnetic attraction and repulsive action with the permanent magnet 307 of the moving element 308 generate a thrust proportional to the magnitude of the current in the coil 306 and the magnetic flux density in the permanent magnet 307, so that the moving element 308 reciprocates in synchronism with the frequency of the alternating current.

In the aforesaid conventional example, the inner yoke 301 and the outer yoke 304 are constructed in a manner that a large number of sheets (thin plates) each having a high magnetic permeability are piled up each other. The eddy current loss of the motor shows a property proportional to the square of the plate thickness of the yoke material, and therefore, such a configuration as seen in the conventional example is capable of reducing the eddy current loss to improve the lowering of the motor efficiency due to the core (iron) loss, as compared with the case that the yoke is merely formed with a metallic block.

There is a problem which arises with the configuration of the conventional linear motor, however, in that, since the yoke has a cylindrical shape to make a dimensional difference between its inner circumferential section and its outer circumferential section, considerable difficulty is encountered in accurately piling up sheets having an even thickness toward its central axis at the fabrication. For this reason, the sheets have been made not to have an even thickness, but the outer circumferential section has been designed to have a slightly greater thickness to form it into a wedge-like shape. However, this contributes to an extremely high manufacturing cost.

Furthermore, FIG. 38 is a cross-sectional view showing a construction of a conventional linear compressor. In FIG. 38, a linear compressor, designated at numeral 400, is composed of a cylinder 401, a piston 402 inserted into the cylinder 401 to be allowed to reciprocate therein, a compression chamber 403 defined in a state of facing a head of the piston 402, and a suction (inlet) valve (not shown) and delivery (outlet) valve (not shown) openable and closable in response to a gas pressure in the compression chamber 403.

The linear compressor 400 is additionally equipped with a linear motor 406 for making the piston 402 reciprocate and a resonance spring 407 for supporting the piston 402 to allow the reciprocation of the piston 402. The linear motor 406 comprises a cylindrical inner yoke 408, an outer yoke 411 including two magnetic pole portions 409, 410, a coil 413 and a moving element 415 having a cylindrical permanent magnet 414, with the moving element 415 being in connection with the piston 402.

On supply of an alternating current to the coil 413, different magnetic poles alternately take place axially in the magnetic pole portions 409, 410, the magnetic attraction and repulsive action with the permanent magnet 414 of the moving element 415 develops a thrust proportional to the magnitude of the current in the coil 413 and the magnetic flux density of the permanent magnet 414, so that the moving element 415 reciprocates in synchronism with the frequency of the alternating current, and consequently, the piston 402 also reciprocates. Further, when the interior of the compression chamber 403 assumes a low pressure condition, an expanded gas is taken through the suction valve into the compression chamber 403, while, when assuming a high pressure condition, a compressed gas is discharged from the compression chamber 403 through the delivery valve, thus serving as a compressor.

The core (iron) loss such as an eddy current loss and a hysteresis loss hinders the improvement of a motor and a compressor. Since the eddy current loss is proportional to the square of the thickness of the yoke material, it is effective that a yoke is constructed by piling up sheets. However, as mentioned above, the conventional linear motor or the linear motor of the conventional linear compressor is composed of a yoke having a cylindrical configuration, and this cylindrically configured yoke encounters considerable difficulty in accurately piling up sheets toward its central axis at its fabrication.

SUMMARY OF THE INVENTION

The present invention has been developed with a view to eliminating these problems, and it is therefore an object of this invention to provide a linear motor which is capable of lessening the eddy current loss to improve the motor efficiency and of facilitating the manufacturing of the yoke at a lower cost.

Another object of this invention is to provide a linear compressor which is capable of improving the compressor efficiency and of facilitating its manufacturing.

For solving these problems, in accordance with this invention, there is provided a linear motor comprising a central axis, prismatic inner yokes each constructed in a manner that a number of sheets each having a generally rectangular configuration and having a high magnetic permeability are piled up each other, and outer yokes each constructed in a manner that a number of sheets each having a generally rectangular configuration and having a high magnetic permeability are likewise piled up each other, with each of coils being wound around a central portion of three magnetic pole portions of the outer yoke to alternately and axially establish different magnetic poles, wherein a surface of the outer yoke, which has the three magnetic pole portions, is disposed in an opposed relation to the corresponding inner yoke to define a predetermined gap therebetween so that the inner yoke and the outer yoke form each of a plurality of yoke blocks, and the plurality of yoke blocks are placed around the central axis to form a polygonal configuration so that the sheet piling-up direction is perpendicular (orthogonal) to a diametrical direction of a shaft including the central axis, and a moving element having a pair of flat-plate-like permanent magnets magnetized radially so that their magnetizing directions are opposite to each other and located between the inner yoke and the outer yoke in a state of being arranged at a predetermined interval along a direction of the central axis is placed to be movable along a direction of the central axis.

This permits the reduction of the core loss leading to the improvement of the motor efficiency and facilitation of the fabrication of the linear motor.

Furthermore, in accordance with this invention, there is provided a linear motor comprising: prismatic inner yokes each formed by piling up a number of sheets each having a generally rectangular configuration and having a high magnetic permeability; outer yokes each formed by piling up a number of sheets 4 each having a generally rectangular configuration and having a high magnetic permeability, each of the outer yokes having first and second slots formed by cutting in a piling-up direction of the sheets to establish first magnetic pole portion, a second magnetic pole portion and a third magnetic pole portion, with a surface of the outer yoke, holding the magnetic pole portions, being placed in an opposed relation to the inner yoke to define a predetermined gap therebetween to constitute each of a set of yoke blocks so that a magnetic path is established along surfaces of the sheets; coils each wound around the second magnetic pole portion for alternately establishing different magnetic poles in the first magnetic pole portion, the second magnetic pole portion and the third magnetic pole portion; a flat-plate-like base for holding the set of yoke blocks in a state where their inner yoke sides are placed in an opposed relation to each other to define a predetermined space; a bearing fitted to the base to be positioned between the inner yokes; a moving element including pairs of first and second flat-plate-like permanent magnets magnetized in directions of opposing of the inner yokes and the outer yokes and each placed within the gap in a state of being arranged at a predetermined interval along an axial direction of the bearing so that their magnetizing directions are opposite to each other, where, when the moving element shifts along the axial direction, the first flat-plate-like permanent magnet always crosses the first magnetic pole portion and the second magnetic pole portion while the second flat-plate-like permanent magnet always crosses the second magnetic pole and the third magnetic pole portion; and a shaft fitted integrally to the moving element and inserted into the bearing.

Likewise, with this construction, the core loss in the inner yokes and the outer yokes is reducible to improve the motor efficiency, and further, the fabrication of the linear motor becomes easy.

Still further, in accordance with this invention, there is provided a linear motor comprising: prismatic inner yokes each formed by piling up a number of sheets each having a generally rectangular configuration and having a high magnetic permeability; outer yokes each formed by piling up a number of sheets 4 each having a generally rectangular configuration and having a high magnetic permeability, each of the outer yokes including a plurality of slots formed by cutting the outer yoke in a sheets piling-up direction to establish a plurality of magnetic pole portions; coils respectively wound around all the magnetic pole portions other than the magnetic pole portions positioned at both ends of the outer yoke and made to alternately establish different magnetic poles in the adjacent magnetic pole portions; a set of yoke blocks each composed of the inner yoke, the outer yoke and the coils and each made such that a surface of the outer yoke, holding the magnetic pole portions, is placed at a predetermined gap in an opposed relation to the inner yoke to allow formation of a magnetic path along surfaces of the sheets; a flat-plate-like base for holding the set of yoke blocks in a state where their inner yoke sides are located in an opposed relation to each other to define a predetermined space; a bearing fitted to the base to be between the inner yokes of the set of yoke blocks; a moving element in which each of sets of flat-plate-like permanent magnets equal in number to the slots and magnetized in directions of facing of the inner yoke and the outer yoke are placed within a gap between the inner yoke and the outer yoke in a state of being arranged at a predetermined interval along an axial direction of the bearing so that their magnetizing directions are opposite to each other, where, when the moving element shifts along the axial direction, each of the flat-plate-like permanent magnets always crosses the adjacent magnetic pole portions of the outer yoke at the same time; and a shaft fitted integrally to the moving element and inserted into the bearing.

With this construction, a great thrust is obtainable, thus enhancing the motor efficiency.

In addition, in accordance with this invention, there is provided a linear motor according to this embodiment comprising: prismatic inner yokes each formed by piling up a number of sheets each having a generally rectangular configuration and having a high magnetic permeability; outer yokes each formed by piling up a number of sheets each having a generally rectangular configuration and having a high magnetic permeability, where a plurality of slots are formed by cutting the outer yoke in sheets piling-up direction to establish a plurality of magnetic pole portions; coils respectively wound around all the even-number magnetic pole portions of the plurality of magnetic pole portions and made to alternately establish different magnetic poles in the adjacent magnetic pole portions; a set of yoke blocks each including the inner yoke, the outer yoke and the coils and each made such that a surface of the outer yoke, holding the plurality of magnetic pole portions, is placed at a predetermined gap in an opposed relation to the inner yoke to allow formation of a magnetic path along surfaces of the sheets; a flat-plate-like base for holding the set of yoke blocks in a state where their inner yoke sides are located in an opposed relation to each other to define a predetermined space; a bearing fitted to the base to be between the inner yokes of the set of yoke blocks; a moving element in which each of sets of flat-plate-like permanent magnets equal in number to the slots and magnetized in directions of facing of the inner yoke and the outer yoke are placed within a gap between the inner yoke and the outer yoke in a state of being arranged at a predetermined interval along an axial direction of the bearing so that their magnetizing directions are opposite to each other, where, when the moving element shifts along the axial direction, each of the flat-plate-like permanent magnets always crosses the adjacent magnetic pole portions of the outer yoke at the same time; and a shaft fitted integrally to the moving element and inserted into the bearing.

Likewise, with this construction, a great thrust is obtainable, thus enhancing the motor efficiency.

Moreover, in accordance with this invention, there is provided a linear compressor comprising: prismatic inner yokes each formed by piling up a large number of sheets each having a high magnetic permeability; outer yokes formed by piling up a large number of sheets each having a high magnetic permeability, where two slots are made in sheets piling-up directions to establish three magnetic pole portions therein; coils each wound around the central magnetic pole portion of said three magnetic pole portions of said outer yoke for alternately establishing different magnetic poles in said three magnetic pole portions; a set of yoke blocks each including said inner yoke and said outer yoke and made such that a surface of said outer yoke, carrying said magnetic pole portions, is placed in an opposed relation to said inner yoke to define a predetermined gap therebetween; a flat-plate-like base for holding the yoke blocks so that their inner yoke sides are in an opposed relation to each other to produce a predetermined space therebetween; a cylinder attached to said base to be positioned between said inner yokes; a moving element including pairs of flat-plate-like permanent magnets magnetized in opposing directions of said inner yokes and said outer yokes and located within said gaps between said inner yokes and said outer yokes in a state of being disposed to define a predetermined interval therebetween so that their magnetization directions are opposite to each other; a piston placed on a tip portion of a shaft constructed integrally with said moving element and inserted into said cylinder; and a spring connected to said shaft.

This construction can improve the efficiency of the linear compressor and facilitate the fabrication thereof.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
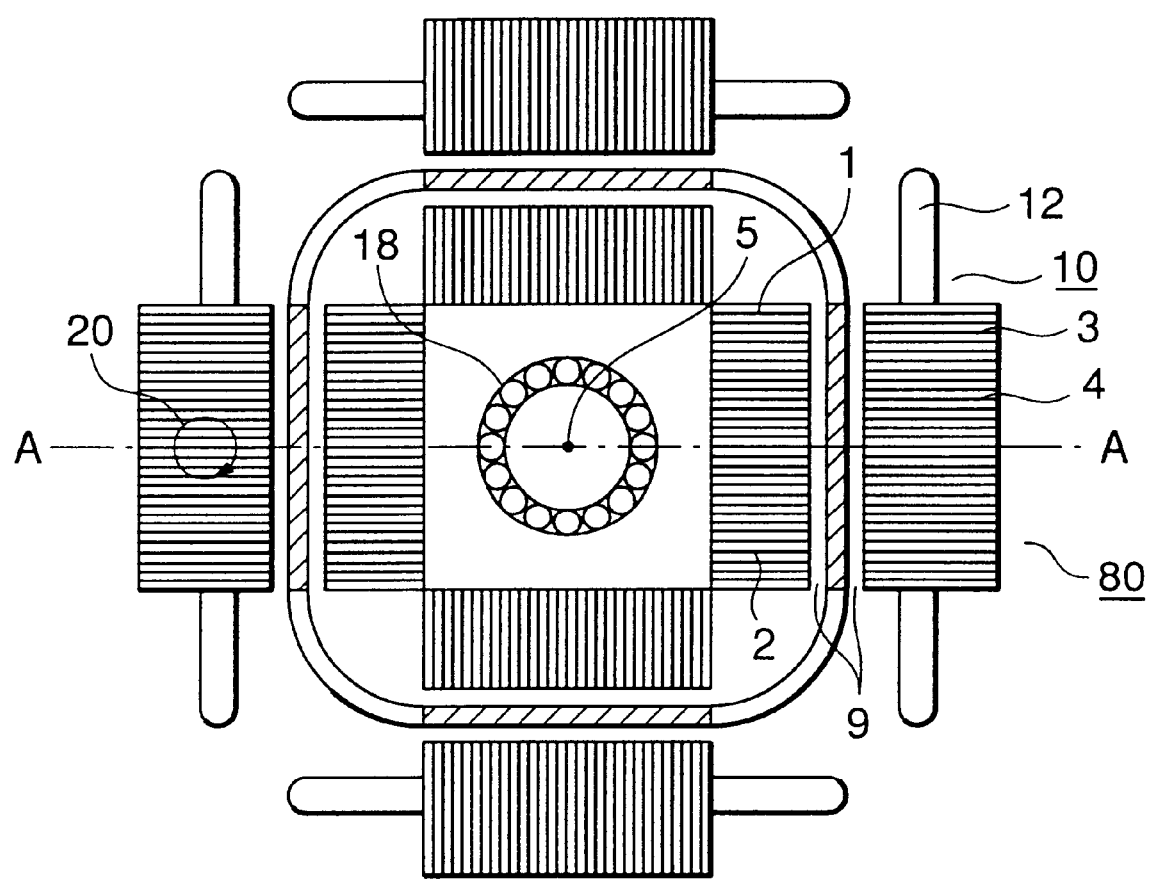
FIG. 1 is a cross-sectional view showing a linear motor according to a first embodiment of the present invention.

Embodiments of the present invention will be described hereinbelow with reference to the drawings. In the description of the embodiments, the corresponding or same parts will be marked with the same reference numerals.

First Embodiment

Figure 2:
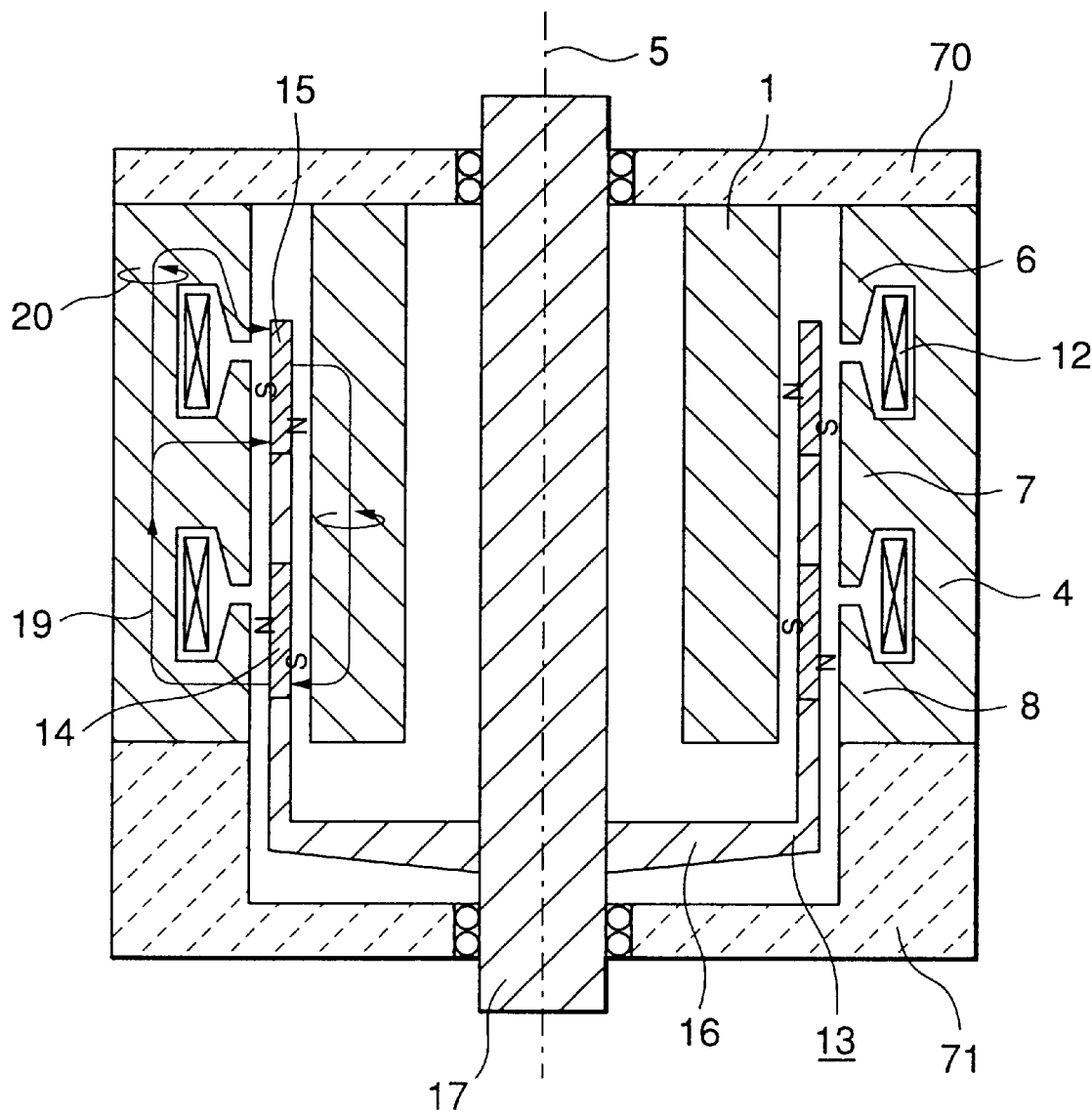
FIG. 2 is a cross-sectional view taken along a line A—A in FIG. 1.

FIG. 1 is a cross-sectional view showing a linear motor according to a first embodiment of the present invention, and FIG. 2 is a cross-sectional view taken along a line A—A in FIG. 1.

In the illustrations, each of inner yokes, designated at numeral 1, is formed in a manner that a large number of sheets 2 each having a generally rectangular configuration and having a high magnetic permeability are piled up in a direction perpendicular to a specified diametrical direction (a direction along a line A—A direction in FIG. 1 or a direction perpendicular to the line A—A direction) of a shaft 17 including a central axis 5 to form a prismatic configuration. Further, each of outer yokes, denoted at numeral 3, is made in a manner that a large number of sheets 4 each having a generally rectangular configuration and having a high magnetic permeability are piled up in a direction perpendicular to the specified diametrical direction (the direction along a line A—A direction in FIG. 1 or direction perpendicular to the line A—A direction) of the shaft 17 to form a prismatic configuration and such that there are three magnetic pole portions 6, 7 and 8 arranged along an axial direction. The surface of the outer yoke 3, which holds the magnetic pole portions 6, 7 and 8, is positioned outside the inner yoke 1 in an opposed relation to the inner yoke 1 to define a predetermined gap 9 therebetween, thereby constituting each of a plurality of yoke blocks 10. Further, the plurality of yoke blocks 10 are disposed around the central axis 5 such that the piling-up directions of the sheets 2, 4 become perpendicular to the specified diametrical direction of the shaft 17, thus forming the whole yoke 80 into a generally regular polygonal configuration.

In addition, each of coils 12 is wound around the central magnetic pole portion 7 of the three magnetic pole portions 6, 7 and 8 to alternately establish different magnetic poles in the three magnetic pole portions 6, 7 and 8. The coils 12 are wound in the yoke blocks 10, respectively, and are connected in parallel.

In this instance, the sheets 2, 4 organizing the inner yokes 1 and the outer yokes 3, respectively, are made from a non-oriented magnetic steel sheets and strip (such as 35H440 manufactured by Shin Nippon Seitetsu), and they show a high saturation magnetic flux density in the magnetic flux flowing along their surfaces and have a property that the core loss is low, with their surfaces being covered with an insulating coating.

A moving element (moving section), indicated by numeral 13, is composed of a pair of flat-plate-like permanent magnets 14, 15, a permanent magnet support 16 and a shaft 17. Preferably, the permanent magnets 14, 15 are made from an Nd—Fe—B based rare earth magnet. These permanent magnets 14, 15 are fixed with the permanent magnet support 16 to be arranged axially (in a direction along the central axis 5) to define a predetermined interval therebetween, so that their magnetization directions are opposite to each other, with they being located within gaps 9 between the inner yokes 1 and the outer yokes 3.

The permanent magnet support 16 and the shaft 17 are made of a non-magnetic material such as aluminum and stainless steel. A bearing 18, which makes a smooth reciprocating motion of the shaft 17, can employ any construction, for example, can take various conventional constructions including a linear ball bearing and an oil-retaining metal bearing. Flange sections 70, 71, supporting the bearing 18, is made of a non-magnetic material.

In the linear motor thus constructed, a magnetic flux 19 generated from the permanent magnet 15 passes through the gap 9, the inner yoke 1, the gap 9, the permanent magnet 14, the outer yoke 3 and the gap 9 to return to the permanent magnet 15, and produces a static magnetic field in the gap 9. In the inner yoke 1 and the outer yoke 3, it circulates within the planes of sheets 2, 4.

Furthermore, on supply of an alternating current into the coil 12, different magnetic poles alternately appear axially in the magnetic pole portions 6, 7 and 8, and the magnetic attraction and repulsive action with the permanent magnets 14, 15 of the moving element 13 generate a thrust proportional to the magnitude of the current in the coil 12 and the magnetic flux density in the permanent magnets 14, 15, so that the moving element 13, together with the shaft 17, reciprocates in synchronism with the frequency of the alternating current.

In this case, since the magnetic flux 19 from the permanent magnets 14, 15 circulates within the planes of the sheets 2, 4 in the inner yoke 1 and the outer yoke 3, the iron loss reduces. In addition, when the magnetic flux 19 circulates within the planes of the sheets 2, 4, an eddy current 20 possibly takes place in a direction perpendicular to the magnetic flux 19. This is a current proportional to the magnetic flux density. However, owing to the fact that each of the inner yoke 1 and the outer yoke 3 is formed into a prismatic configuration in a manner that a large number of sheets 2 or 4 each having a high magnetic permeability and having an insulated surface are piled up in a direction normal to the diametrical direction of the shaft 17, as compared with the wedge-like sheets, little eddy current can take place to considerably reduce the iron loss, which contributes to the improvement of the motor efficiency.

Besides, because each of the inner yoke 1 and the outer yoke 3 is formed into a prismatic configuration in a manner of simply piling up the large number of sheets 2 or 4, the manufacturing of the yokes in the linear motor becomes extremely easy.

Additionally, an Nd—Fe—B based rare earth magnet encounters difficulty in machining, and the cylindrical configuration leads to a high cost because its machining difficulty. In this embodiment, owing to the employment of the flat-plate-like permanent magnets 14, 15 being simple to process, the fabrication of the magnets becomes simplified, which contributes to a reduction of the cost of the magnets, thus leading to the motor cost reduction.

Although in the above description the yoke blocks 10 are 4 in number, as long as using a plurality of, that is, 2 or more yoke blocks, there is no limitation in number of the yoke blocks.

Furthermore, although in the above description the sheets 2, 4 have a generally rectangular configuration, there is no need to exactly form them into a rectangular shape, various modifications such as a parallelogram and an ellipse are also acceptable.

Still further, although the above description has been made on the example that the magnetic poles are 3 in number, it is also appropriate to assume a configuration in which yokes, magnets and coils are further connected axially in series to each other.

Second Embodiment

Figure 3:
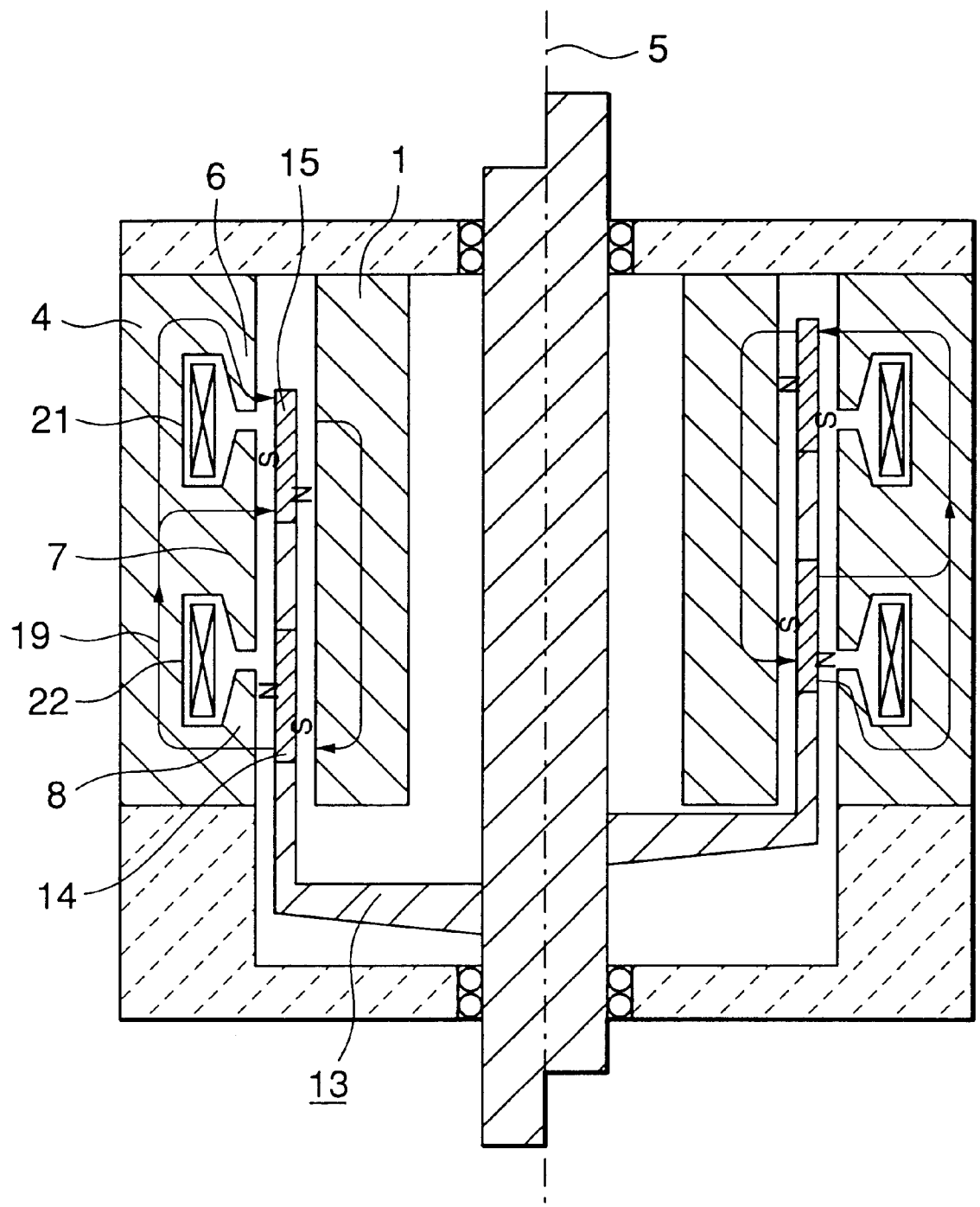
FIG. 3 is a cross-sectional view showing a linear motor according to a second embodiment of this invention.

FIG. 3 is a cross-sectional view showing a linear motor according to a second embodiment of this invention. The configuration of this linear motor is similar to that described above with reference to FIGS. 1 and 2.

In FIG. 3, the left side from a central axis 5 shows that a moving element 13 reaches a lower (bottom) dead center, while the right side therefrom indicates that the moving element 13 arrives at an upper (top) dead center. Each of a pair of flat-plate-like permanent magnets 14, 15 is disposed to always simultaneously cross two magnetic pole portions of an outer yoke 3 while the moving element 13 is in the middle of movement from the lower dead center to the upper dead center. That is, the positional relationship between the permanent magnets 14, 15 and the magnetic pole portions 6, 7 and 8 of the outer yoke 3 in a direction of a central axis is set such that, at the lower dead center, the permanent magnet 15 crosses the magnetic pole portions 6, 7 of the outer yoke 3 at the same time while the permanent magnet 14 crosses the magnetic pole portions 7, 8 thereof at the same time, and at the upper dead center, the permanent magnet 15 crosses both the magnetic pole portions 6, 7 at a time while the permanent magnet 14 crosses both the magnetic pole portions 7, 8 thereof at a time.

In the linear motor thus arranged, at the lower dead center, a magnetic flux 19 generated from an N pole of the permanent magnet 14 first passes through the magnetic pole portion 8 of the outer yoke 3 and then passes through the magnetic pole portion 7 thereof to surround a slot 22 of a coil 12 and thereafter reaches an S pole of the permanent magnet 15. In addition, it initially passes through the magnetic pole portion 8 and subsequently passes through the magnetic pole portion 6 to surround a slot 21 of the coil 12 and finally arrives at the S pole of the permanent magnet 15. Further, it returns through an N pole of the permanent magnet 15 and an inner yoke 1 to an S pole of the permanent magnet 14. Thus, since each of the pair of flat-plate-like permanent magnets 15, 14 is disposed to always simultaneously cross two magnetic pole portions of the outer yoke 3 while the moving element 13 is in the middle of movement from the lower dead center to the upper dead center, the magnetic flux due to the permanent magnets 15, 14 effectively work on the slots 22, 21 of the coil 12 and a magnetic force effectively occurs due to a combination of the permanent magnets 15, 14 and the coil 12, thereby providing a great thrust.

As described above, a feature of the linear motor according to this embodiment is that each of a pair of flat-plate-like permanent magnets is disposed to always cross two magnetic pole portions of an outer yoke at the same time while a moving element is in movement. This effectively produces a magnetic force by means of the permanent magnets and the coil to offer a great thrust.

Third Embodiment

Figure 4:
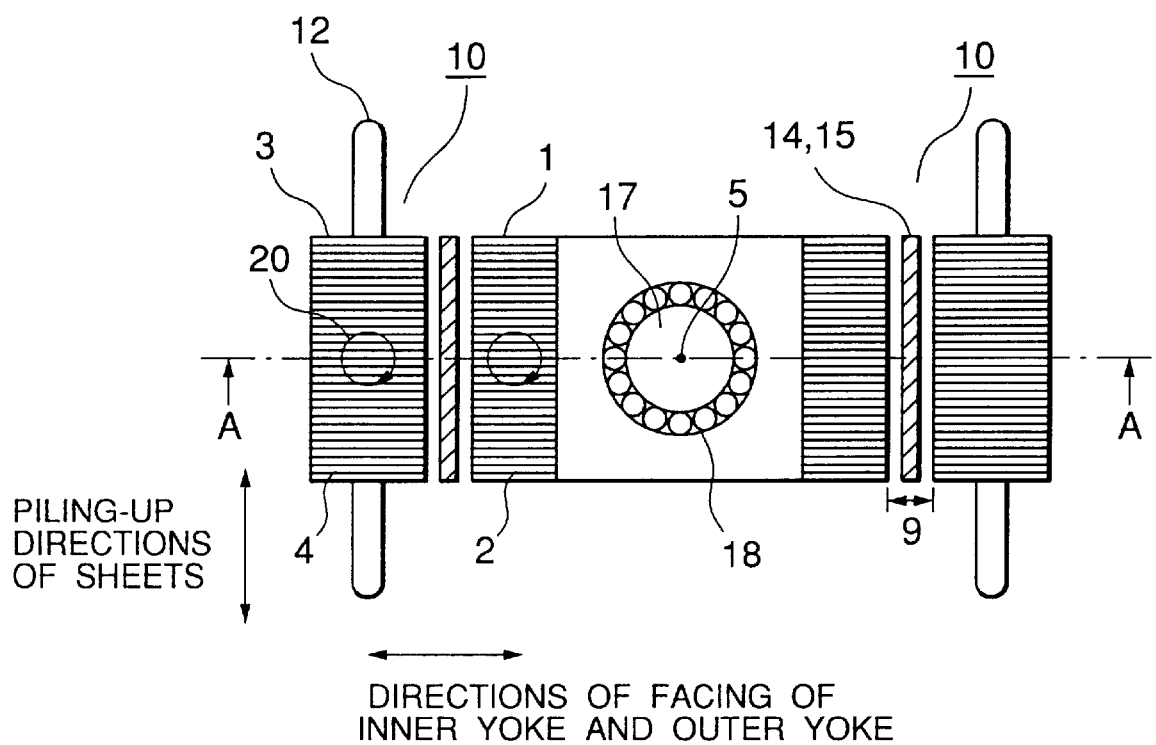
FIG. 4 is a cross-sectional view showing a linear motor according to a third embodiment of this invention.
Figure 5:
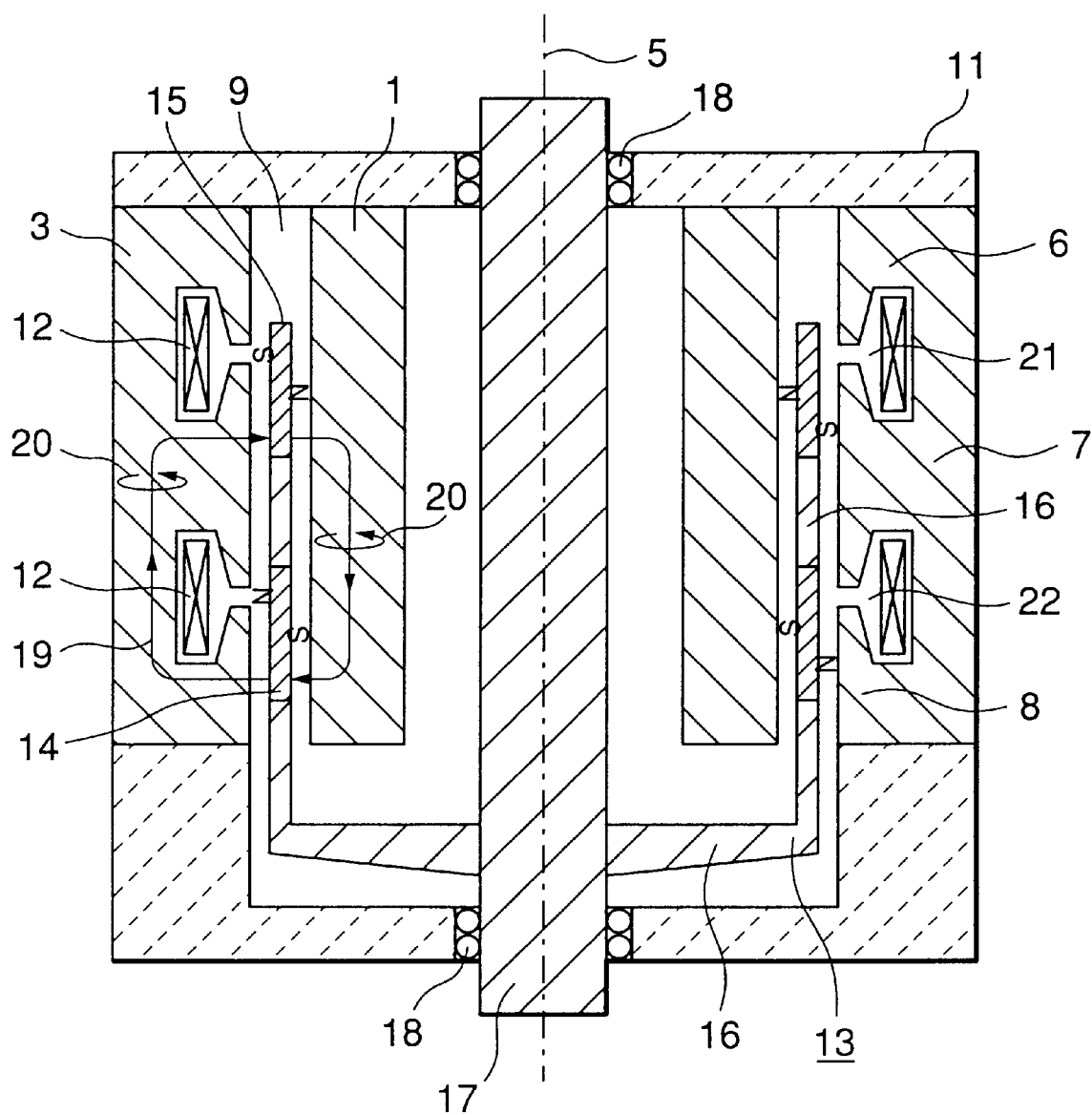
FIG. 5 is a cross-sectional view taken along a line A—A in FIG. 4.

FIG. 4 is a cross-sectional view showing a linear motor according to a third embodiment of this invention, and FIG. 5 is a cross-sectional view taken along a line A—A in FIG. 4.

In the illustrations, each of inner yokes 1 is formed into a prismatic configuration in a manner that piled up are a large number of sheets 2 each having a generally rectangular shape and having a high magnetic permeability. Further, each of outer yokes 3 is formed into a prismatic configuration in a manner that piled up are a large number of sheets 4 each having a generally rectangular shape and having a high magnetic permeability, wherein slots 21, 22 are cut along a direction of an axis 5 to produce three magnetic pole portions 6, 7 and 8. A surface of the outer yoke 3, which holds the magnetic pole portions 6, 7 and 8, is disposed in an opposed relation to the corresponding inner yoke 1 to define a predetermined gap 9 therebetween, thus constructing each of a set of yoke blocks 10. Besides, the set of yoke blocks 10 are held on a flat-plate-like base 11 in a state where their inner yoke sides are in an opposed relation to each other to define a predetermined interval therebetween.

In addition, each of coils 12 is wound around the central magnetic pole portion 7 of the three magnetic pole portions 6, 7 and 8 of the outer yoke 3 so that different magnetic poles alternately take place in the three magnetic pole portions 6, 7 and 8, with the coils 12 being individually wound in the two outer yokes 3 and connected in parallel.

In this instance, the sheets 2, 4 organizing the inner yokes 1 and the outer yokes 3, respectively, are made from a non-oriented magnetic steel sheets and strip (such as 35H440 manufactured by Shin Nippon Seitetsu), and they have a high saturation magnetic flux density on the magnetic flux flowing along their surfaces and have a property that the iron loss is low, with their surfaces being covered with an insulating coating.

A moving element, indicated by numeral 13, is composed of pairs of flat-plate-like permanent magnets 14, 15 each pair of which are magnetized in opposite directions that each of the inner yokes 1 and each of the outer yokes 3 face (directions along the line A—A), a permanent magnet support 16 and a shaft 17. Preferably, the permanent magnets 14, 15 are made from an Nd—Fe—B based rare earth magnet. These permanent magnets 14, 15 are fixed with the permanent magnet support 16 to be arranged axially (in a direction along the central axis 5) to define a predetermined interval therebetween, so that their magnetization directions are opposite to each other, with they being located within gaps 9 between the inner yokes 1 and the outer yokes 3.

A bearing 18, which makes a smooth reciprocating motion of the shaft 17, can employ any construction provided that it regulates the axis rotation, for example, can take various conventional constructions including a linear ball bearing and an oil-retaining metal bearing.

In the linear motor thus constructed, a magnetic flux 19 generated from the permanent magnet 15 passes through the gap 9, the inner yoke 1, the gap 9, the permanent magnet 14, the outer yoke 3 and the gap 9 to return to the permanent magnet 15, and produces a static magnetic field in the gap 9. In the inner yoke 1 and the outer yoke 3, it circulates within the planes of sheets 2, 4.

Furthermore, on supply of an alternating current into the coil 12, different magnetic poles alternately appear axially in the magnetic pole portions 6, 7 and 8, and the magnetic attraction and repulsive action with the permanent magnets 14, 15 of the moving element 13 generate a thrust proportional to the magnitude of the current in the coil 12 and the magnetic flux density in the permanent magnets 14, 15, so that the moving element 13, together with the shaft 17, reciprocates in synchronism with the frequency of the alternating current.

In this case, since the magnetic flux 19 from the permanent magnets 14, 15 circulates within the planes of the sheets 2, 4 in the inner yoke 1 and the outer yoke 3. In addition, when the magnetic flux 19 circulates within the planes of the sheets 2, 4, an eddy current 20 possibly takes place in a direction perpendicular to the magnetic flux 19. This is a current proportional to the square of the magnetic flux density and proportional to the thickness of the yoke material. Owing to the fact that each of the inner yoke 1 and the outer yoke 3 is formed into a prismatic configuration in a manner that a large number of sheets 2 or 4 each having a high magnetic permeability and having an insulated surface are piled up each other, little eddy current can take place, thereby considerably reduce the core loss, which accordingly contributes to the improvement of the motor efficiency.

Besides, because each of the inner yoke 1 and the outer yoke 3 is formed into a prismatic configuration in a manner of simply piling up the large number of sheets 2 or 4, the manufacturing of the yokes in the linear motor becomes extremely easy.

Additionally, an Nd—Fe—B based rare earth magnet encounters difficulty in machining, and the cylindrical configuration leads to a high cost because its machining difficulty. In this embodiment, owing to the employment of the flat-plate-like permanent magnets 14, 15 being simple to process, the fabrication of the magnets becomes simplified, which contributes to a reduction of the cost of the magnets, thus leading to the motor cost reduction.

Although in the above description the coils 12 are wound in the outer yokes 3, it is also possible to employ a construction in which the coils 12 are wound in the inner yokes 1.

In addition, although in the above description the magnetic pole portions of the outer yoke 3 is 3 in number, it is also appropriate that yokes, magnets and coils are further axially connected in series.

Thus, as described above, the linear motor according to this embodiment comprises the inner yokes 1 each formed into a prismatic configuration in a manner that piled up are a number of sheets 2 each having a generally rectangular configuration and having a high magnetic permeability, the outer yokes each formed by piling up a number of sheets 4 having a generally rectangular configuration and having a high magnetic permeability and having slots notched axially, the coils 12 each wound around a central magnetic pole portion of three magnetic pole portions 6, 7 and 8 of the outer yoke 3 to alternately establish different magnetic poles along a direction of the axis 5, a set of yoke blocks 10 each constructed in a manner that a surface of the outer yoke 3, having the magnetic pole portions 6, 7 and 8, is placed in an opposed relation to the inner yoke 1 to define a predetermined gap 9 therebetween, the flat-plate-like base 11 for holding the set of yoke blocks 10 in a state where their inner yoke 1 sides are disposed in an opposed relation to each other to define a predetermined interval therebetween, the bearing 18 fitted to the base 11 to be between the inner yokes 1, the moving element 13 in which pairs of flat-plate-like permanent magnets 14, 15 each pair of which are magnetized in directions of the facing of the inner yoke 1 and the outer yoke 3 are disposed axially at a predetermined interval so that their magnetization directions are opposite to each other and placed within the gap 9 between the inner yoke 1 and the outer yoke 3, and the shaft 17 constructed integrally with the moving element 13 and inserted into the bearing 18.

Accordingly, this can reduce the eddy current loss of the core loss to enhance the motor efficiency, and further, can facilitate the manufacturing of the motor to decrease the manufacturing cost.

Fourth Embodiment

Figure 6:
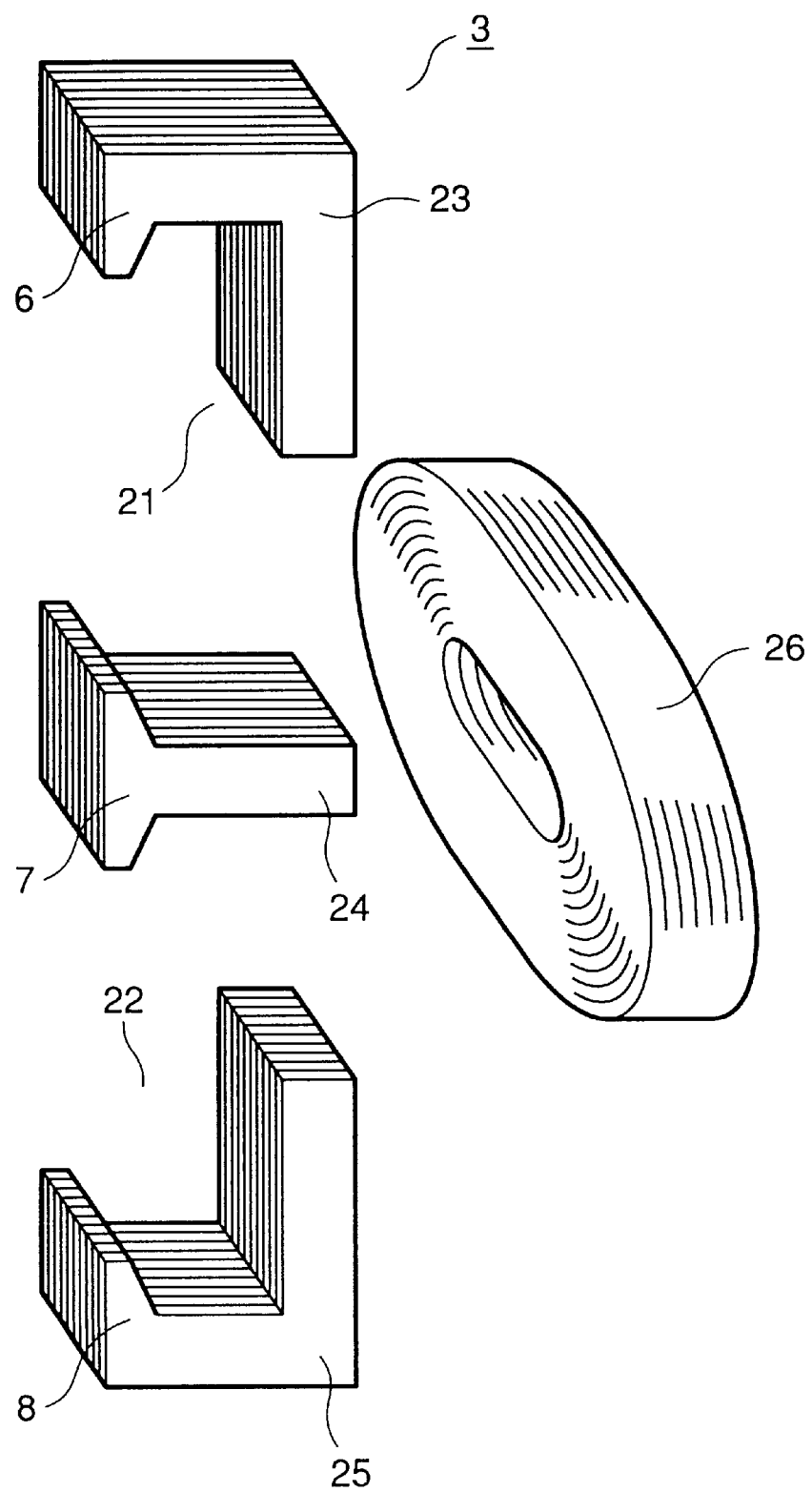
FIG. 6 is an exploded view showing an outer yoke of a linear motor according to a fourth embodiment of this invention.

FIG. 6 is an exploded view showing an outer yoke of a linear motor according to a fourth embodiment of this invention. The configuration of this linear motor is similar as a whole to that shown in FIGS. 4 and 5.

In FIG. 6, an outer yoke 3 is constructed by piling up a large number of sheets 4 each having a high magnetic permeability, and is composed of three divided blocks 23, 24 and 25 corresponding to three magnetic pole portions 6, 7 and 8. A coil 26, separately wound, is fitted over the central block 24, and subsequently, the three blocks 23, 24 and 25 are unified by means of welding, fitting, caulking or the like.

In the outer yoke 3 thus constructed, since the coil is separately made in a normal winding manner by a machine, the space factor improves, so that the size reduction of the outer yoke 3 becomes feasible under a constant number-of-turns condition, thereby leading to the size reduction of the linear motor.

Incidentally, although in the above description the yoke blocks 10 are 2 in number, the number of yoke blocks 10 is not limited to this as long as a plurality of yoke blocks 10 exist.

Furthermore, it is also possible that the inner yoke 1 and the outer yoke 3 have a cylindrical configuration.

As described above, in the linear motor according to this embodiment, the outer yoke 3 is made up of the three divided blocks 23, 24 and 25 corresponding to the three magnetic pole portions 6, 7 and 8, and after the coil 26 is fitted over the central magnetic pole portion 7, the three blocks 23, 24 and 25 are unified to each other.

Accordingly, the space factor of the coil 12 becomes higher and the size reduction of the linear motor is possible.

Fifth Embodiment

The construction of a linear motor according to a fifth embodiment of this invention is similar to that shown in FIGS. 4 and 5. For this reason, this embodiment will be described hereinbelow with reference to FIGS. 4 and 5.

In FIGS. 4 and 5, a base 11 for fixedly holding each of inner yokes 1 and each of outer yokes 3 is made of a non-magnetic material. Concretely, a material whose relative magnetic permeability is close to 1 is preferable, such as aluminum.

In the linear motor constructed as mentioned above, a magnetic flux 19 from a permanent magnet 15 goes through a gap 9, the inner yoke 1, the gap 9, a permanent magnet 14, the outer yoke 3 and the gap 9 to return to the same permanent magnet 15, and generates a static magnetic field in the gap 9. In the inner yoke 1 and the outer yoke 3, it circulates within the planes of their sheets 2, 4.

Although the inner yoke 1 and the outer yoke 3 are brought into contact with the base 11, since the base 11 is made of a non-magnetic material, the circulation of the magnetic flux flowing in the inner yoke 1 and the outer yoke 3 does not reach the base 11, so that the iron loss by an unnecessary eddy current does not occur in the base 11.

Incidentally, although in the above description yoke blocks 10 are 2 in number, the number of yoke blocks 10 is not limited to this as long as a plurality of yoke blocks exist.

Besides, it is also possible that the inner yoke 1 and the outer yoke 3 are formed to have a cylindrical configuration.

As described above, in the linear motor according to this embodiment, the base 11 for holding the yoke blocks 10 is made of a non-magnetic material, and therefore, the iron loss does not occur in the base 11, which improves the motor efficiency.

Sixth Embodiment

The construction of a linear motor according to a sixth embodiment of this invention is similar to that shown in FIGS. 4 and 5. For this reason, this embodiment will be described hereinbelow with reference to FIGS. 4 and 5.

In FIGS. 4 and 5, a base 11 for fixedly holding each of inner yokes 1 and each of outer yokes 3 is made of a nonmagnetic material having a high specific resistance (resistivity). Concretely, a material whose relative magnetic permeability is close to 1 and whose specific resistance is more than ten times that of aluminum is preferable, such as SUS and ceramics.

In the linear motor constructed as mentioned above, a magnetic flux from an permanent magnet 15 goes through a gap 9, the inner yoke 1, the gap 9, a permanent magnet 14, the outer yoke 3 and the gap 9 to return to the same permanent magnet 15, and generates a static magnetic field in the gap 9. In the inner yoke 1 and the outer yoke 3, it circulates within the planes of their sheets 2, 4.

Although the inner yoke 1 and the outer yoke 3 are brought into contact with the base 11, since the base 11 is made of a non-magnetic material having a high specific resistance, the circulation of the magnetic flux flowing in the inner yoke 1 and the outer yoke 3 does not reach the base 11, so that the iron loss by an unnecessary eddy current does not occur in the base 11.

In addition, since the base 11 has a high specific resistance, the eddy current generated in the inner yoke 1 and the outer yoke 3 hardly leaks into the base 11, and hence, the core loss by an unnecessary eddy current does not occur in the base 11.

Incidentally, although in the above description yoke blocks 10 are 2 in number, the number of yoke blocks 10 is not limited to this as long as a plurality of yoke blocks exist.

Besides, it is also possible that the inner yoke 1 and the outer yoke 3 are formed to have a cylindrical configuration.

As described above, in the linear motor according to this embodiment, the base 11 for holding the yoke blocks 10 is made of a non-magnetic material having a high specific resistance, and therefore, the core loss does not occur in the base 11, which enhances the motor efficiency.

Seventh Embodiment

Figure 7:
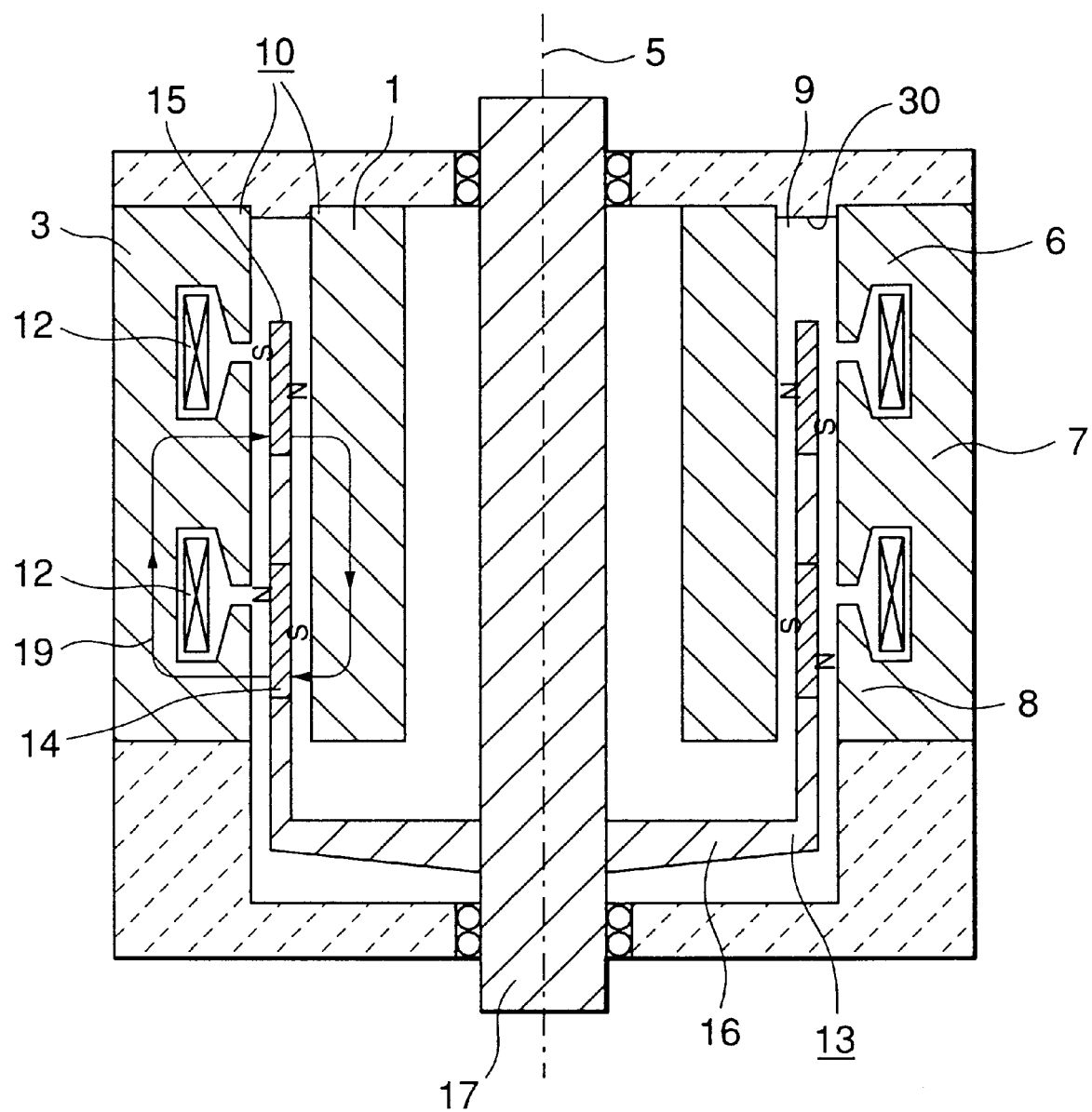
FIG. 7 is a cross-sectional view showing a linear motor according to a seventh embodiment of this invention.

FIG. 7 is a cross-sectional view showing a linear motor according to a seventh embodiment of this invention.

In the illustration, each of inner yokes 1 is formed into a prismatic configuration in a manner that piled up are a large number of sheets 2 each having a generally rectangular shape and having a high magnetic permeability. Further, each of outer yokes 3 is formed into a prismatic configuration in a manner that piled up are a large number of sheets 4 each having a generally rectangular shape and having a high magnetic permeability, wherein three magnetic pole portions 6, 7 and 8 are made along an axis 5. A surface of the outer yoke 3, which holds the magnetic pole portions 6, 7 and 8, is disposed in an opposed relation to the corresponding inner yoke 1 to define a predetermined gap 9 therebetween, thus constructing each of a set of yoke blocks 10. Besides, the set of yoke blocks 10 are held on a flat-plate-like base 11 in a state where their inner yoke sides are in an opposed relation to each other to define a predetermined interval therebetween.

On the base 11, formed are projecting portions 30 each having a width equal to the width of the gap 9 between the inner yoke 1 and the outer yoke 3. The inner yoke 1 and the outer yoke 3 are pressed against the base 11 to be fixed thereto in a state where the projecting portion 30 is put in the gap 9.

In addition, each of coils 12 is wound around the central magnetic pole portion 7 of the three magnetic pole portions 6, 7 and 8 of the outer yoke 3 so that different magnetic poles alternately take place in the three magnetic pole portions 6, 7 and 8, with the coils 12 being individually wound in the two outer yokes 3 and connected in parallel.

A moving element, indicated by numeral 13, is composed of pairs of flat-plate-like permanent magnets 14, each pair of which are magnetized in directions of the facing of each of the inner yokes 1 and each of the outer yokes 3, a permanent magnet support 16 and a shaft 17. Preferably, the permanent magnets 14, 15 are made from an Nd—Fe—B based rare earth magnet. These permanent magnets 14, 15 are fixed with the permanent magnet support 16 to be arranged axially to define a predetermined interval therebetween so that their magnetization directions are opposite to each other, with they being located within gaps 9 between the inner yokes 1 and the outer yokes 3.

In the linear motor constructed as mentioned above, a magnetic flux from an permanent magnet 15 goes through a gap 9, the inner yoke 1, the gap 9, a permanent magnet 14, the outer yoke 3 and the gap 9 to return to the same permanent magnet 15, and generates a static magnetic field in the gap 9. In the inner yoke 1 and the outer yoke 3, it circulates within the planes of their sheets 2, 4.

In this instance, since the projecting portions 30 each having a width equal to that of the gap 9 between the inner yoke 1 and the outer yoke 3 are formed on the base 11 and the inner yoke 1 and the outer yoke 3 are pressed against the base 11 to be fixed thereto in a state where the projecting portion 30 is aligned with the gap 9, the distance, i.e., the gap 9, between the inner yoke 1 and the outer yoke 3 is securable with a high accuracy. Further, since the variation of a magnetic circuit of the magnetic flux 19 resulting from the permanent magnets 14, 15 is reducible, the variation of the magnetic flux 19 is also reducible, which improves the stability of the thrust of the linear motor. In addition, the accuracy management for the width of the gap 9 between the inner yoke 1 and the outer yoke 3 becomes easy to facilitate the manufacturing of the linear motor.

As described above, in the linear motor according to this embodiment, the projecting portions 30 each having a width equal to that of the gap 9 between the inner yoke 1 and the outer yoke 3 are made on the base 11, and the inner yoke 1 and the outer yoke 3 are fixed to the base 11 in a state where the projecting portion 30 is fitted in the gap 9, and therefore, the width of the gap 9 between the inner yoke 1 and the outer yoke 3 is securable with a high accuracy to suppress the variation of the thrust of the linear motor, besides the fabrication of the linear motor is facilitated.

Eighth Embodiment

The construction of a linear motor according to an eighth embodiment of this invention is similar to that shown in FIGS. 4 and 5. For this reason, this embodiment will be described hereinbelow with reference to FIGS. 4 and 5.

In FIGS. 4 and 5, a moving element 13 is made up of pairs of flat-plate-like permanent magnets 14, 15 each pair being magnetized in directions of the facing of each of inner yokes 1 and each of outer yokes 3, a permanent magnet support 16 and a shaft 17. The permanent magnet support of the moving element 13 is made of a non-magnetic material. In detail, a material whose relative magnetic permeability approaches 1 is preferable, such as aluminum.

In the linear motor thus constructed, a magnetic flux 19 from the permanent magnet 15 goes through a gap 9, the inner yoke 1, the gap 9, a permanent magnet 14, the outer yoke 3 and the gap 9 to return to the same permanent magnet 15, and generates a static magnetic field in the gap 9. In the inner yoke 1 and the outer yoke 3, it circulates within the planes of their sheets 2, 4.

Though a portion of the magnetic flux 19 tries to additionally pass through the permanent magnet support 16, because the permanent magnet support 16 is made of a non-magnetic material, the magnetic flux 19 hardly passes through the permanent magnet support 16, so that the core loss by an unnecessary eddy current does not occur in the permanent magnet support 16.

As mentioned above, in the linear motor according to this embodiment, the moving section 13 is made of a non-magnetic material, and therefore, the reduction in the core loss in the moving section 13 is feasible, thus improving the motor efficiency.

Ninth Embodiment

The construction of a linear motor according to an ninth embodiment of this invention is similar to that shown in FIGS. 4 and 5. For this reason, this embodiment will be described hereinbelow with reference to FIGS. 4 and 5.

In FIGS. 4 and 5, a moving element 13 is made up of pairs of flat-plate-like permanent magnets 14, 15 each pair being magnetized in directions of the facing of each of inner yokes 1 and each of outer yokes 3, a permanent magnet support 16 and a shaft 17. Further, the permanent magnet support 16 of the moving element 13 is made of a non-magnetic material showing a high specific resistance. In detail, a material whose relative magnetic permeability approaches 1 and whose specific resistance is more than ten times that of aluminum. Since the moving element 13 is needed to be light in weight, a light-weight ceramics, a resin material having a high Young's modulus or the like are appropriate.

In the linear motor thus constructed, a magnetic flux 19 from the permanent magnet 15 goes through a gap 9, the inner yoke 1, the gap 9, a permanent magnet 14, the outer yoke 3 and the gap 9 to return to the same permanent magnet 15, and generates a static magnetic field in the gap 9. In the inner yoke 1 and the outer yoke 3, it circulates within the planes of their sheets 2, 4.

Though a portion of the magnetic flux 19 tries to additionally pass through the permanent magnet support 16, because the permanent magnet support 16 is made of a non-magnetic material, the magnetic flux 19 hardly passes through the permanent magnet support 16, so that the core loss by an unnecessary eddy current does not occur in the permanent magnet support 16.

Besides, since the permanent magnet support 16 shows a high specific resistance, even if a portion of the magnetic flux passes through the permanent magnet support 16, the core iron does not occur.

As mentioned above, in the linear motor according to this embodiment, the moving section 13 is made of a non-magnetic material having a high specific resistance, and therefore, the further reduction in the core loss in the moving section 13 is feasible, thus improving the motor efficiency.

Tenth Embodiment

Figure 8:
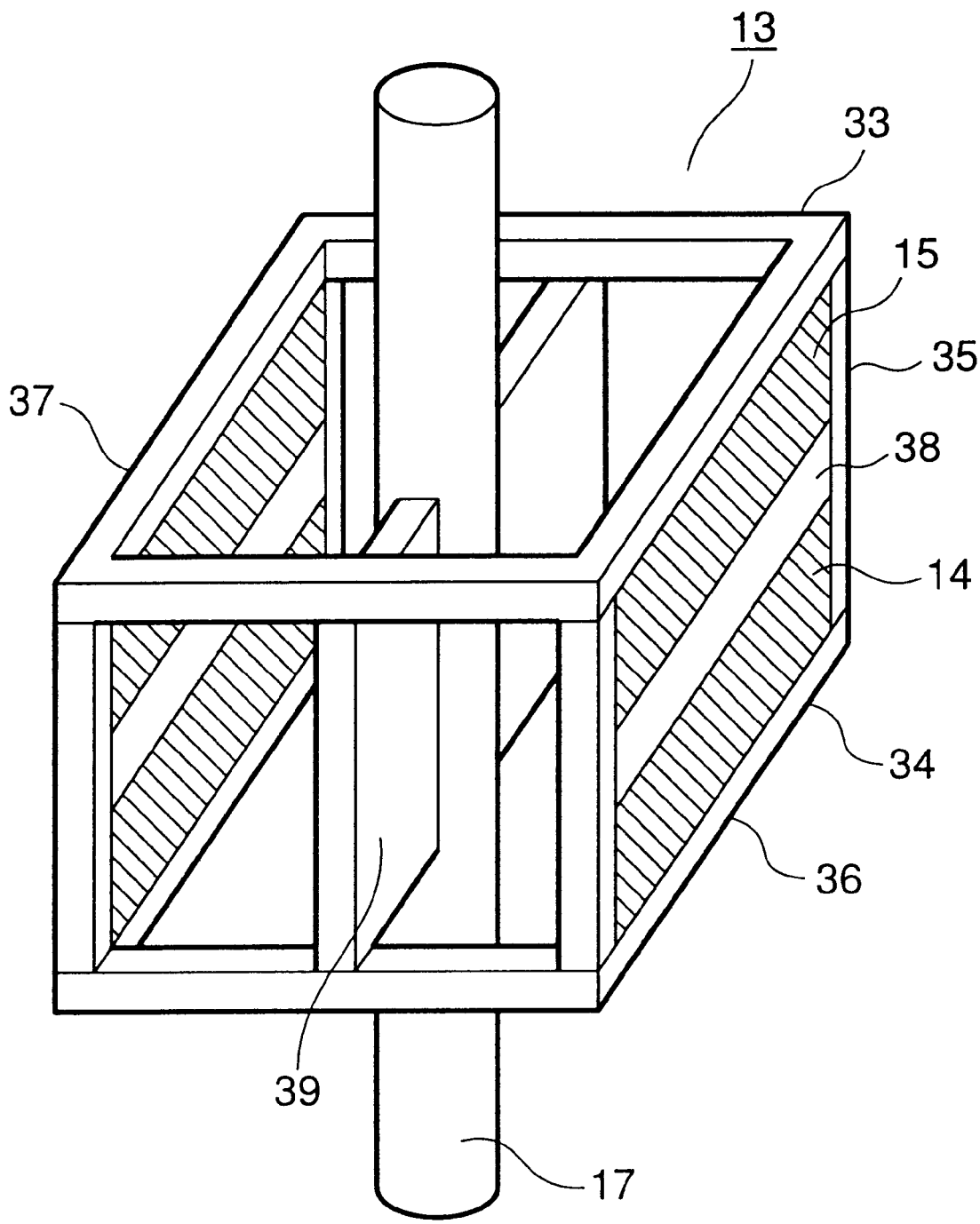
FIG. 8 is a perspective view showing a moving element of a linear motor according to a tenth embodiment of this invention.

FIG. 8 is a perspective view showing a moving section (moving element) of a linear motor according to a tenth embodiment of this invention. The whole construction of this linear motor is similar to that shown in FIGS. 4 and 5.

In FIG. 8, a moving section 13 is composed of a pair of rectangular or square moving section bases 33, 34, a plurality of supporting columns 35 for supporting the moving section bases 33, 34 to form a generally cubic configuration, pairs of permanent magnets 14, 15 each pair of which are put between the pair of moving section bases 33, 34 in two sides (surfaces) 36, 37 of the generally cubic configuration, which are in an opposed relation to each other, and disposed in a state where a spacer 38 is provided therebetween to establish a predetermined interval, and supporting sections 39 for making a connection of the moving section 13 and a shaft 17 in a space between both inner yokes 1.

The moving section 13 thus constructed has a structural strength and is light in weight, and further, allows the pair of flat-plate-like permanent magnets 14, 15 to be held at a predetermined axial interval within a gap 9 between the inner yoke and an outer yoke 3 with a high accuracy. In addition, since the supporting sections 39 for making connection between the moving section 13 and the shaft 17 are placed in the gap between the inner yokes 1, the moving section is reducible in size.

As described above, in the linear motor according to this embodiment, the moving section 13 comprises the pair of rectangular moving section bases 33, 34, the plurality of supporting columns 35 for supporting the moving section bases 33, 34 to form a generally cubic configuration, the pairs of permanent magnets 14, 15 each pair of which are put between the pair of moving section bases 33, 34 and disposed in a state where the spacer 38 is provided therebetween to establish a predetermined interval, and the supporting sections 39 for making a connection of the moving section 13 and the shaft 17 in the space between both the inner yokes 1, and therefore, the strength of the moving section 13 is securable, and the fabrication of the linear motor becomes easy.

Eleventh Embodiment

The construction of a moving section of a linear motor according to an eleventh embodiment of this invention is similar to that shown in FIG. 8, and the whole configuration of this linear motor is also similar to that shown in FIGS. 4 and 5.

In FIG. 8, a moving section 13 is composed of a pair of rectangular moving section bases 33, 34, a plurality of supporting columns 35 for supporting the moving section bases 33, 34 to form a generally cubic configuration, pairs of permanent magnets 14, 15 each pair of which are put between the pair of moving section bases 33, 34 in two sides 36, 27 of the generally cubic configuration, which are in an opposed relation to each other, and disposed in a state where a spacer 38 is provided therebetween to establish a predetermined interval, and supporting sections 39 for making a connection of the moving section 13 and a shaft 17 in a space between both inner yokes 1.

In this instance, the moving section bases 33, 34 and spacers 38, coming into contact with the permanent magnets 14, 15, are made of a non-magnetic material having a high specific resistance. In detail, a material whose relative magnetic permeability is close to 1 and whose specific resistance is above ten times that of aluminum. In addition, since the moving section 13 is required to be light in weight, a light-weight ceramic, a resin material with a high Young's modulus, or the like is appropriate.

Furthermore, the supporting sections 39 not coming into contact with the permanent magnets 14, 15 are preferable to be made of a material such as aluminum whose relative magnetic permeability is close to 1.

In the linear motor thus constructed, a magnetic flux 19 from the permanent magnet 15 passes through a gap 9, the inner yoke 1, the gap 9, the permanent magnet 14, an outer yoke 3 and the gap 9 to return to the same permanent magnet 15, and generates a static magnetic field in the gap 9. In the inner yoke 1 and the outer yoke 3, it circulates within the planes of their sheets 2, 4.

Although a portion of the magnetic flux 19 tries to pass through the moving section bases 33, 34, the spacers 38 and the supporting sections 39, since the moving section bases 33, 34, the spacers 38 and the supporting sections 39 are made of a non-magnetic material, the magnetic flux 19 hardly passes through the moving section bases 33, 34, the spacers 38 and the supporting sections 39, and consequently, the core loss by an unnecessary eddy current does not occur in the moving section bases 33, 34, the spacers 38 and the supporting sections 39.

In addition, since the moving section bases 33, 34 and spacers 38 placed into contact with the permanent magnets 14, 15 exhibit a high specific resistance, even if a portion of the magnetic flux 19 penetrates the moving section support 16, no core loss occurs.

As mentioned above, since the moving section bases 33, 34 and the spacers 38 of the linear motor according to this embodiment are made of a non-magnetic material showing a high specific resistance and the supporting sections 39 are made of a non-magnetic material, not only the strength of the moving section 13 is securable, but also the fabrication of the linear motor becomes facilitated, and even the core loss in the moving section 13 is further reducible to enhance the motor efficiency.

Twelfth Embodiment

Figure 9:
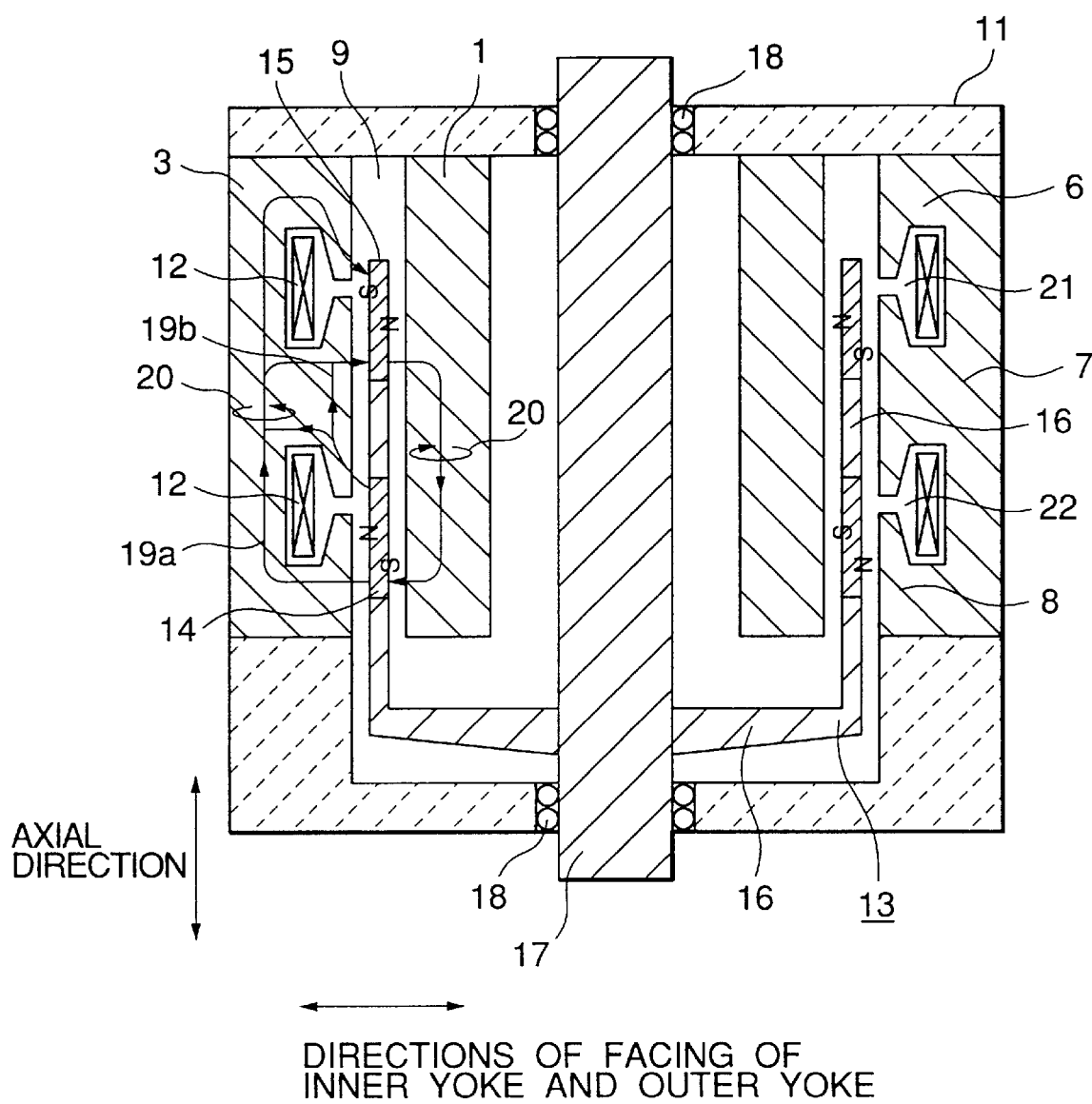
FIG. 9 is a vertical cross-sectional view showing a linear motor according to a twelfth embodiment of this invention.
Figure 10:
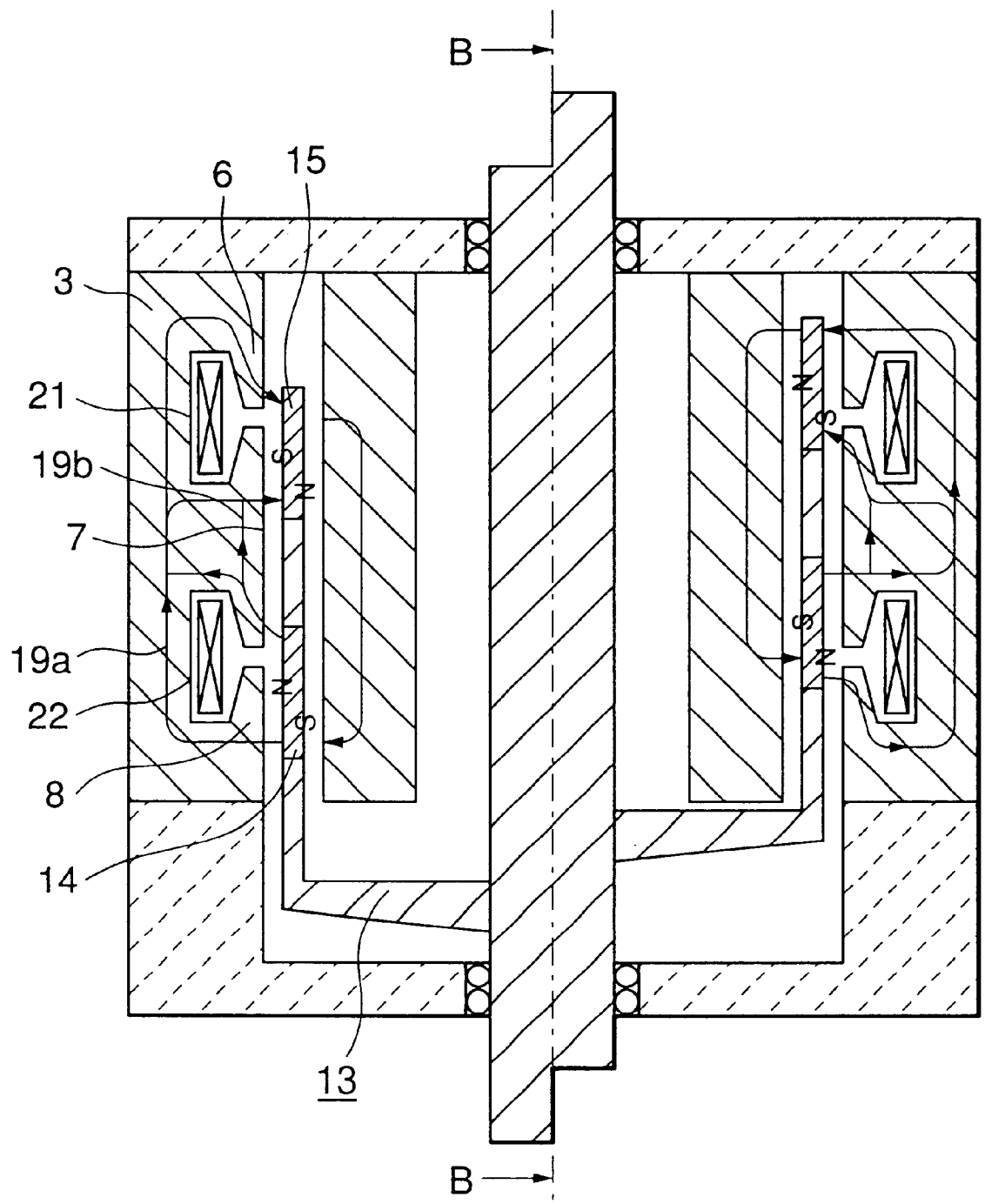
FIG. 10 is a structural illustration available for describing a positional relationship between permanent magnets and magnetic poles.

FIG. 9 is a vertical cross-sectional view showing a linear motor according to a twelfth embodiment of this invention, and FIG. 10 is a structural illustration available for describing a positional relationship between permanent magnets and magnetic poles. The horizontal cross-sectional illustration of the linear motor shown in FIG. 9 is the same as FIG. 4, and hence, FIG. 4 is also used for explaining this twelfth embodiment.

In FIGS. 4, 9 and 10, each of inner yokes 1 is formed into a prismatic configuration in a manner that piled up are a large number of sheets 2 each having a generally rectangular shape and having a high magnetic permeability. Further, each of outer yokes 3 is formed into a prismatic configuration in a manner that piled up are a large number of sheets 4 each having a generally rectangular shape and having a high magnetic permeability, wherein two slots 21, 22 are notched along a direction of the piling-up of the sheets 4 to produce a first magnetic pole portion 6, a second magnetic pole portion 7 and a third magnetic pole portion 8. A surface of the outer yoke 3, which holds the magnetic pole portions 6, 7 and 8, is disposed in an opposed relation to the corresponding inner yoke 1 to define a predetermined gap 9 therebetween so that a magnetic path 19a is established along the surfaces of the sheets 2, 4, thus constructing each of a set of yoke blocks 10. Besides, the set of yoke blocks 10 are held on a flat-plate-like base 11 in a state where their inner yoke sides are in an opposed relation to each other to define a predetermined space therebetween.

In addition, each of coils 12 is wound around the second magnetic pole portion 7 of the three magnetic pole portions 6, 7 and 8 of the outer yoke 3 so that different magnetic poles alternately take place in the three magnetic pole portions 6, 7 and 8, with the coils 12 being individually wound in the two outer yokes 3 and connected in parallel.

In this instance, the sheets 2, 4 organizing the inner yokes 1 and the outer yokes 3, respectively, are made from a non-oriented magnetic steel sheets and strip (such as 35H440 manufactured by Shin Nippon Seitetsu), and they have a high saturation magnetic flux density on the magnetic flux flowing along their surfaces and have a property that the core loss is low, with their surfaces being covered with an insulating coating.

A moving element (section), indicated by numeral 13, is composed of pairs of first and second flat-plate-like permanent magnets 15, 14 each pair of which are magnetized in opposite directions that each of the inner yokes 1 and each of the outer yokes 3 face (directions along the line A—A), a permanent magnet support 16 and a shaft 17. Preferably, the permanent magnets 14, 15 are made from an Nd—Fe—B based rare earth magnet. These permanent magnets 14, 15 are fixed with the permanent magnet support 16 to be arranged axially (in a direction along the central axis 5) to define a predetermined interval therebetween, so that their magnetization directions are opposite to each other, with they being located within gaps 9 between the inner yokes 1 and the outer yokes 3.

A bearing 18, which makes a smooth reciprocating motion of the shaft 17, can employ any construction as long as it regulates the axis rotation, for example, can take various conventional constructions including a linear ball bearing and an oil-retaining metal bearing.

In FIG. 10, the left side from a line B—B shows that a moving element 13 reaches a lower (bottom) dead center, while the right side therefrom indicates that the moving element 13 arrives at an upper (top) dead center. Each of the pairs of flat-plate-like permanent magnets 14, 15 are disposed so that, while the moving element 13 is in the middle of movement from the lower dead center to the upper dead center, the first flat-plate-like permanent magnet 15 always simultaneously cross the first magnetic pole portions 6 and the second magnetic pole portion 7 and the second flat-plate-like permanent magnet 14 always cross the second magnetic pole portion 7 and the third magnetic pole portion 8 at the same time.

In the linear motor thus constructed, a magnetic path 19a (indicated by a solid line) from the first and second flat-plate-like permanent magnets 15, 14 passes through the first flat-plate-like permanent magnet 15, the gap 9, the inner yoke 1, the gap 9, the second flat-plate-like permanent magnet 14, the gap 9, the outer yoke and the gap 9 and then returns to the first flat-plate-like permanent magnet 15 to surround the slot 21 or 22, and further generates a static magnetic field in the gap 9. In the inner yoke 1 and the outer yoke 3, it circulates in the planes of the sheets 2, 4.

Furthermore, on supply of an alternating current into the coil 12, different magnetic poles alternately appear axially in the first magnetic pole portion 6, the second magnetic pole portion 7 and the third magnetic pole portion 8, and the magnetic attraction and repulsive action with the first and second permanent magnets 15, 14 of the moving element 13 to generate a thrust proportional to the magnitude of the current in the coil 12 and the magnetic flux density of the magnetic flux generated from the permanent magnets 14, 15, so that the moving element 13, together with the shaft 17, reciprocates in synchronism with the frequency of the alternating current.

Besides, a magnetic path 19b (indicated by a dotted line) extends to go through the second flat-plate-like permanent magnet 14, the gap 9, the second magnetic pole portion 7, the gap 9 and the first flat-plate-like permanent magnet 15, and because of not surrounding the slop 21 or 22, this magnetic path is inoperative to an axial thrust.

Since, as shown in FIG. 10, at the lower dead center, the first flat-plate-like permanent magnet 15 crosses the first magnetic pole portion 6 while the second flat-plate-like permanent magnet 14 crosses the second magnetic pole portion 7, the magnetic flux generated from the N pole of the second flat-plate-like permanent magnet 14 passes through the third magnetic pole portion 8 and then passes through the first magnetic pole portion 6 to surround the slots 21, 22, thereafter returning to the S pole of the first flat-plate-like permanent magnet 15. In addition, it passes through the second magnetic pole portion 7 and then goes through the first magnetic pole portion 6 to surround the slop 21, thereafter returning to the S pole of the first flat-plate-like permanent magnet 15.

Furthermore, since, at the upper dead center, the first flat-plate-like permanent magnet 15 crosses the second magnetic pole portion 7 while the second flat-plate-like permanent magnet 14 crosses the third magnetic pole portion 8, the magnetic flux from the N pole of the second flat-plate-like permanent magnet 14 passes through the third magnetic pole portion 8 and then goes through the first magnetic pole portion 6 to surround the slots 21, 22, subsequently returning to the S pole of the first flat-plate-like permanent magnet 15. In addition, it passes through the third magnetic pole portion 8 and then goes through the second magnetic pole portion 7 to surround the slop 22, subsequently returning to the S pole of the first flat-plate-like permanent magnet 15.

Thus, since the pair of first and second flat-plate-like permanent magnets 15, 14 are disposed to always cross the two magnetic pole portions of the outer yoke at the same time while the moving element 13 is in the middle of movement from the lower dead center to the upper dead center, the magnetic flux due to the first and second flat-plate-like permanent magnets 15, 14 effectively works on the slots 21, 22 for the coil 12, and therefore, the magnetic force due to the first and second flat-plate-like permanent magnets 15, 14 and the alternating current flowing in the coil 12 is effectively producible, thereby providing a great thrust.

Still further, the magnetic path 19a of the magnetic flux generated from the first and second flat-plate-like permanent magnets 15, 14 circulates in the planes of the sheets 2, 4 in the inner yoke 1 and the outer yoke 3. When the magnetic flux circulates in the planes of the sheets 2, 4, an eddy current 20 tends to take place in a direction perpendicular to the magnetic flux. This is a current proportional to the square of the magnetic flux density and proportional to the square of the thickness of the yoke material. Since the inner yoke 1 and the outer yoke 3 are formed into a prismatic configuration in a manner the large numbers of sheets 2, 4 each having a high magnetic permeability and having an insulated surface are piled up on each other, the eddy current hardly occurs, and the core loss is considerably reducible. Accordingly, the motor efficiency can come up.

Besides, because the inner yoke 1 and the outer yoke 3 are formed into a prismatic configuration in a manner of simply piling up the large number of sheets 2 or 4, the manufacturing of the yokes in the linear motor becomes extremely easy.

Additionally, an Nd—Fe—B based rare earth magnet encounters difficulty in machining, and the cylindrical configuration leads to a high cost because its machining difficulty. In this embodiment, owing to the employment of the first and second flat-plate-like permanent magnets 15, 14 being simple to process, the fabrication of the magnets becomes simplified, which contributes to a reduction of the cost of the magnets, thus leading to the motor cost reduction.

Although in the above description the coil 12 is wound in the outer yoke 3, it is also possible that the coil 12 wound in the inner yoke.

Accordingly, as described above, the linear motor according to this embodiment comprises prismatic inner yokes 1 each formed by piling up a number of sheets 2 each having a generally rectangular configuration and having a high magnetic permeability, outer yokes 3 each formed by piling up a number of sheets 4 each having a generally rectangular configuration and having a high magnetic permeability, where two slots 21, 22 are formed by cutting the outer yoke 3 in the sheets 4 piling-up direction to establish first magnetic pole portion 6, a second magnetic pole portion 7 and a third magnetic pole portion 8, with a surface of the outer yoke 3, holding the magnetic pole portions, being placed in an opposed relation to the inner yoke 1 to define a predetermined gap therebetween to constitute each of a set of yoke blocks 10 so that a magnetic path is established along surfaces of the sheets, coils 12 each wound around the second magnetic pole portion 7 and made to alternately establish different magnetic poles in the first magnetic pole portion 6, the second magnetic pole portion 7 and the third magnetic pole portion 8, a flat-plate-like base 11 for holding the set of yoke blocks 10 in a state where their inner yoke sides are placed in an opposed relation to each other to define a predetermined space, a bearing 18 fitted to the base 11 to be positioned between the inner yokes, a moving element 13 including pairs of first and second flat-plate-like permanent magnets 15, 14 magnetized in directions of opposing of the inner yoke 1 and the outer yoke 3 and each placed within the gap 9 in a state of being arranged at a predetermined interval along an axial direction of the bearing 18 so that their magnetizing directions are opposite to each other, where, when the moving element 13 shifts along the axial direction, the first flat-plate-like permanent magnet 15 always crosses the first magnetic pole portion 6 and the second magnetic pole portion 7 while the second flat-plate-like permanent magnet 14 always crosses the second magnetic pole 7 and the third magnetic pole portion 8, and further comprises a shaft 17 fitted integrally to the moving element 13 and inserted into the bearing 18.

Thus, the core loss in the inner yokes 1 and the outer yokes 3 is reducible to improve the motor efficiency, and the fabrication of the linear motor becomes easy.

Thirteenth Embodiment

Figure 11:
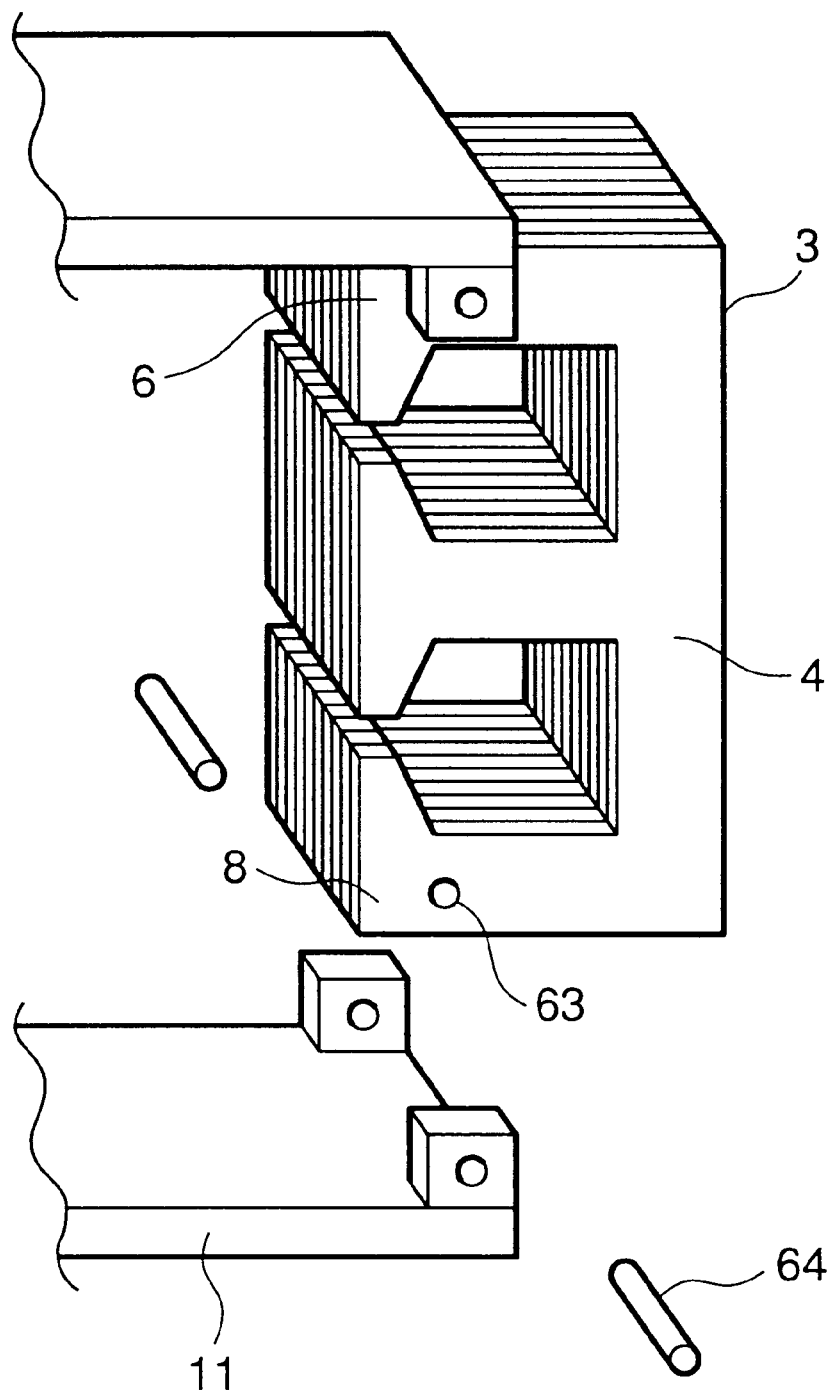
FIG. 11 is a perspective view showing an outer yoke and an base of a linear motor according to a thirteenth embodiment of this invention.

FIG. 11 is a perspective view showing an outer yoke and an base of a linear motor according to a thirteenth embodiment of this invention. The whole construction of this linear motor is similar to that shown in FIGS. 4, 9 and 10.

In FIG. 11, reference numeral 63 denotes holes made in both end surfaces of a first magnetic pole portion 6 and a third magnetic pole portions 3 of an outer yoke 3 in the sheets (4) piling-up directions, with the number of holes 63 being 4 in total. Further, numeral 64 depicts bar-like members such as vises, which are respectively inserted into the holes 63, so that the outer yoke 3 is fixedly secured to a base 11.

In the linear motor thus constructed, both the end surfaces of the outer yoke 3 are put in the base 11 and the outer yoke is fixed thereto by means of the bar-like members 64. Thus, the outer yoke 3 can firmly be fixed to the base 11, and the strength of the outer yoke 3 formed by piling up a large number of sheets is securable.

As mentioned above, in the linear motor according to this embodiment, the holes 63 are made in the first magnetic pole portion 6 and the third magnetic pole portion 8 in the sheet 4 piling-up directions of the outer yoke 3, and the outer yoke 3 is fixedly secured to the base 11 by means of the bar-like members 64, and therefore, the outer yoke 3 can strongly be fixed to the base 11, and the strength of the outer yoke 3 formed by piling up a large number of sheets is securable.

Fourteenth Embodiment

Figure 12:
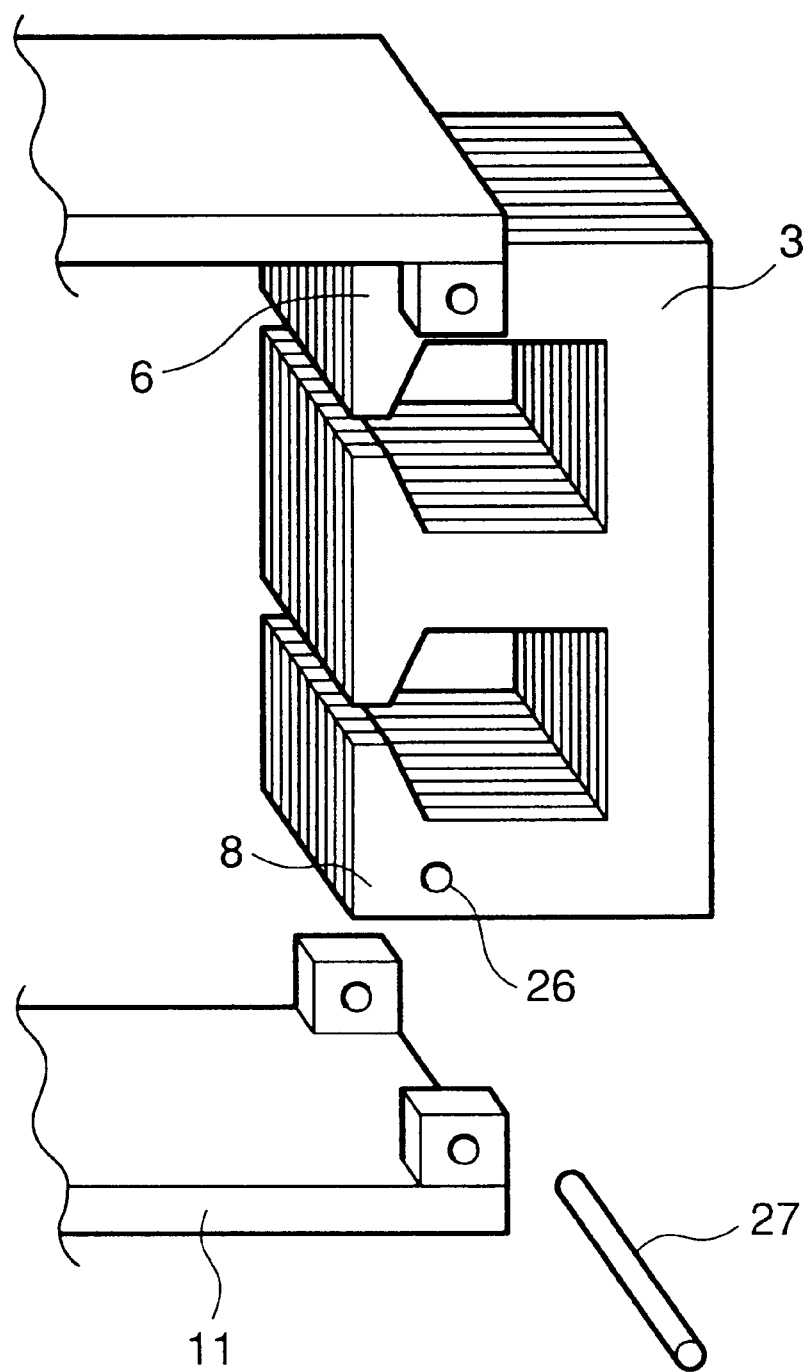
FIG. 12 is a perspective view showing an outer yoke and an base of a linear motor according to a fourteenth embodiment of this invention.

FIG. 12 is a perspective view showing an outer yoke and an base of a linear motor according to a fourteenth embodiment of this invention. The whole construction of this linear motor is similar to that shown in FIGS. 4, 9 and 10.

In FIG. 12, reference numeral 26 represents through-holes made in a first magnetic pole portion 6 and a third magnetic pole portion 8 of an outer yoke 3 in the sheets (4) piling-up direction, and numeral 27 designates penetrating bars which are inserted into the through-holes 26 so that the outer yoke 3 is fixedly secured to a base 11.

In the linear motor thus constructed, because the outer yoke 3 is fixed through the penetrating bars 27 to the base 11 in a state where the both end surfaces of the outer yoke 3 are put in the base 1, the outer yoke 3 can firmly be fixed to the base 1, and the strength of the outer yoke 3 formed by piling up a large number of sheets is securable. Besides, the fabrication of the linear motor becomes easy.

As described above, in the linear motor according to this embodiment, the through-holes 26 are made in the first and third magnetic pole portions 6, 8 of the outer yoke 3 in the sheets (4) piling-up direction and the outer yoke 3 is fixed through the penetrating bars 27 to the base 11, and therefore, not only the outer yoke 3 can strongly be fixed to the base 11, but also the strength of the outer yoke 3 formed by piling up a large number of sheets is securable, and even the manufacturing of the linear motor can be facilitated.

Fifteenth Embodiment

Figure 13:
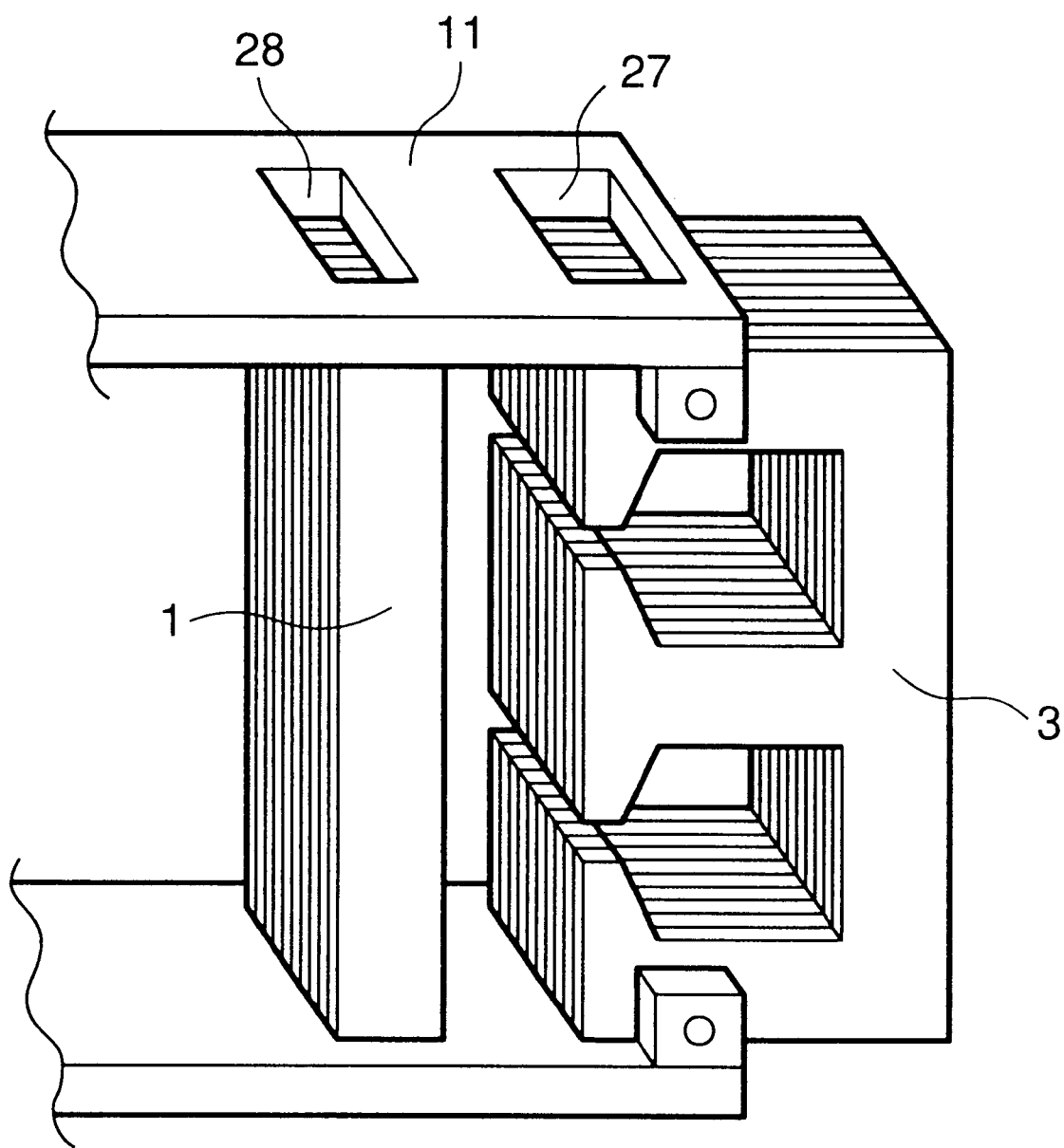
FIG. 13 is a perspective view showing an inner yoke, an outer yoke and a base of a linear motor according to an fifteenth embodiment of this invention.

FIG. 13 is a perspective view showing an inner yoke, an outer yoke and a base of a linear motor according to an fifteenth embodiment of this invention. The whole construction of this linear motor is similar to that shown in FIGS. 4, 9 and 10.

In FIG. 13, reference numerals 27, 28 signify holes made in portions of a base 11 which come into contact with an outer yoke 3 and an inner yoke 1, respectively. In this case, in order for, of the magnetic flux circulating in the planes of sheets 2, 4 of the inner yoke 1 and the outer yoke 3, as little flux as possible to pass through the base 11, it is necessary that the material for the base 11 is a non-magnetic material. In addition, since the base 11 is needed to exhibit a good machinability, a preferred material is, for example, aluminum.

In the linear motor thus constructed, the leakage of the magnetic flux from the inner yoke 1 and the outer yoke 3 into the base 11 is reducible to suppress the core loss occurring in the base 11 due to the leaked magnetic flux, which enhances the motor efficiency.

As mentioned above, in the linear motor according to this embodiment, the base 11 is designed to have the holes 27, 28 at its portions coming into contact with the outer yoke 3 and the inner yoke, respectively, and therefore, the core loss of the base 11 can be lessened to improve the motor efficiency.

Sixteenth Embodiment

Figure 14:
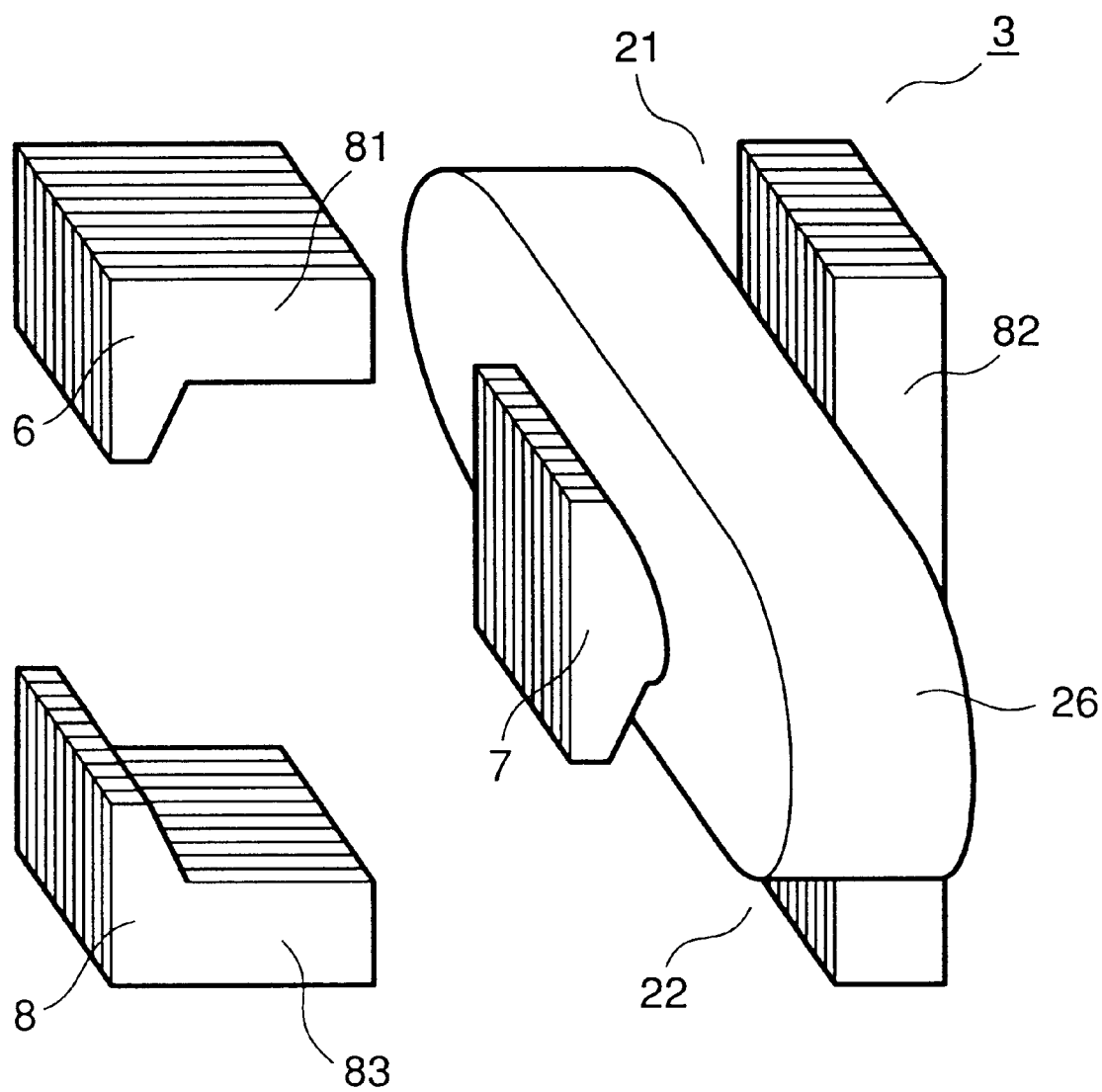
FIG. 14 is an exploded view showing an outer yoke of a linear motor according to a sixteenth embodiment of this invention.

FIG. 14 is an exploded view showing an outer yoke of a linear motor according to a sixteenth embodiment of this invention. The whole construction of this linear motor is similar to that shown in FIGS. 4, 9 and 10.

In FIG. 14, reference numeral 81 represents a first magnetic pole block 1B constituting a first magnetic pole side wall surface of a first slot 21, numeral 82 designates a second magnetic pole block 2B constituting a second magnetic pole side wall surface and inner yoke opposing wall surface of the first slot 21 and a second magnetic pole side wall surface and inner yoke opposing wall surface of a second slot 22, and numeral 83 denotes a third magnetic pole block 3B composing a third magnetic pole side wall surface of the second slot 22. An outer yoke 3 is made up of the first magnetic pole block 81 (1B), the second magnetic pole block 82 (2B) and the third magnetic pole block 83 (3B). After a coil 26 is directly wound around the second magnetic pole block 82, the three blocks 81 to 83 are unified by means of welding, fitting, caulking or the like.

In the outer yoke 3 formed as mentioned above, since the coil 26 is directly normal-wound around the single second magnetic pole block 82 by the use of a machine in a manner that the inner yoke opposing wall surfaces of the first and second slots 21, 22 are used as a guide, the space factor improves so that the size of the outer yoke 3 is reducible under a constant number-of-turns condition, thereby leading to the size reduction of the linear motor.

Incidentally, although in the above description the yoke blocks 10 to be put to use are 2 in number, the number of yoke blocks 10 is not limited to this provided that a plurality of yoke blocks 10 exist.

As described above, in the linear motor according to this embodiment, the outer yoke 3 is composed of the first slot 21, the second slot 22, the first magnetic pole block 81 constituting the first magnetic pole side wall surface of the first slot 21, the second magnetic pole block 82 constituting the second magnetic pole side wall surface and inner yoke opposing wall surface of the first slot 21 and the second magnetic pole side wall surface and inner yoke opposing wall surface of the second slot 22, and the third magnetic pole 83 organizing the third magnetic pole side wall surface of the second slot 22, with the three blocks being unified after the coil 26 is wound around the second magnetic pole block 82. Hence, the space factor of the coil 26 improves, which leads to the size reduction of the linear motor.

Seventeenth Embodiment

Figure 15:
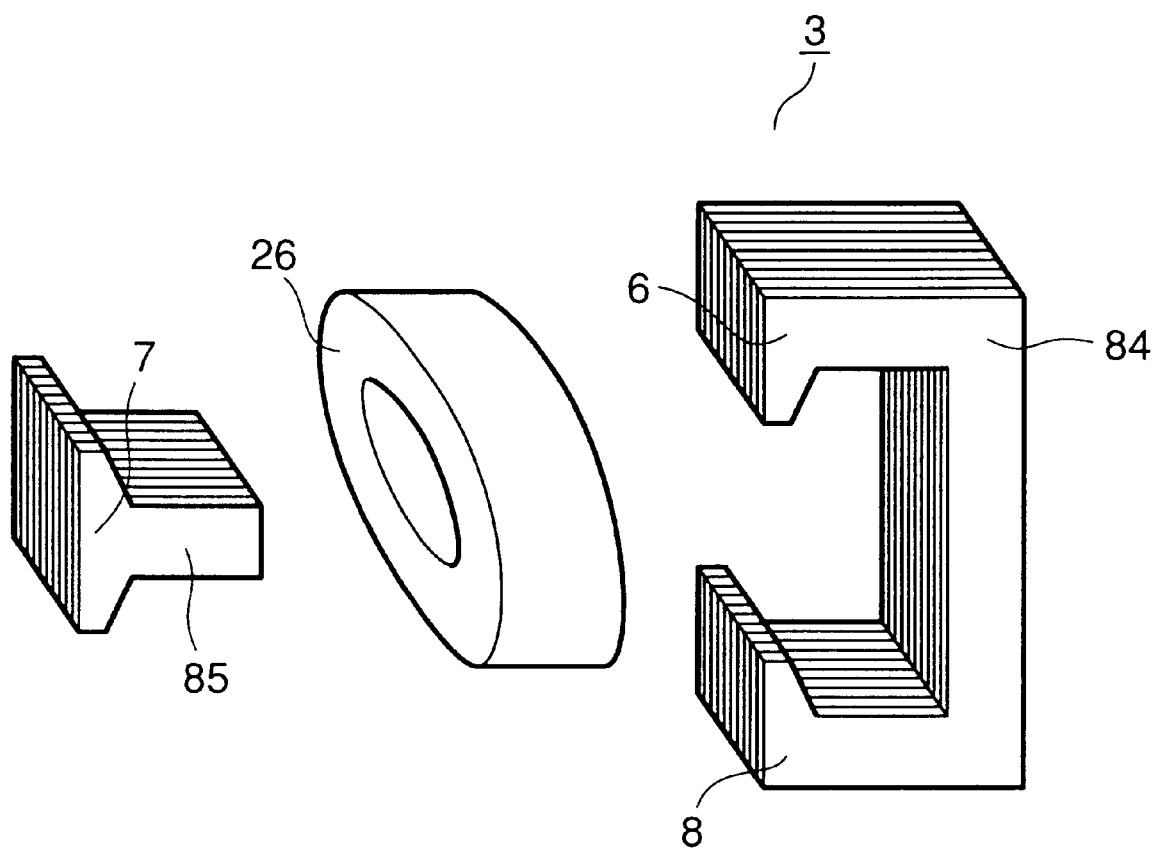
FIG. 15 is an exploded view showing an outer yoke of a linear motor according to a seventeenth embodiment of this invention.

FIG. 15 is an exploded view showing an outer yoke of a linear motor according to a seventeenth embodiment of this invention. The whole construction of this linear motor is similar to that shown in FIGS. 4, 9 and 10.

In FIG. 15, reference numeral 84 represents a side yoke block constituting a first magnetic pole side wall and inner yoke opposing wall surface of a first slot 21 and a third magnetic pole side wall surface and inner yoke opposing surface of a second slot 22, numeral 85 designates a center yoke block organizing a second magnetic pole side wall surface of the first slot 21 and a second magnetic pole side wall surface of the second slot 22. An outer yoke 3 is made up of the side yoke block 84 and the center block 85. A coil 26 is fitted over the center yoke block 85, and subsequently, the two blocks 84, 85 are unified by means of welding, fitting, caulking or the like.

In the outer yoke 3 thus constructed, the coil 26 can separately be normal-wound through the use of a machine, or can be wound around the single center yoke block 85 by the use of a machine. For this reason, the space factor improves, and hence, the size reduction of the outer yoke 3 is feasible under a constant number-of-tuns, thus resulting in the size reduction of the linear motor.

Incidentally, although in the above description the yoke blocks 10 to be used are 2 in number, the number of yoke blocks 10 is not limited to this provided that a plurality of yoke blocks 10 exist.

As described above, in the linear motor according to this embodiment, the outer yoke 3 is made up of the first slot 21, the second slot 22, the side yoke block 84 constituting the first magnetic pole side wall surface and inner yoke opposing surface of the first slot 21 and the third magnetic pole side wall surface and inner yoke opposing wall surface of the second slot 22, and the center yoke block 85 organizing the second magnetic pole side wall surface of the first slot 21 and the second magnetic pole side wall surface of the second slot 22, with the two blocks 84, 85 being unified after the coil 26 is fitted over the center yoke block 85, and therefore the space factor rises, thus accomplishing the size reduction of the linear motor.

Eighteenth Embodiment

Figure 16:
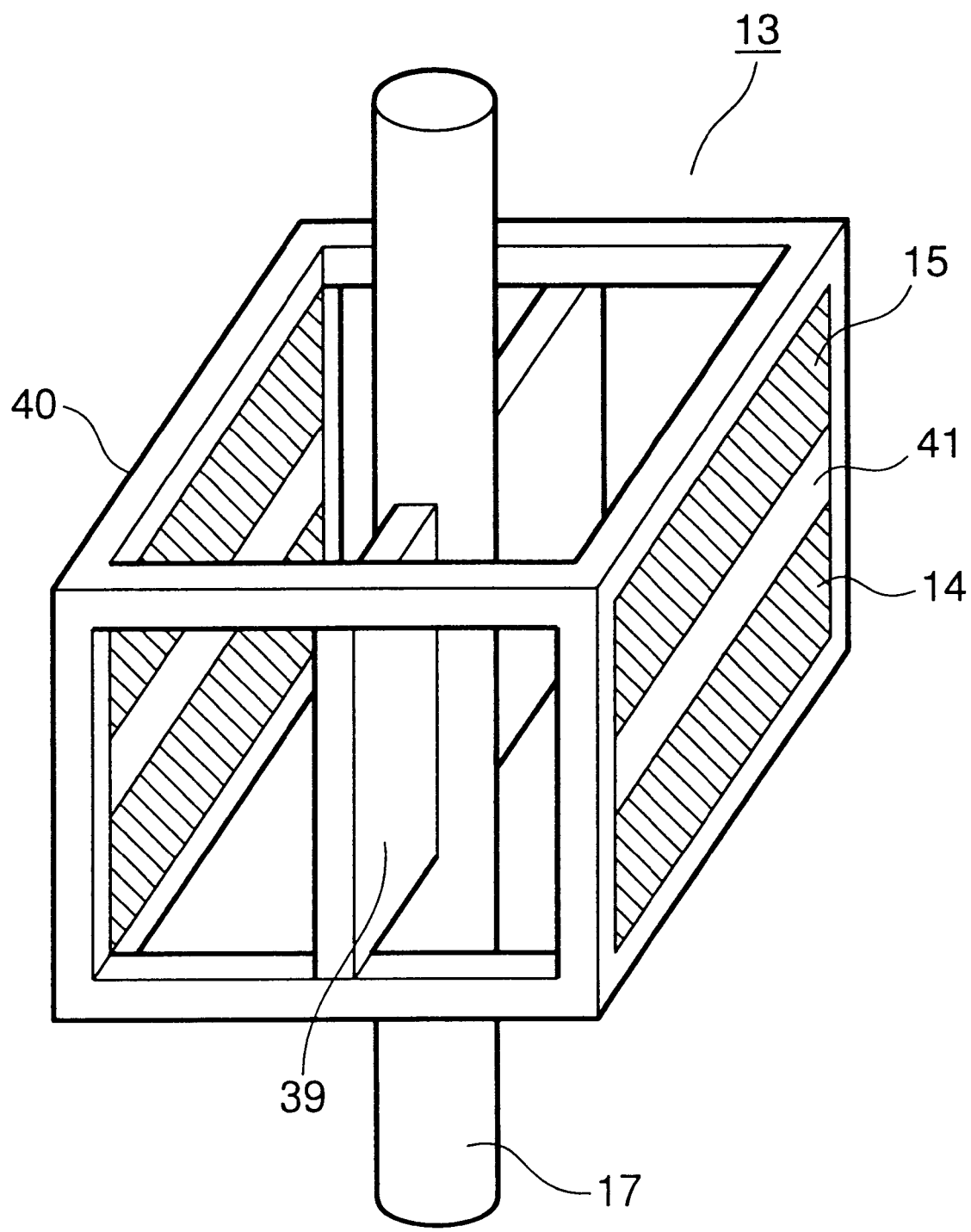
FIG. 16 is a perspective view showing a moving element of a linear motor according to an eighteenth embodiment of this invention.

FIG. 16 is a perspective view showing a moving element of a linear motor according to an eighteenth embodiment of this invention. The whole construction of this linear motor is similar to that shown in FIGS. 4, 9 and 10.

In FIG. 16, a moving element 13 uses a frame 40 having a hexahedral configuration, and is constructed such that first and second flat-plate-like permanent magnets 15, 14 are placed in each of two sides of the frame 40, each of which is to be put between each of inner yokes 1 and each of outer yokes 3, to define a predetermined interval 41 in an axial direction. The moving element 13 further comprises supporting sections 39 for making a connection between the above-mentioned moving element 13 and a shaft 17 in a space between the inner yokes 1.

The moving element 13 thus constructed exhibits a structural strength and light in weight, and allows pairs of first and section flat-plate-like permanent magnets 15, 14 to be held in gaps between the inner yokes 1 and the outer yokes 3 with a high accuracy in a state being disposed at the predetermined interval 41 along the axial direction. In addition, since the supporting sections 39 for making the connection between the moving element 13 and the shaft 17 are placed in the space between the inner yokes 1, the size of the moving element 13 is reducible.

As described above, in the linear motor according to this embodiment, the moving element 13 is configured with the frame 40 having a hexahedral shape, and is constructed such that first and second flat-plate permanent magnets 15, 14 are disposed axially at the predetermined interval 41 in each of two sides of the frame 40 to be put between the inner yoke 1 and the outer yoke 3, with the moving element 13 and the shaft 17 being connected through supporting sections 39 to each other within a space between the inner yokes 1, and therefore, the moving element is securable in strength, and the fabrication of the linear motor becomes easy.

Nineteenth Embodiment

Figure 17:
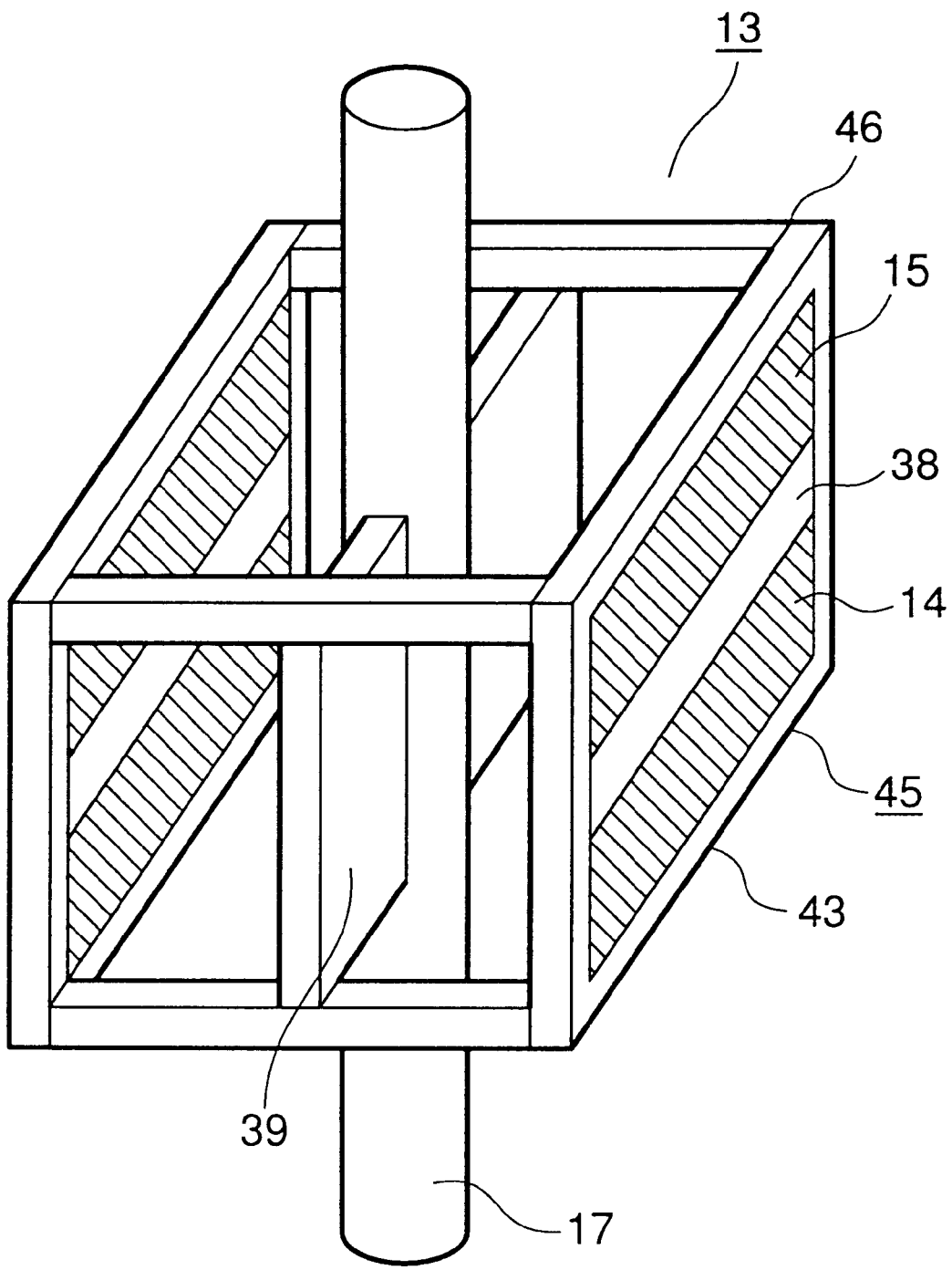
FIG. 17 is a perspective view showing a moving element of a linear motor according to a nineteenth embodiment of this invention.

FIG. 17 is a perspective view showing a moving element of a linear motor according to a nineteenth embodiment of this invention. The whole construction of this linear motor is similar to that shown in FIGS. 4, 9 and 10.

In FIG. 17, a moving element 13 is composed of a pair of moving permanent magnet sections 45 each comprising a pair of first and second flat-plate-like permanent magnets 15, 14 surrounded by a rectangular moving section base 43 and disposed at a predetermined interval in a state where a spacer 38 is placed therebtween, and a plurality of supporting columns 46 for supporting the pair of moving permanent magnet sections 45 to form the moving element 13 into a generally cubic frame configuration, with the moving element 13 and a shaft 17 being connected through supporting sections 39 to each other in a space between inner yokes 1.

The moving element 13 thus constructed exhibits its structural strength and is light in weight, and the pair of first and second flat-plate-like permanent magnets 15, 14 can be held with a high accuracy in a state of being disposed axially at a predetermined interval in a gap 9 between the inner yoke 1 and an outer yoke 3. In addition, since the supporting sections 39 for making the connection between the moving element 13 and the shaft 17 are placed within a space between the inner yokes 1, the moving element 13 results in size reduction.

As described above, in the linear motor according to this embodiment, the moving element 13 is composed of the pair of moving permanent magnet sections 45 each comprising the first and second flat-plate-like permanent magnets 15, 14 surrounded by the rectangular moving section base 43 and disposed at the predetermined interval in a state where the spacer is interposed therebetween, and the plurality of supporting columns 46 for supporting the pair of moving permanent magnet sections 45 to form the moving element 13 into a generally cubic frame configuration, with the moving element 13 and the shaft 17 being connected through the supporting sections 39 to each other in the space between the inner yokes 1, which secures the strength of the moving element 13 and facilitates the manufacturing of the linear motor.

Twentieth Embodiment

Figure 18:
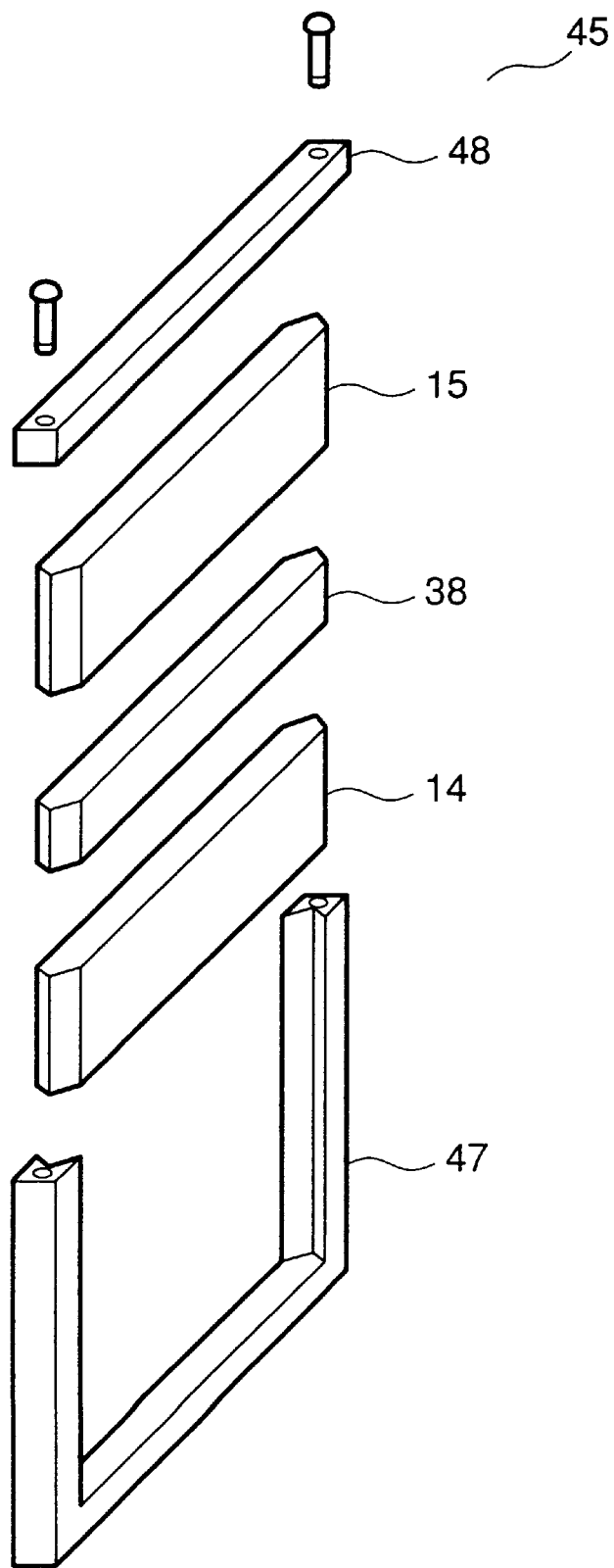
FIG. 18 is an exploded view showing a moving permanent magnet section of a linear motor according to a twentieth embodiment of this invention.

FIG. 18 is an exploded view showing a moving permanent magnet section of a linear motor according to a twentieth embodiment of this invention. The construction of this linear motor is similar as a whole to that shown in FIGS. 4, 9 and 10.

In FIG. 18, a moving permanent magnet section, designated at numeral 45, is made up of a rectangular or square frame, a pair of first and second flat-plate-like permanent magnets 15, 14 and a spacer 38. The rectangular frame comprises a U-shaped frame 47 having a groove on its inner side and a bar-like presser 48, and the pair of first and second flat-plate-like permanent magnets 15, 14 are made to be inserted into the rectangular frame through their projections to be fitted in the groove. The spacer 38 is positioned between the first and second flat-plate-like permanent magnets 15, 14 and likewise has projections to be fitted in the same groove.

The moving permanent magnet section 45 thus constructed exhibits a structural strength and is light in weight, and further holds the pair of first and second flat-plate-like permanent magnets 15, 14 with a high accuracy in a state where they are disposed to define a predetermined interval.

In the linear motor according to this embodiment, since, as described above, the moving permanent magnet section 45 is made up of the rectangular frame comprising a U-shaped frame 47 having a groove on its inner side and a bar-like presser 48, the pair of first and second flat-plate-like permanent magnets 15, 14 made to be inserted into the rectangular frame and having projections to be fitted in the groove, and the spacer 38 positioned between the first and second flat-plate-like permanent magnets 15, 14 and having projections to be fitted in the groove, a necessary strength of the moving section is securable, besides the manufacturing of the linear motor is facilitated.

Twenty-First Embodiment

Figure 19:
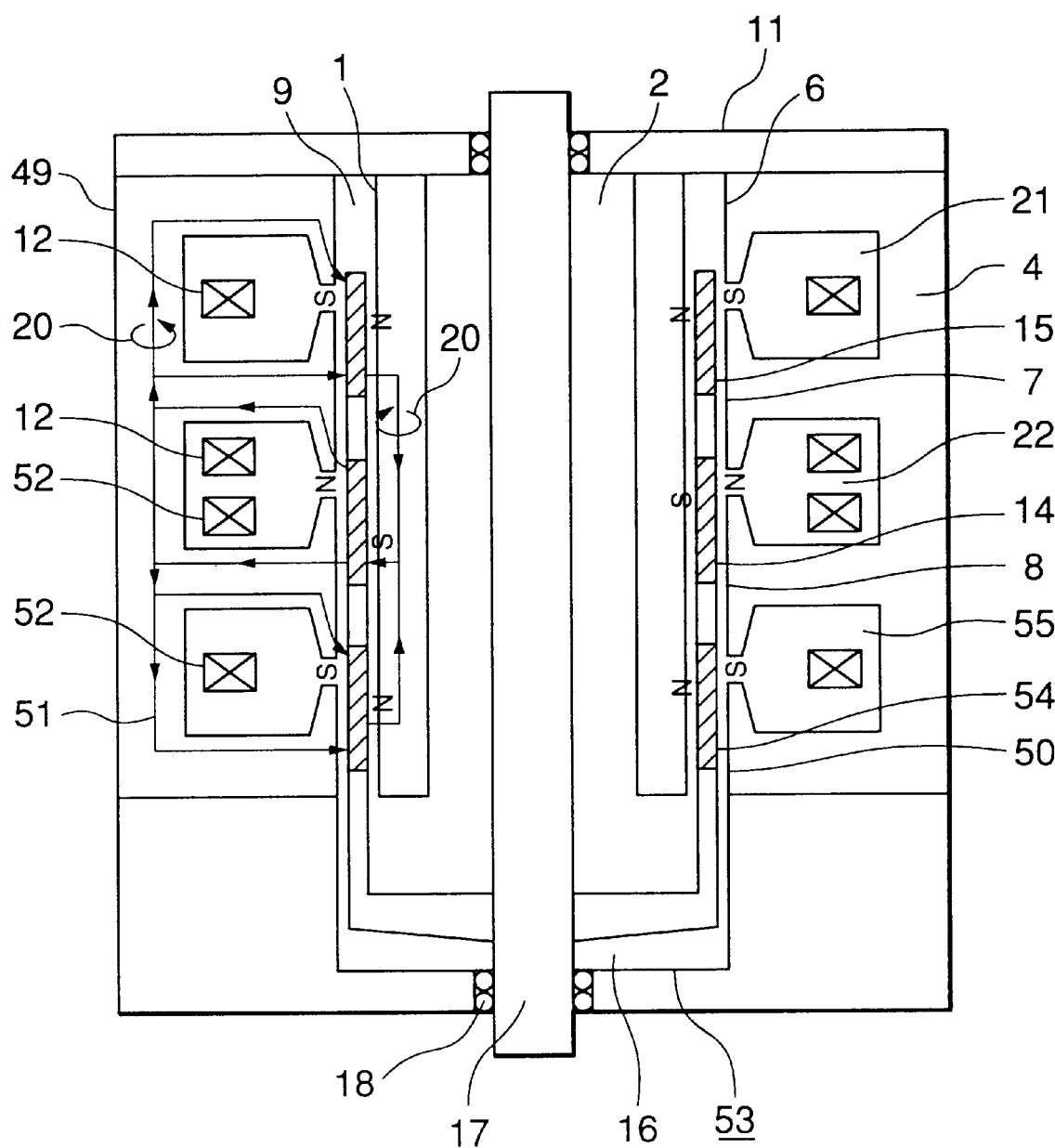
FIG. 19 is a cross-sectional view showing a linear motor according to a twenty-first embodiment of this invention.

FIG. 19 is a cross-sectional view showing a linear motor according to a twenty-first embodiment of this invention.

In FIG. 19, each of outer yokes 49 is constructed such that a large number of sheets 4 each having a generally rectangular configuration and having a high magnetic permeability are piled up each other and three slots 21, 22, 55 are made by cutting the piled-up sheets in the piling-up directions to establish a first magnetic pole portion 6, a second magnetic pole portion 7, a third magnetic pole portion 8 and a fourth magnetic pole portion 50.

In order for different magnetic poles to alternately occur in the four magnetic pole portions 6, 7, 8 and 50 of the outer yoke 49, each of coils 12 is wound around the second magnetic pole portion 7 while each of coils 52 is wound around the third magnetic pole portion 8. The coils 12 and the coils 52 are individually wound in the two outer yokes 49.

A moving element (section) 53 is made up of two sets of first, second and third flat-plate-like permanent magnets 15, 14 and 54, a permanent magnet support 16 and a shaft 17. Preferably, the first to third flat-plate-like permanent magnets 15, 14 and 54 are made from an Nd—Fe—B based rare earth magnet. They are fixed with the permanent magnet support 16 to be disposed at a predetermined axial interval so that the magnetization directions alternately assume the opposite directions, and are put in gaps 9 between inner yokes 1 and the outer yokes 49.

In the linear motor constructed as described above, the magnetic path to be established between the first and second flat-plate-like permanent magnets 15, 14 is the same as that in the above-described twelfth embodiment. A magnetic path of the magnetic flux generated from the second and third flat-plate-like permanent magnets 14, 54 goes through the third flat-plate-like permanent magnet 54, the gap 9, the inner yoke 1, the gap 9, the second flat-plate-like permanent magnet 14, the gap 9, the outer yoke 49 and the gap 9 to return to the third flat-plate-like permanent magnet 54 to surround the slot 22 or 55, and further generates a static magnetic field in the gap 9. In the inner yoke 1 and the outer yoke 49, it circulates in the planes of the sheets 2, 4.

Furthermore, on supply to the coils 12, 52 alternating currents whose current values are the same and whose (coil current) directions are opposite to each other in the adjacent slots, different magnetic poles alternately take place axially in the first magnetic pole portion 6, the second magnetic pole portion 7, the third magnetic pole portion 8 and the fourth magnetic pole portion 50, and the magnetic attraction and repulsive action with the first, second and third flat-plate-like permanent magnets 15, 14 and 54 of the moving element 53 develop an axial thrust proportional to the magnitude of the current in the coils 12, 52 and the magnetic flux density generated from the first to third flat-plate-like permanent magnets 15, 14 and 54, so that the moving element 53, together with the shaft 17, reciprocates in synchronism with the frequency of the alternating current.

In this case, since the axial thrust proportional to the magnitude of the current in the coils 12, 52 and the magnetic flux density generated from the first to third flat-plate-like permanent magnets 15, 14 and 54 is attainable, a higher thrust is achievable.

Still further, each magnet of the set of first, second and third flat-plate-like permanent magnets 15, 14 and 54 is placed to always cross two magnetic poles of the outer yoke 49 at the same time while the moving element 53 is in the middle of movement from the lower dead center to the upper dead center, and in consequence, the magnetic flux from the first, second and third flat-plate-like permanent magnets 15, 14 and 54 effectively works on the slots 21, 22 and 55, and the magnetic force due to the alternating current flowing in the first, second and third flat-plate-like permanent magnets 15, 14, 54 and the coils 12, 52 is effectively producible to offer a great thrust.

Moreover, a magnetic path 51 of the magnetic flux generated from the first, second and third flat-plate-like permanent magnets 15, 14 and 54 circulates in the planes of the sheets 2, 4 of the inner yoke 1 and the outer yoke 49. When the magnetic flux circulates in the planes of the sheets 2, 4, an eddy current 20 tends to take place in a direction crossing the magnetic flux. This is a current proportional to the square of the magnetic flux density and proportional to the thickness of the yoke material. Owing to the fact that each of the inner yoke 1 and the outer yoke 49 is formed into a prismatic configuration in a manner that a large number of sheets 2 or 4 each having a high magnetic permeability and having an insulated surface are piled up each other, little eddy current can take place, thereby considerably reduce the core loss, which accordingly contributes to the improvement of the motor efficiency.

In addition, since each of the inner yoke 1 and the outer yoke 49 is formed into a prismatic configuration in a manner of simply piling up a large number of sheets 2 or 4, the manufacturing of the yokes for a linear motor becomes extremely easy.

Besides, an Nd—Fe—B based rare earth magnet encounters difficulty in machining, and the cylindrical configuration leads to a high cost because its machining difficulty. In this embodiment, owing to the employment of the first, second and third flat-plate-like permanent magnets 15, 14 and 54 being simple to process, the fabrication of the magnets becomes simplified, which contributes to a reduction of the cost of the magnets, thus leading to the motor cost reduction.

Additionally, although in the above description the coils 12, 52 are wound in the outer yoke 49, it is also acceptable that the coils 12, 52 are put in the inner yoke 1.

Moreover, although in the above description the magnetic pole portions are 4 in number, it is also possible that yokes, magnets and coils are further connected in series in the axial direction.

As described above, the linear motor according to this embodiment comprises prismatic inner yokes 1 each formed by piling up a number of sheets 2 each having a generally rectangular configuration and having a high magnetic permeability, outer yokes 49 each formed by piling up a number of sheets 4 each having a generally rectangular configuration and having a high magnetic permeability, where a plurality of slots 21, 22, 55 are formed by cutting the outer yoke 49 in the sheets 4 piling-up direction to establish a plurality of magnetic pole portions, coils 12, 52 respectively wound around all the magnetic pole portions other than the magnetic pole portions positioned at both ends of the outer yoke 49 and made to alternately establish different magnetic poles in the adjacent magnetic pole portions, a set of yoke blocks 10 each including the inner yoke 1, the outer yoke 49 and the coils 12, 52 and each made such that a surface of the outer yoke 49, holding the magnetic pole portions, is placed at a predetermined gap in an opposed relation to the inner yoke 1 to allow formation of a magnetic path along surfaces of the sheets 2, 4, a flat-plate-like base 11 for holding the set of yoke blocks 10 in a state where their inner yoke sides are located in an opposed relation to each other to define a predetermined space, a bearing 18 fitted to the base 11 to be between the inner yokes of the set of yoke blocks, a moving element 53 in which each of sets of flat-plate-like permanent magnets 15, 14, 54 equal in number to the slots 21, 22, 55 and magnetized in directions of facing of the inner yoke 1 and the outer yoke 49 are placed within a gap 9 between the inner yoke 1 and the outer yoke 49 in a state of being arranged at a predetermined interval along an axial direction of the bearing 18 so that their magnetizing directions are opposite to each other, where, when the moving element 53 shifts along the axial direction, each of the flat-plate-like permanent magnets 15, 14, 54 always crosses the adjacent magnetic pole portions of the outer yoke 49 at the same time, and a shaft 17 fitted integrally to the moving element 53 and inserted into the bearing 18.

With this construction, the higher thrust is obtainable, and the core loss of the inner yokes and the outer yokes come down to improve the motor efficiency, and further, the fabrication of the linear motor becomes easy.

Twenty-Second Embodiment

Figure 20:
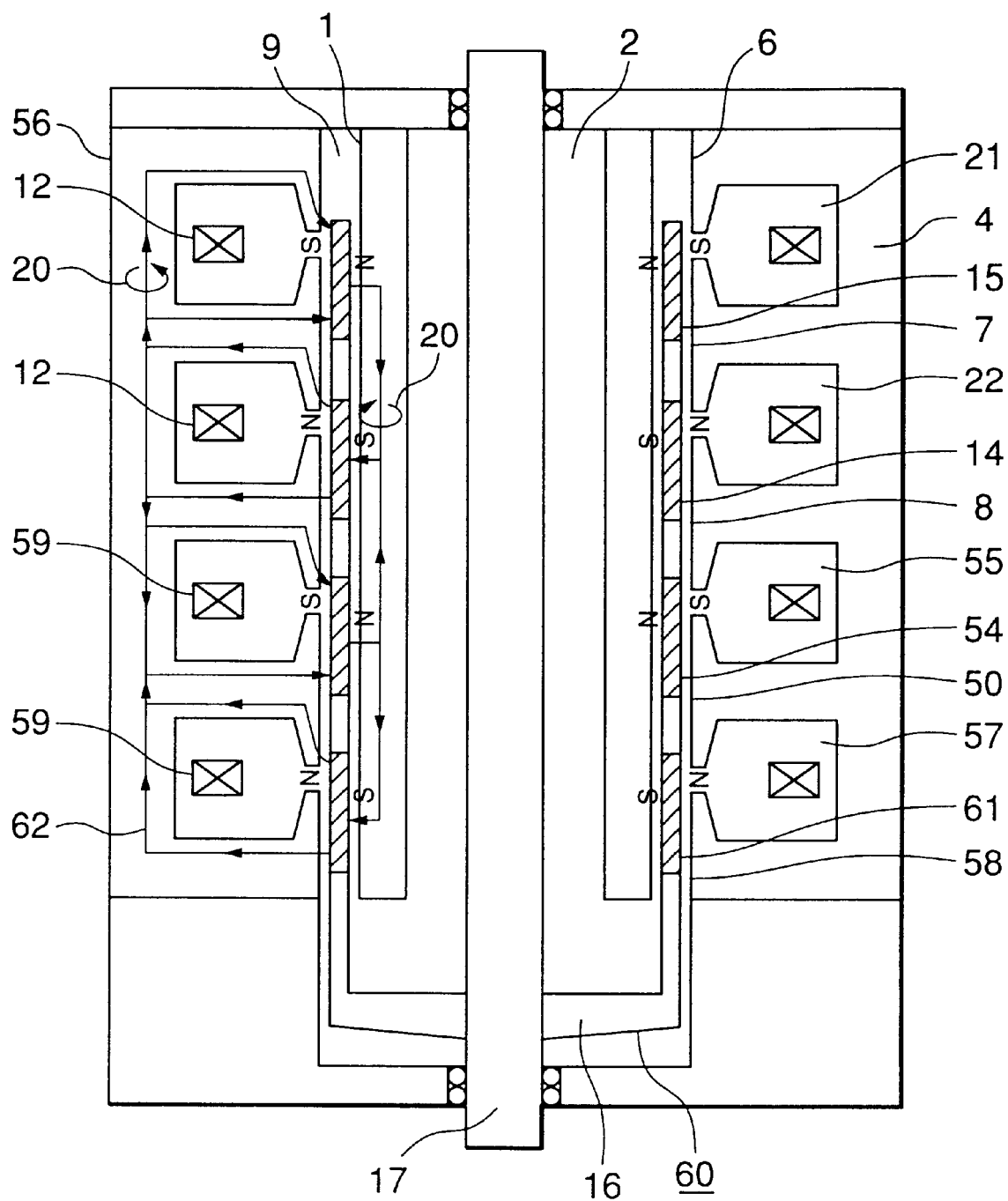
FIG. 20 is a cross-sectional view showing a linear motor according to a twenty-second embodiment of this invention.

FIG. 20 is a cross-sectional view showing a linear motor according to a twenty-second embodiment of this invention.

In FIG. 20, each of outer yokes 56 is constructed such that a large number of sheets 4 each having a generally rectangular configuration and having a high magnetic permeability are piled up each other and four slots 21, 22, 55, 57 are made by cutting the piled-up sheets in the piling-up directions to establish a first magnetic pole portion 6, a second magnetic pole portion 7, a third magnetic pole portion 8, a fourth magnetic pole portion 50 and a fifth magnetic pole portion 58. In order for different magnetic poles to alternately occur in the five magnetic pole portions 6, 7, 8, 50 and 58 of the outer yoke 56, each of coils 12 is wound around the second magnetic pole portion 7 while each of coils 59 is wound around the fourth magnetic pole portion 54. The coils 12 and the coils 59 are individually wound in the two outer yokes 56.

A moving element 60 is made up of two sets of a first flat-plate-like permanent magnet 15, a second flat-plate-like permanent magnet 14, a third flat-plate-like permanent magnet 54 and a fourth flat-plate-like permanent magnet 61, a permanent magnet support 16 and a shaft 17. Preferably, the first to fourth flat-plate-like permanent magnets 15, 14, 54 and 61 are made from an Nd—Fe—B based rare earth magnet. They are fixed with the permanent magnet support 16 to be disposed at a predetermined axial interval so that the magnetization directions alternately assume the opposite directions, and are put in gaps 9 between inner yokes 1 and the outer yokes 56.

In the linear motor constructed as described above, the magnetic path to be established between the first, second and flat-plate-like permanent magnets 15, 14 and 54 is the same as that in the above-described twelfth embodiment. A magnetic path of the magnetic flux generated from the third and fourth flat-plate-like permanent magnets 54, 61 goes through the third flat-plate-like permanent magnet 54, the gap 9, the inner yoke 1, the gap 9, the fourth flat-plate-like permanent magnet 61, the gap 9, the outer yoke 56 and the gap 9 to return to the third flat-plate-like permanent magnet 54 to surround the slot 55 or 57, and further generates a static magnetic field in the gap 9. In the inner yoke 1 and the outer yoke 56, it circulates in the planes of the sheets 2, 4.

Furthermore, on supply to the coils 12, 59 alternating currents whose current values are the same and whose (coil current) directions are opposite to each other in the adjacent slots, different magnetic poles alternately take place axially in the first magnetic pole portion 6, the second magnetic pole portion 7, the third magnetic pole portion 8, the fourth magnetic pole portion 50 and the fifth magnetic pole portion 58, and the magnetic attraction and repulsive action with the first, second, third and fourth flat-plate-like permanent magnets 15, 14 , 54 and 61 of the moving element 60 develop an axial thrust proportional to the magnitude of the current in the coils 12, 59 and the magnetic flux density generated from the first to fourth flat-plate-like permanent magnets 15, 14, 54 and 61 so that the moving element 60, together with the shaft 17, reciprocates in synchronism with the frequency of the alternating current.

Thus, since the axial thrust proportional to the magnitude of the current in the coils 12, 59 and the magnetic flux density generated from the first to fourth flat-plate-like permanent magnets 15, 14, 54 and 61 is attainable, a higher thrust is achievable.

Still further, each magnet of the two sets of first, second and third flat-plate-like permanent magnets 15, 14, 54 and 61 is placed to always cross two magnetic poles of the outer yoke 56 at the same time while the moving element 60 is in the middle of movement from the lower dead center to the upper dead center, and in consequence, the magnetic flux from the first, second, third and fourth flat-plate-like permanent magnets 15, 14, 54 and 61 effectively works on the slots 21, 22, 55 and 61, and the magnetic force due to the alternating current flowing in the first, second, third fourth flat-plate-like permanent magnets 15, 14, 54, 61 and the coils 12, 59 is effectively producible to offer a great thrust.

Moreover, a magnetic path 62 of the magnetic flux generated from the first, second, third and fourth flat-plate-like permanent magnets 15, 14, 54 and 61 circulates in the planes of the sheets 2, 4 of the inner yoke 1 and the outer yoke 56. When the magnetic flux circulates in the planes of the sheets 2, 4, an eddy current 20 tends to take place in a direction crossing the magnetic flux. This is a current proportional to the square of the magnetic flux density and proportional to the thickness of the yoke material. Owing to the fact that each of the inner yoke 1 and the outer yoke 56 is formed into a prismatic configuration in a manner that a large number of sheets 2 or 4 each having a high magnetic permeability and having an insulated surface are piled up each other, little eddy current can take place, thereby considerably reduce the core loss, which accordingly contributes to the improvement of the motor efficiency.

In addition, since each of the inner yoke 1 and the outer yoke 56 is formed into a prismatic configuration in a manner of simply piling up a large number of sheets 2 or 4, the manufacturing of the yokes for a linear motor becomes extremely easy.

Besides, an Nd—Fe—B based rare earth magnet encounters difficulty in machining, and the cylindrical configuration leads to a high cost because its machining difficulty. In this embodiment, owing to the employment of the first, second, third and fourth flat-plate-like permanent magnets 15, 14, 54 and 61 being simple to process, the fabrication of the magnets becomes simplified, which contributes to a reduction of the cost of the magnets, thus leading to the motor cost reduction.

Additionally, although in the above description the coils 12, 59 are wound in the outer yoke 56, it is also acceptable that the coils 12, 59 are put in the inner yoke 1.

Moreover, although in the above description the magnetic pole portions are 5 in number, it is also possible that yokes, magnets and coils are further connected in series in the axial direction.

As described above, the linear motor according to this embodiment comprises prismatic inner yokes each formed by piling up a number of sheets each having a generally rectangular configuration and having a high magnetic permeability, outer yokes each formed by piling up a number of sheets each having a generally rectangular configuration and having a high magnetic permeability, where a plurality of slots are formed by cutting the outer yoke in the sheets piling-up direction to establish a plurality of magnetic pole portions, coils respectively wound around all the even-number magnetic pole portions of the plurality of magnetic pole portions and made to alternately establish different magnetic poles in the adjacent magnetic pole portions, a set of yoke blocks each including the inner yoke, the outer yoke and the coils and each made such that a surface of the outer yoke, holding the magnetic pole portions, is placed at a predetermined gap in an opposed relation to the inner yoke to allow formation of a magnetic path along surfaces of the sheets, a flat-plate-like base for holding the set of yoke blocks in a state where their inner yoke sides are located in an opposed relation to each other to define a predetermined space, a bearing fitted to the base to be between the inner yokes of the set of yoke blocks, a moving element in which each of sets of flat-plate-like permanent magnets equal in number to the slots and magnetized in directions of facing of the inner yoke and the outer yoke are placed within a gap between the inner yoke and the outer yoke in a state of being arranged at a predetermined interval along an axial direction of the bearing so that their magnetizing directions are opposite to each other, where, when the moving element shifts along the axial direction, each of the flat-plate-like permanent magnets always crosses the adjacent magnetic pole portions of the outer yoke at the same time, and a shaft fitted integrally to the moving element and inserted into the bearing With this construction, the higher thrust is obtainable, and the core loss of the inner yokes and the outer yokes come down to improve the motor efficiency, and further, the fabrication of the linear motor becomes easy.

Twenty-Third Embodiment

Figure 21:
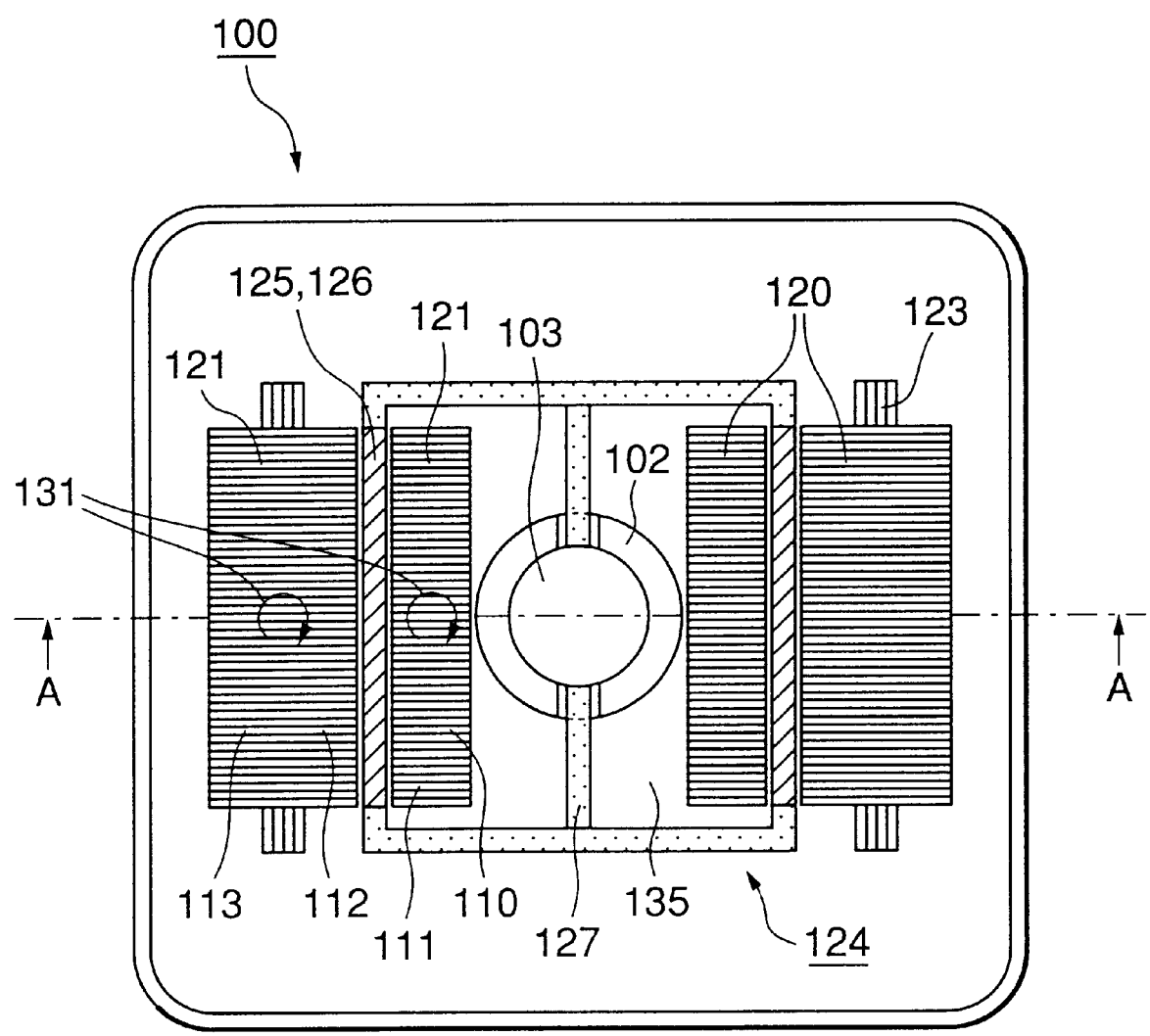
FIG. 21 is a plan cross-sectional view showing a linear compressor according to a twenty-third embodiment of this invention.
Figure 22:
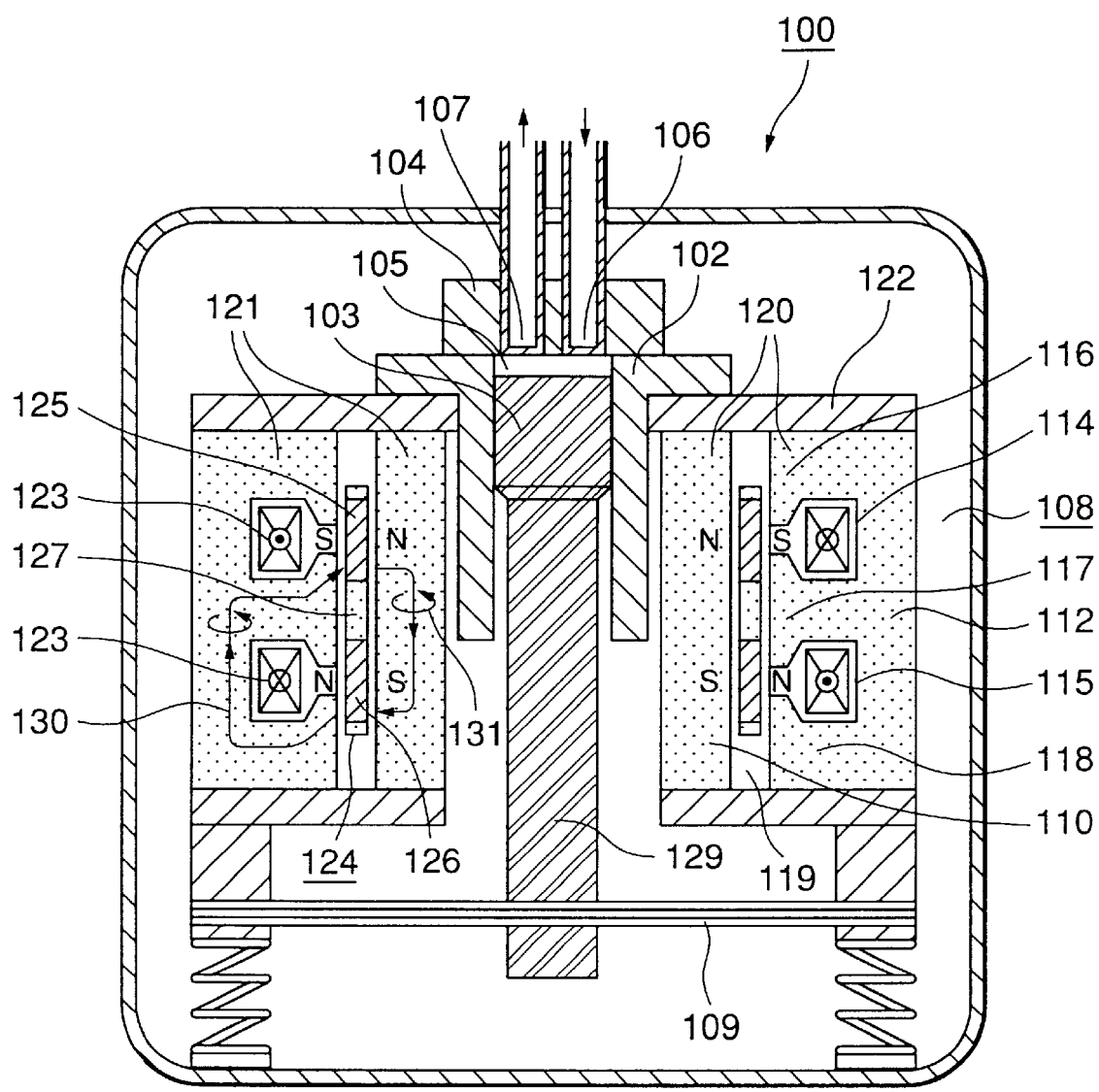
FIG. 22 is a front elevational cross-sectional view taken along a line A—A of FIG. 21.

FIG. 21 is a plan cross-sectional view showing a linear compressor according to a twenty-third embodiment of this invention, and FIG. 22 is a front-elevational cross-sectional view taken along a line A—A of FIG. 21.

In FIGS. 21 and 22, a linear compressor, generally designated at numeral 100, is made up of a cylinder 102, a piston 103 inserted into the cylinder 102 to be allowed to reciprocate, a compression chamber 105 defined in a state of facing a head 104 4 of the piston 103, and a suction (inlet) valve 106 and delivery (outlet) valve 107 openable and closable in accordance with a gas pressure in the compression chamber 105.

In addition, the linear compressor 1 is equipped with a linear motor 108 for making the piston 103 reciprocate, and a resonance spring 109 for supporting the piston 103 to allow the piston 103 to reciprocate.

A description will be made hereinbelow of a construction of the linear motor 108. In FIGS. 21, 22, reference numeral 110 represents inner yokes each of which is formed into a prismatic configuration in a manner that piled up are a large number of sheets 111 each having a high magnetic permeability. Further, numeral 112 denotes outer yokes each of which is formed into a prismatic configuration in a manner that piled up are a large number of sheets 113 having a high magnetic permeability. In each of the outer yokes 112, slots 114, 115 are made in the sheet 113 piling-up directions to establish three magnetic pole portions 116, 117, 118. A surface of each of the outer yokes 112, which holds the magnetic pole portions 116, 117, 118, is placed in an opposed relation to the corresponding inner yoke 110 to define a predetermined gap 119 therebetween, thereby constituting each of yoke blocks 120, 121. In addition, the two yoke blocks 120, 121 are held on a flat-plate-like base 122 in a state of being in an opposed relation to each other to define a predetermined space between their inner yoke 110 sides.

Furthermore, a coil 123 is wound around the central magnetic pole portion 117 of each of the outer yokes 112 so that different magnetic poles alternately take place in the three magnetic pole portions 116, 117, 118 of the outer yoke 112. The coils 123 are individually provided in the outer yokes 112, and connected in parallel.

Still further, a moving element (section) 124 is made up of pairs of flat-plate-like permanent magnets 125, 126 magnetized in directions of opposing of the inner yokes 110 and the outer yokes 112, and a permanent magnet support 127. Preferably, the permanent magnets 125, 126 are made from an Nd—Fe—B based rare earth magnet. The permanent magnets 125, 126 are fixed with the permanent magnet support 127 in a state of being disposed at a predetermined interval in an axial direction of the piston 103 so that their magnetization directions are opposite to each other, and are placed with gaps 119 between the inner yokes 110 and the outer yokes 112.

The moving element 124 is unified through the moving element support 127 to a shaft 129.

Secondly, a description will be made hereinbelow of an operation of the linear compressor 1 thus constructed.

In each yoke block, a magnetic flux 130 generated from the N pole of the permanent magnet 126 passes through the gap 119, the outer yoke 112, the gap 119, the S pole of the permanent magnet 125, the N pole of the permanent magnet 125, the inner yoke 110 and the gap 119 to return to the S pole of the permanent magnet 126, and further, develops a static magnetic field in the gap 19. In the inner yoke 110 and the outer yoke 112, it circulates in the planes of the sheets 111, 113.

In addition, on supply of an alternating current to the coil 123, different magnetic poles alternately take place axially in the magnetic pole portions 116, 117 and 118, and hence, the magnetic attraction and repulsive action with the permanent magnets 125, 126 of the moving element 124 develop to produce a thrust proportional to the magnitude of the current in the coil 123 and the magnetic flux density of the permanent magnets 125, 126, which causes the piston 103 to reciprocate together with the moving element 124. Further, at a low pressure within the compression chamber 105, an expanded gas is led through the suction valve 106 into the compression chamber 105, whereas at a high pressure therein, a compressed gas is discharged through the delivery valve 107 to the external of the compression chamber 105, thus doing a refrigerating work as the linear compressor 100.

In this instance, the direct-acting linear motor 108 is constructed integrally with the piston 103 and the piston 103 reciprocates within the cylinder 102 in accordance with the reciprocating movement of the moving element 124 of the linear motor 108, and the mechanical sliding loss generating source of the linear compressor 100 depends upon only the events between the piston 103 and the cylinder 102. Accordingly, owing to the limitation of the mechanical sliding loss generating source, as the linear compressor 100, the mechanical loss is reducible, and the compressor efficiency is improvable.

Furthermore, the magnetic flux 130 from the permanent magnets 125, 126 circulates within the planes of the sheets 111, 113 in the inner yoke 110 and the outer yoke 112. When the magnetic flux 130 circulates within the planes of the sheets 111, 113, an eddy current 131 tends to take place in a direction perpendicular to the magnetic flux 30. This is a current proportional to the square of the magnetic flux density and the square of the thickness of the yoke material. However, owing to the fact that each of the inner yoke 110 and the outer yoke 112 is formed into a prismatic configuration in a manner that a large number of sheets 111 or 113 each having a high magnetic permeability and having an insulated surface are piled up each other, the eddy current hardly takes place to considerably reduce the core loss, which contributes to the improvement of the compressor efficiency.

Besides, because each of the inner yoke 110 and the outer yoke 112 is formed into a prismatic configuration in a manner of simply piling up the large number of sheets 111 or 113, the manufacturing of the linear compressor 100 becomes extremely easy.

Additionally, an Nd—Fe—B based rare earth magnet encounters difficulty in machining, and the cylindrical configuration leads to a high cost because its machining difficulty. In this embodiment, owing to the employment of the flat-plate-like permanent magnets 125, 126 being simple to process, the fabrication of the magnets becomes simplified, which contributes to a reduction of the cost of the magnets, thus leading to the linear compressor cost reduction.

Although in the above description the coil 123 is wound in the outer yoke 112, it is also appropriate that the coil 123 is provided in the inner yoke 110.

Although in the above description the magnetic pole portions are 3 in number, it is also appropriate to assume a configuration in which inner yokes 110, outer yokes 112, magnets 125, 126 and coils 123 are further connected axially in series to each other.

As described above, the linear compressor according to this embodiment comprises prismatic inner yokes 110 each formed by piling up a large number of sheets 111 each having a high magnetic permeability, outer yokes 112 formed by piling up a large number of sheets 113 each having a high magnetic permeability, where two slots 114, 115 are made in the sheets piling-up directions to establish three magnetic pole portions 116, 117, 119 therein, coils 123 each wound around the central magnetic pole portion 117 of the three magnetic pole portions 116, 117, 118 of the outer yoke 112 for alternately establishing different magnetic poles in the three magnetic pole portions 116, 117, 118, a set of yoke blocks 120, 121 each including the inner yoke 110 and the outer yoke 112 and made such that a surface of the outer yoke 112, carrying the magnetic pole portions 116, 117, 118, is placed in an opposed relation to the inner yoke 110 to define a predetermined gap 119 therebetween, a flat-plate-like base 122 for holding the yoke blocks 120, 121 so that their inner yoke 110 sides are in an opposed relation to each other to produce a predetermined space therebetween, a cylinder 102 attached to the base 122 to be positioned at the center of the inner yokes 110, a moving element 124 including pairs of flat-plate-like permanent magnets 125, 126 magnetized in the opposing directions of the inner yokes 110 and the outer yokes 112 and located within the gaps 119 between the inner yokes 110 and the outer yokes 112 in a state of being disposed to define a predetermined interval therebetween so that the magnetization directions are opposite to each other, a piston 103 placed on a tip portion of a shaft 129 constructed integrally with the moving element 124 and inserted into the cylinder 102, and a spring 109 connected to the shaft 120. This construction can improve the efficiency of the linear compressor 100 and facilitate the fabrication thereof.

Twenty-Fourth Embodiment

Figure 23:
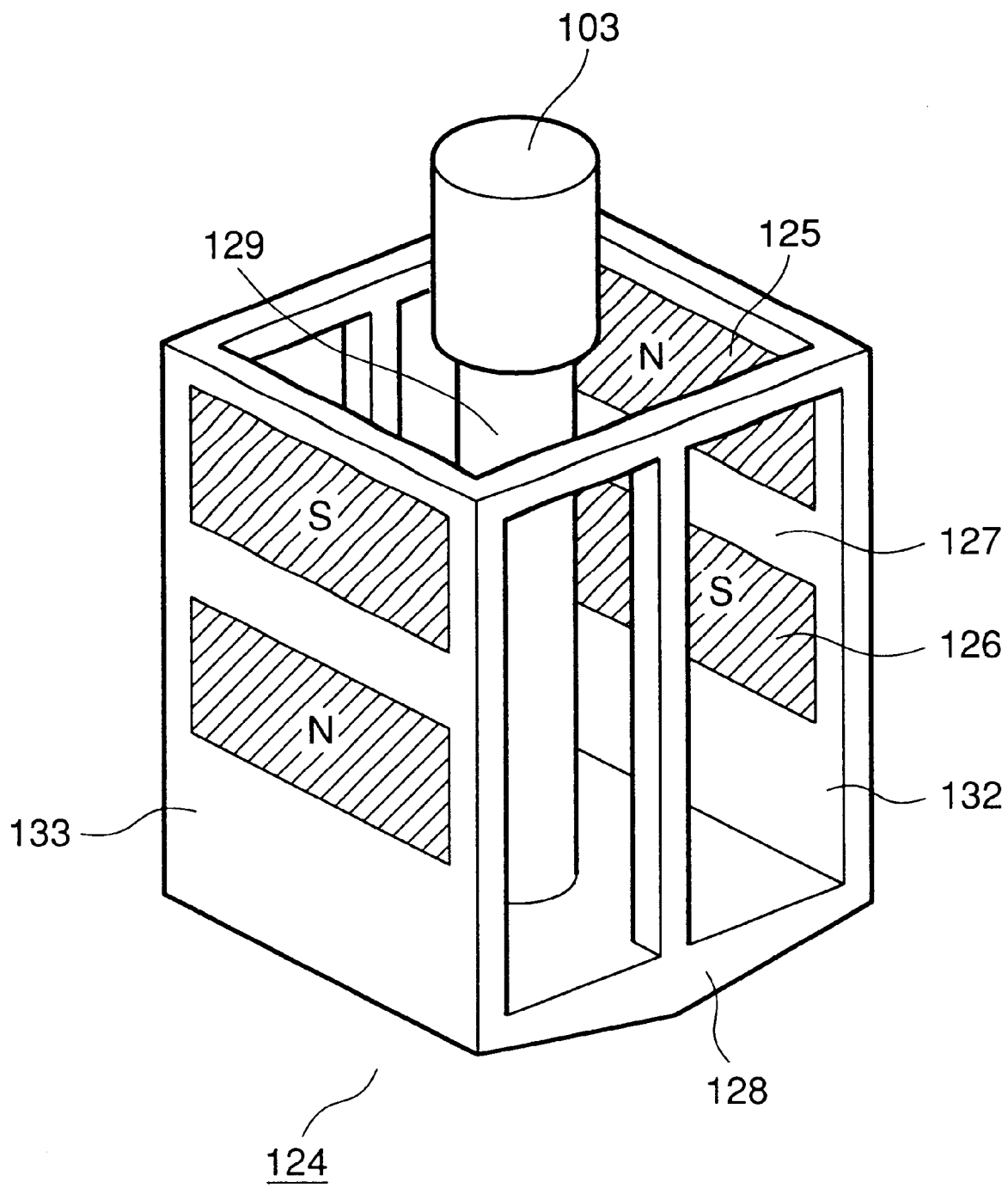
FIG. 23 is a perspective view showing a moving element of a linear compressor according to a twenty-fourth embodiment of this invention.
Figure 24:
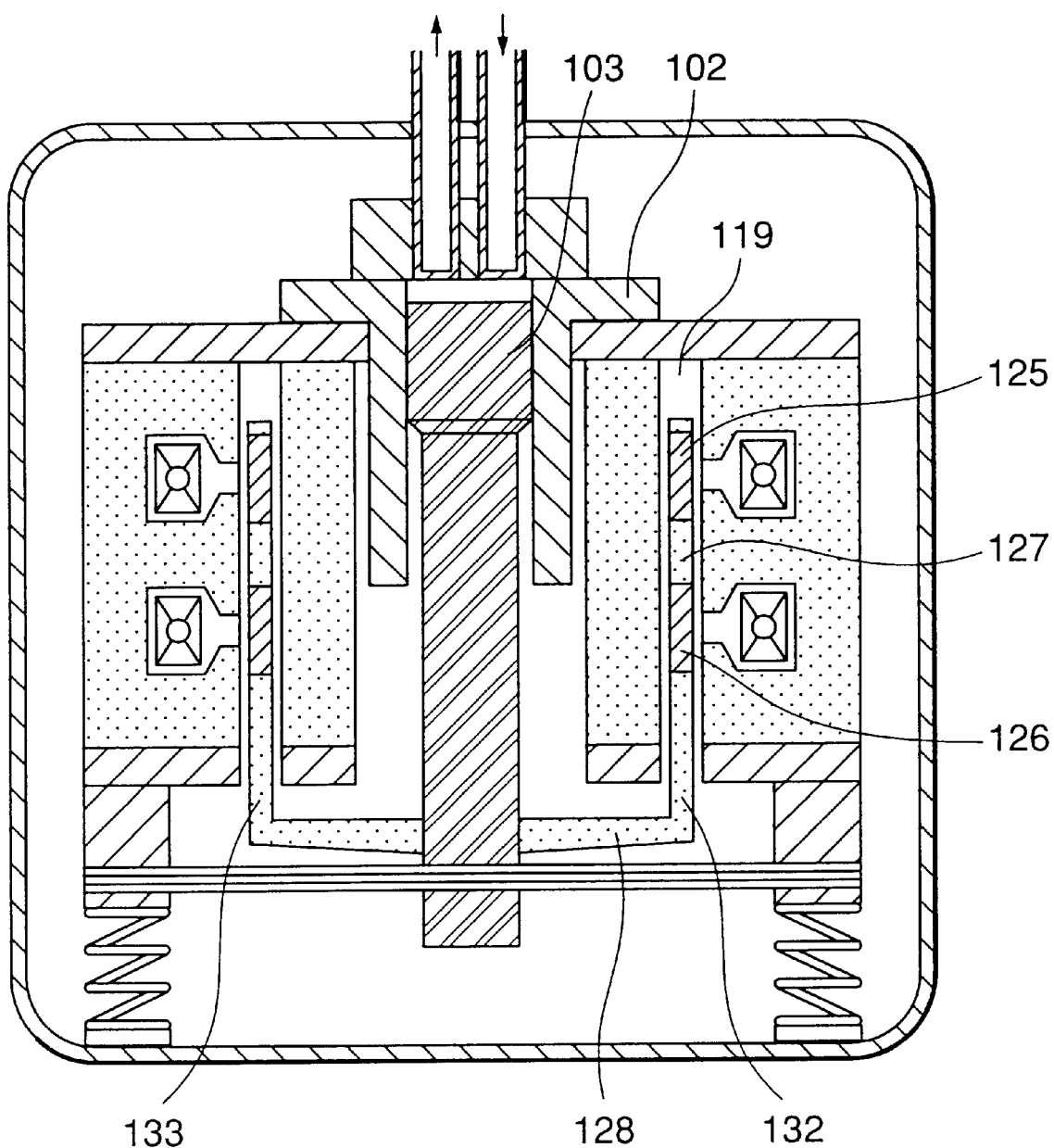
FIG. 24 is a front-elevational cross-sectional view showing the linear compressor including the FIG. 23 moving element.

FIG. 23 is a perspective view showing a moving element (section) of a linear compressor according to a twenty-fourth embodiment of this invention, and FIG. 24 is a front-elevational cross-sectional view showing the linear compressor including the FIG. 23 moving element.

In FIGS. 23 and 24, a moving element 124 is shaped into a generally hexahedral configuration, and each of pairs of flat-plate-like permanent magnets 125, 126 magnetized in directions, each of inner yokes 110 and each of outer yokes 112 face, so that their magnetization directions are opposite to each other, and are placed in each of two sides 132, 133 of the generally hexahedral configuration to be situated between each of the inner yokes 110 and each of the outer yokes 112 in a state of being disposed at a predetermined interval in an axial direction of a piston 103 in a manner that each of permanent magnet supports 127 is interposed therebetween.

The permanent magnet support 127 is made of a non-magnetic material having a high specific resistance. Concretely, a material whose relative magnetic permeability approaches 1 and whose relative resistance is above ten times that of aluminum is preferable. In addition, since the moving element 124 is required to be light in weight, a light-weight ceramics, a resin material having a high Young's modulus or the like are appropriate.

The moving element 124 is connected through a moving element support 128 to a shaft 129 on a side opposite to the piston 103.

A description will be given hereinbelow of an operation of the linear compressor 100 constructed as described above.

When an alternating current is applied to a coil 123, the piston 103 unified through the moving element support 128 to the moving element 124 on the opposite-to-piston side of the shaft 129 reciprocates. Further, when the interior of the compression chamber 105 assumes a low pressure condition, an expanded gas is taken through the suction valve 106 into the compression chamber 105, while, when assuming a high pressure condition, a compressed gas is discharged from the compression chamber 105 through a delivery valve 107, thus serving as a compressor 100.

In the assembling of the linear compressor 100, a cylinder 102 is attached to a base 122 and the piston 103 is fitted into the cylinder 102, and at the same time, the moving element 124 is put in a gap 119 between an inner yoke 110 and an outer yoke 112 in a state where a given clearance is maintained therebetween, and thereafter, a resonance spring 109 is attached to the opposite-to-position side of the shaft 129. Accordingly, this assembling way can make the manufacturing of the linear compressor 100 easy.

In addition, since the moving element 124 is shaped into a generally hexahedral configuration, the moving element 124 exhibits a high structural strength, and can withstand the stresses developed due to the fact that the permanent magnets 125, 126 are attracted by the inner yoke 110 and the outer yoke 112.

Figure 25:
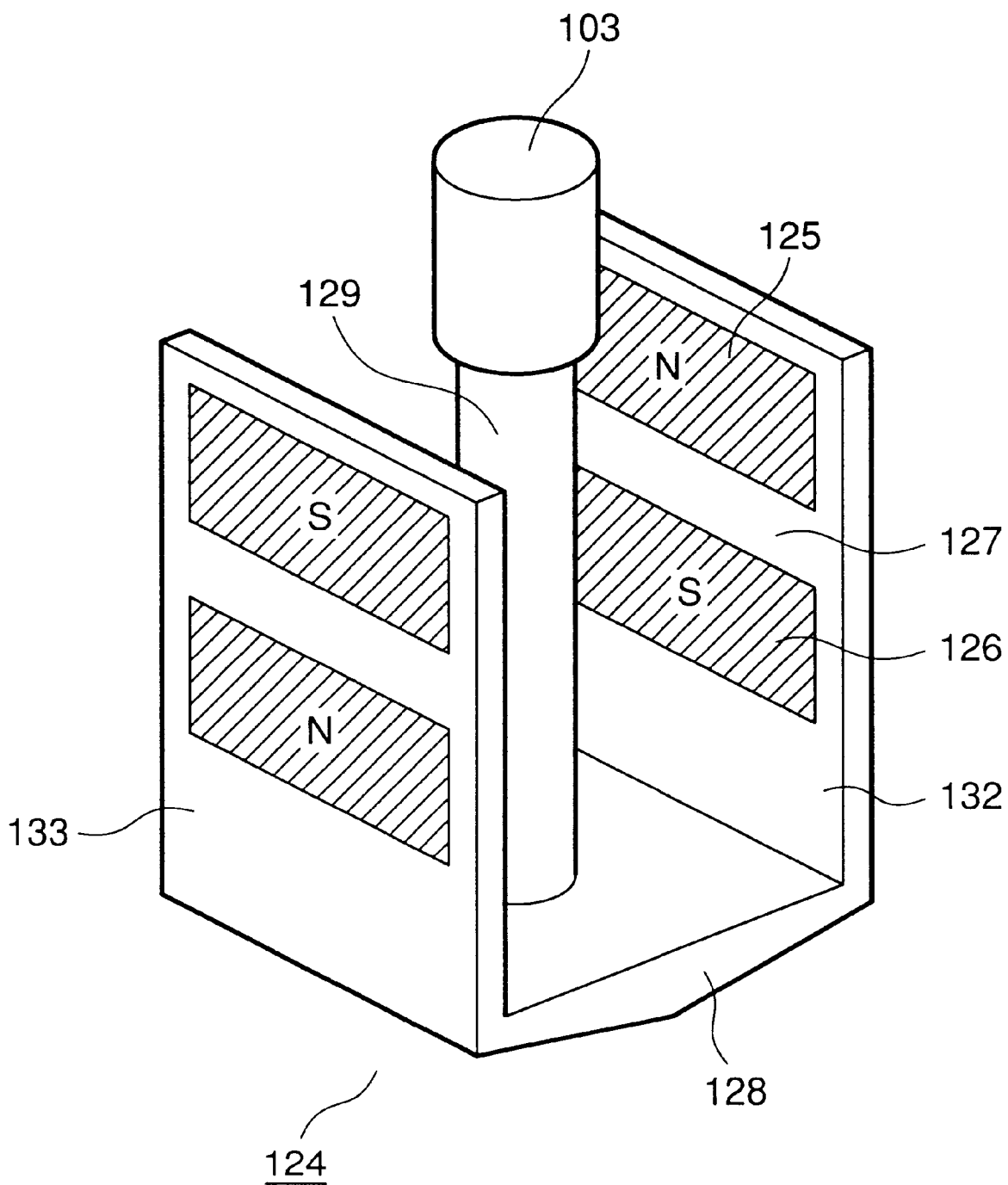
FIG. 25 is a perspective view showing a modification of the twenty-fourth embodiment of this invention.

Although the above description has been made on the example that the moving element 124 is formed into a generally hexahedral configuration, it is also appropriate to employ a generally U-like configuration shown in FIG. 25.

As described above, in the linear compressor 100 according to this embodiment, the moving element 124 is formed into a generally hexahedral configuration, and each of the pairs of flat-plate-like permanent magnets 125, 126 magnetized in the opposing directions of the inner yoke 110 and the outer yoke 112 are placed in each of two sides of the generally hexahedral configuration interposed between the inner yoke 110 and the outer yoke 112 in a state of being disposed at a predetermined interval along the axial direction of the piston 103 so that their magnetization directions are opposite to each other, and the moving element support 128 is provided for making a connection between the moving element 124 and the shaft 129 on a side opposite to the piston 103. This construction makes the manufacturing of the linear compressor 100 easy.

Twenty-Fifth Embodiment

Figure 26:
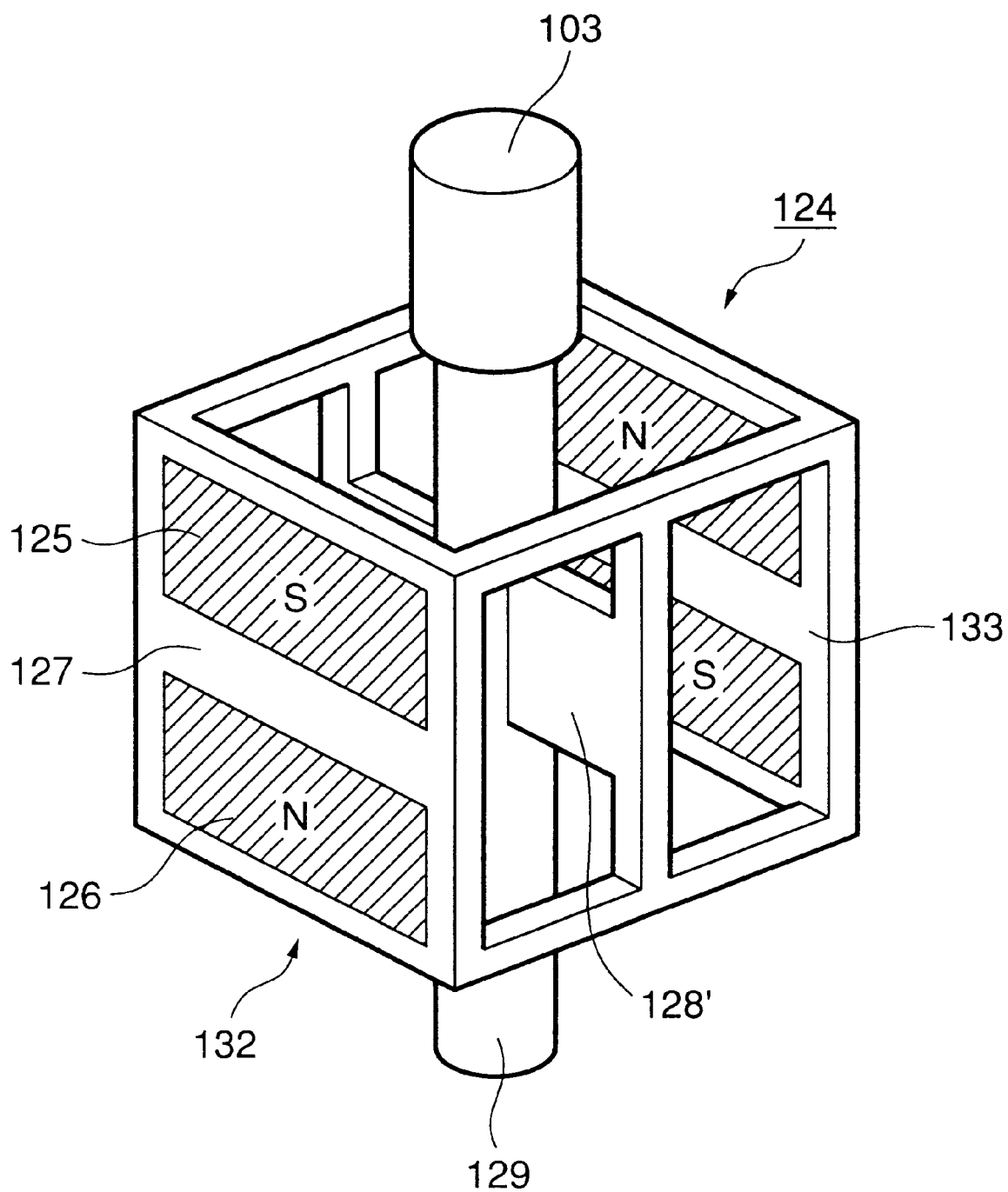
FIG. 26 is a perspective view showing a moving element of a linear compressor according to a twenty-fifth embodiment of this invention.

FIG. 26 is a perspective view showing a moving element of a linear compressor according to a twenty-fifth embodiment of this invention. The construction of this linear compressor is similar as a whole to that shown in FIGS. 21 and 22.

In FIG. 26, a moving element 124 is shaped into a generally hexahedral configuration, and each of pairs of flat-plate-like permanent magnets 125, 126 magnetized in directions, each of inner yokes 110 and each of outer yokes 112 face, so that their magnetization directions are opposite to each other, and are placed in each of two sides 132, 133 of the generally hexahedral configuration to be situated between each of the inner yokes 110 and each of the outer yokes 112 in a state of being disposed at a predetermined interval in an axial direction of a piston 103 in a manner that each of permanent magnet supports 127 is interposed therebetween.

The permanent magnet support 127 is made of a non-magnetic material having a high specific resistance. Concretely, a material whose relative magnetic permeability approaches 1 and whose relative resistance is above ten times that of aluminum is preferable. In addition, since the moving element 124 is required to be light in weight, a light-weight ceramics, a resin material having a high Young's modulus or the like are appropriate.

The moving element 124 is connected through a moving element support 128' to a shaft 129.

A description will be given hereinbelow of an operation of the linear compressor 100 constructed as described above.

When an alternating current is applied to a coil 123, the piston 103 unified through the moving element support 128' to the moving element 124 in an inside section of the moving element 124 reciprocates. Further, when the interior of the compression chamber 105 assumes a low pressure condition, an expanded gas is taken through the suction valve 106 into the compression chamber 105, while, when assuming a high pressure condition, a compressed gas is discharged from the compression chamber 105 through a delivery valve 107, thus serving as a compressor 100.

Since the moving element 124 is connected through the moving element support 128' to the shaft 129 within a space 135 between both the inner yokes 110, even when the moving element 124 reciprocates, the moving position of the moving element 124 is within a range of the height of the inner yokes 110. Accordingly, the size reduction of the linear compressor 100 is possible in the direction of its height.

In addition, since the moving element 124 is unified to the shaft 129 mat its central section, its structural balance becomes excellent, and its structure becomes firmer.

As described above, in the linear compressor 100 according to this embodiment, the moving element 124 is shaped into a generally hexahedral configuration, and each of the pairs of flat-plate-like permanent magnets 125, 126 magnetized in the opposing directions of the inner yoke 110 and the outer yoke 112 are placed in each of two sides of the generally hexahedral configuration interposed between the inner yoke 110 and the outer yoke 112 in a state of being disposed at a predetermined interval along the axial direction of the piston 103 so that their magnetization directions are opposite to each other, and the moving element support 128' is provided in a space between both the inner yokes 110 for making a connection between the moving element 124 and the shaft 129. This construction permits the size reduction of the linear compressor 100 in its height directions, and offers a firmer structure.

Twenty-Sixth Embodiment

A linear compressor according to this embodiment is similar in construction as a whole to that shown in FIGS. 21 and 22, and hence, a description of the linear compressor according to this embodiment will be made hereinbelow with reference to FIGS. 21 and 22.

In FIGS. 21 and 22, a linear compressor 100 is made up of a cylinder 1022, a piston 103 inserted into the cylinder 102 to be allowed to reciprocate, a compression chamber 105 defined to face a head 104 of the piston 103, and a suction valve 106 and delivery valve 107 opening and closing in accordance with a gas pressure within the compression chamber 105.

The cylinder 102 is attached to a base 122 constituting a linear motor 108. Two yoke blocks 120, 121 comprising inner yokes 110 and outer yokes 112 of the linear motor 108 are disposed in an opposed relation to each other so that a predetermined interval is defined between the inner yoke 110 sides, and held on the flat-plate-like base 122. In this case, the inner yokes 110 and the outer yokes 112 are designed not to come into contact with other than the base 122, that is, do not come into contact with the cylinder 102 and others made of an iron-based material.

In the linear compressor 100 thus constructed, a magnetic flux 130 generated from the N pole of a permanent magnet 126 goes through a gap 119, the outer yoke 112, the gap 119, the S pole of a permanent magnet 125, the N pole of a permanent magnet 125, the inner yoke 110 and the gap 119 to return to the S pole of the permanent magnet 126, and further, develops a static magnetic field in the gap 119. In the inner yokes 110 and the outer yokes 112, it circulates in the planes of sheets 111, 113 of the inner yokes 110 and the outer yokes 112.

While the inner yokes 110 and the outer yokes 112 are brought into contact with the base 122, the base 22 is made of a non-magnetic material, and therefore, the magnetic flux flowing in the inner yokes 110 and the outer yokes 112 does not circulate in the base 122, so that an iron loss by an unnecessary eddy current does not occur in the base 122.

In addition, since the inner yokes 110 and the outer yokes 112 do not contact with other than the base 122, an iron loss by an unnecessary eddy current does not occur in iron-based members such as the cylinder 102.

As described above, the linear compressor 100 according to this embodiment is made such that the inner yoke 110 and the outer yoke 112 do not come into contact with other than the base 122, and therefore, the iron loss in the linear compressor 100 is reducible, thus enhancing the linear compressor efficiency.

Twenty-Seventh Embodiment

Figure 27:
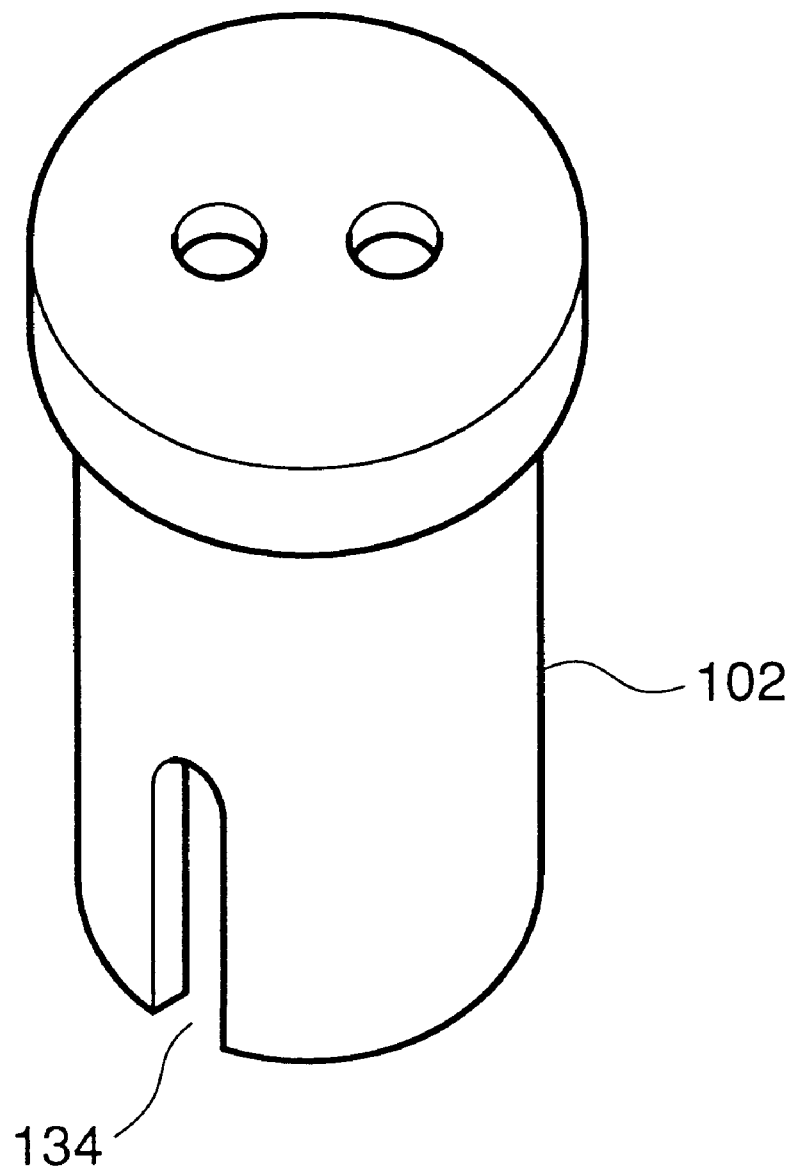
FIG. 27 is a perspective view showing a cylinder of a linear compressor according to a twenty-seventh embodiment of this invention.

FIG. 27 is a perspective view showing a cylinder of a linear compressor according to a twenty-seventh embodiment of this invention. The construction of the linear compressor according to this embodiment is similar as a whole to that shown in FIGS. 21 and 22.

This embodiment is to improve the configuration of the cylinder 102 of the linear compressor 100 according to the above-described twenty-third embodiment of this invention. The other construction is the same as that of the twenty-third embodiment, and the description thereof will be omitted for brevity.

In FIG. 27, in the cylinder 102, a slit 134 is made axially in order to prevent the moving element support 128 from coming into contact with the cylinder 102 when the moving element 124 reciprocates. Thus, even if the moving element 124 reciprocates together with the reciprocation of the piston 103, the moving element support 128 of the moving element 124 does not come into contact with the cylinder 102 or does not run against it.

As described above, in the linear compressor according to this embodiment, the slit 134 is made axially in the cylinder 102 to prevent the moving element support 128 from coming into the cylinder 102 when the moving element reciprocates, which raises its reliability.

Twenty-Eighth Embodiment

Figure 28:
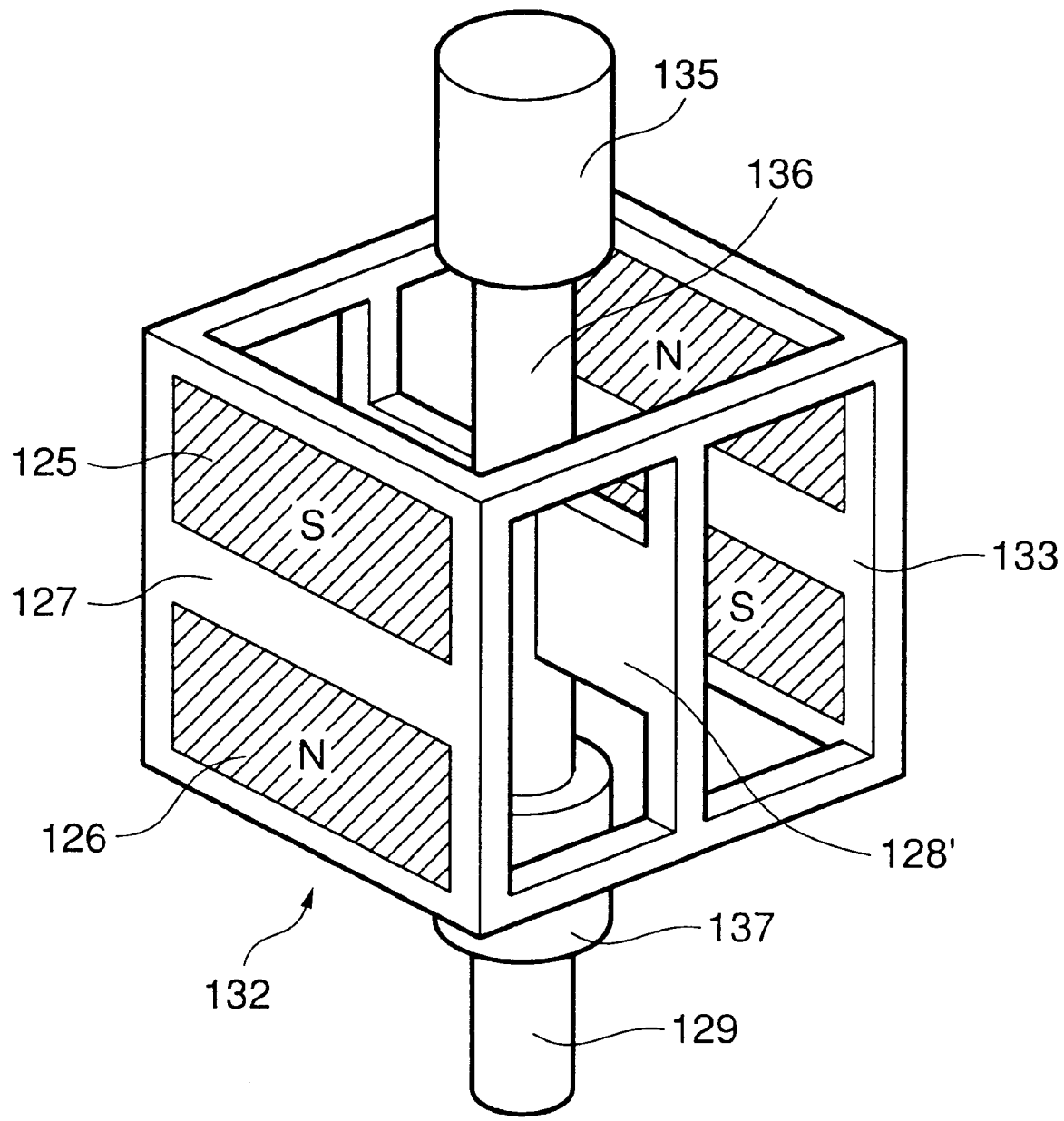
FIG. 28 is a perspective view showing a moving element of a linear compressor according to a twenty-eighth embodiment according to this invention.
Figure 29:
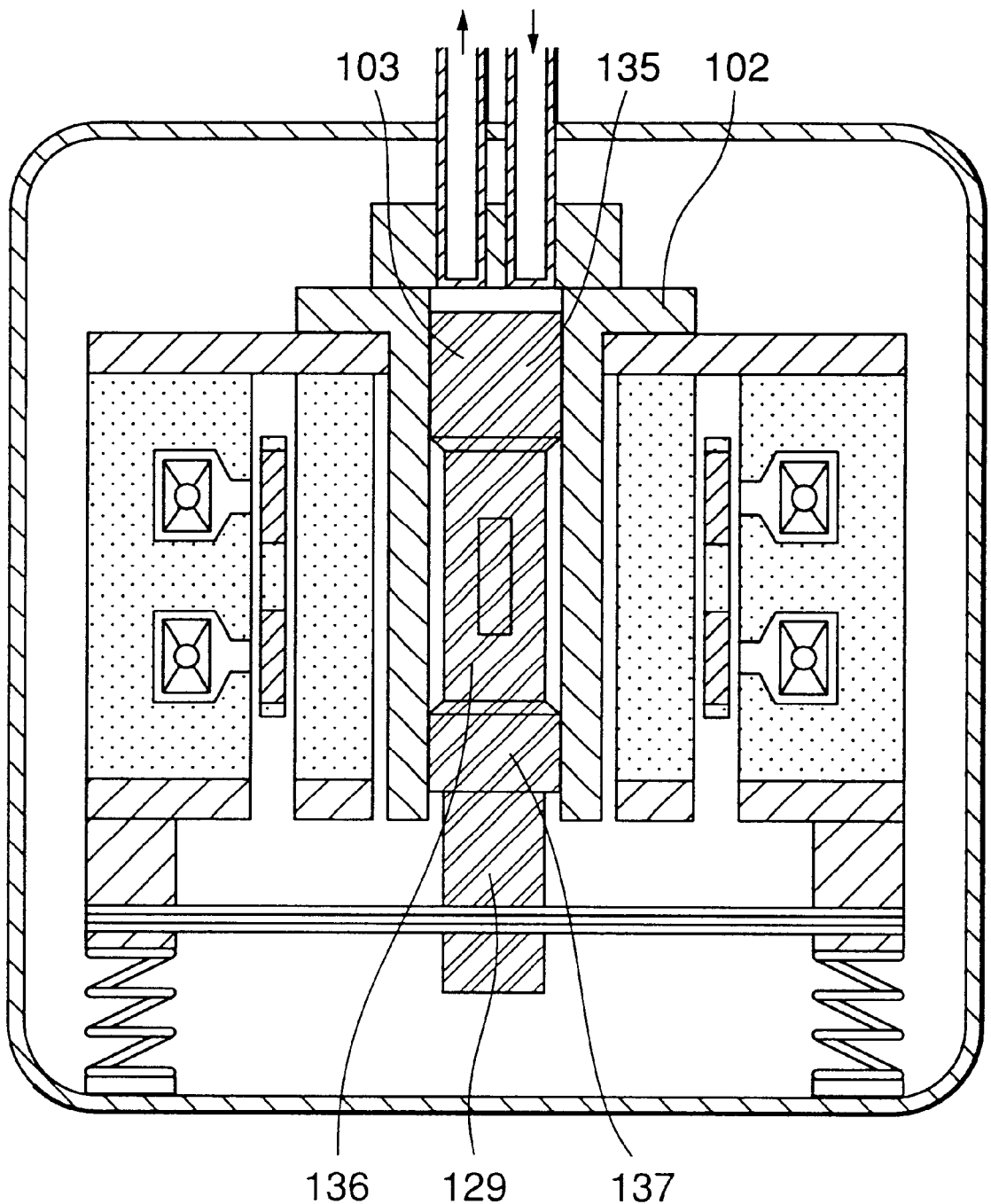
FIG. 29 is a front-elevational cross-sectional view showing the linear compressor according to the twenty-eighth embodiment.

FIG. 28 is a perspective view showing a moving element of a linear compressor according to a twenty-eighth embodiment according to this invention, and FIG. 29 is a front-elevational cross-sectional view showing the linear compressor according to the twenty-eighth embodiment.

In FIGS. 28 and 29, a moving element 124 is shaped into a generally hexahedral configuration, and each of pairs of flat-plate-like permanent magnets 125, 126 magnetized in directions, each of inner yokes 110 and each of outer yokes 112 face, so that their magnetization directions are opposite to each other, and are placed in each of two sides 132, 133 of the generally hexahedral configuration to be situated between each of the inner yokes 110 and each of the outer yokes 112 in a state of being disposed at a predetermined interval in an axial direction of a piston 103 in a manner that each of permanent magnet supports 127 is interposed therebetween.

In this embodiment, the piston 103 includes a first sliding section 135 formed at its tip portion, a non-sliding section 136 following the first sliding section 135 and made by making the diameter of the piston 103 smaller, and a second sliding section 137 following the non-sliding section 136, with a moving element support 128' for making a connection between the moving element 124 and the piston 103 being located on the non-sliding section 136.

A description will be made hereinbelow of an operation of the linear compressor 100 thus constructed.

When an alternating current is applied to a coil 123, the piston 103 unified through the moving element support 128' to the moving element 124 in a space between both the inner yokes 110 reciprocates. Further, when the interior of the compression chamber 105 assumes a low pressure condition, an expanded gas is taken through the suction valve 106 into the compression chamber 105, while, when assuming a high pressure condition, a compressed gas is discharged from the compression chamber 105 through a delivery valve 107, thus serving as a compressor 100.

When the piston 103 takes the reciprocating action, the second sliding section 137 moves while sliding within the cylinder 102 in conjunction with the first sliding section 135 and the non-sliding section 136. That is, this signifies that two bearings comprising the first sliding section 135 and the second sliding section 137, respectively, exist at upper and lower positions, so that the moving element 124 can assume an extremely stable axial movement, and the sliding loss is reducible to improve the linear compressor efficiency.

In assembling the linear compressor 100, the cylinder 102 is attached to a base 122 and the piston 103 is inserted into the cylinder 102, and at the same time, the moving element 124 is put in a space 119 between an inner yoke 110 and an outer yoke 112, and thereafter, a resonance spring 109 is set to an opposite-to-piston side of a shaft 129. In this case, through the first sliding section 135 and the non-sliding section 136, the second sliding section 137 is inserted while sliding within the cylinder 102. At this time, since the two bearings exist up and down, at the insertion of the piston 103 into the cylinder 102, the eccentricity of its axis does not occur, and the assembling becomes easy. Accordingly, the manufacturing of the linear compressor 100 becomes facilitated.

As described above, in the linear compressor according to this embodiment, the piston 103 is composed of a first sliding section 135 formed at its tip portion, a non-sliding section 136 following the first sliding section 135 and having a smaller diameter in the piston 103, and a second sliding section 137 following the non-sliding section 136, and the support 128' for connecting the moving element 124 to the piston 103 is placed on the non-sliding section 137. With this construction, the piston 103 becomes stable in movement and the sliding loss comes down, which contributes to the improvement of the efficiency of the linear compressor 100, and the manufacturing becomes easy.

Twenty-Ninth Embodiment

Figure 30:
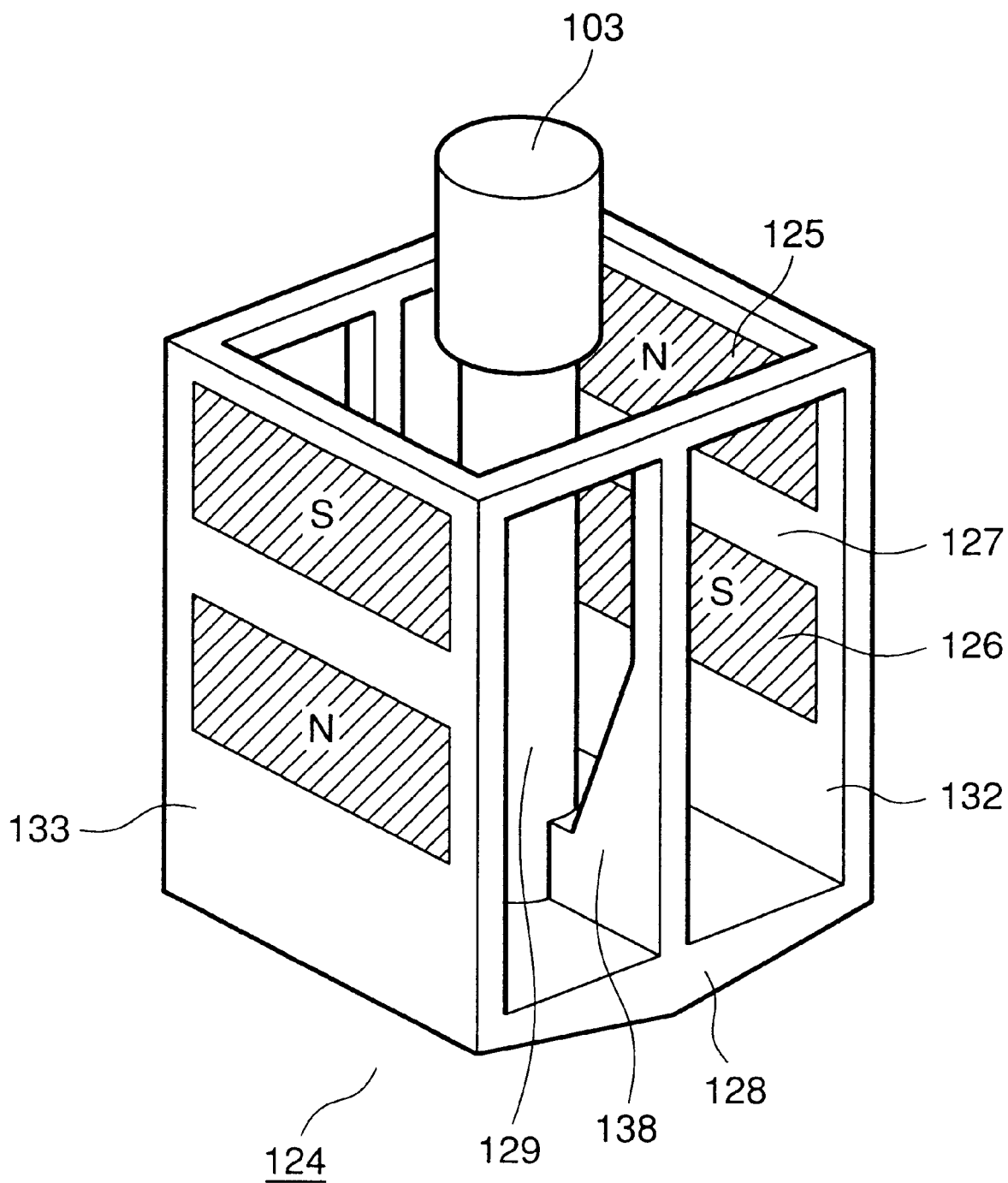
FIG. 30 is a perspective view showing a moving element of a linear compressor according to a twenty-ninth embodiment of this invention.

FIG. 30 is a perspective view showing a moving element of a linear compressor according to a twenty-ninth embodiment of this invention. The construction of this linear compressor is similar as a whole to that shown in FIG. 24.

In FIGS. 30 and 24, a moving element 124 is shaped into a generally hexahedral configuration, and each of pairs of flat-plate-like permanent magnets 125, 126 magnetized in directions, each of inner yokes 110 and each of outer yokes 112 face, so that their magnetization directions are opposite to each other, and are placed in each of two sides 132, 133 of the generally hexahedral configuration to be situated between each of the inner yokes 110 and each of the outer yokes 112 in a state of being disposed at a predetermined interval in an axial direction of a piston 103 in a manner that each of permanent magnet supports 127 is interposed therebetween.

Furthermore, the permanent magnet support 127 of the moving element 124 is made of a non-magnetic material showing a high specific resistance. In detail, a material whose relative magnetic permeability approaches 1 and whose specific resistance is more than ten times that of aluminum. Since the moving element 124 is needed to be light in weight, a light-weight ceramics, a resin material having a high Young's modulus or the like are appropriate.

The moving element 124 is connected through the moving element support 128 to the shaft 129 on the opposite-to-position side of the shaft 129. Further, a reinforcement 138 for making a connection between the moving element 124 and the shaft 129 is additionally provided at a side (surface) of the generally hexahedral configuration other than the two sides put between the inner yokes 110 and the outer yokes 112.

A description will be made hereinbelow of an operation of the linear compressor 100 thus constructed.

When an alternating current is applied to a coil 123, the piston 103 unified through the moving element support 128 to the moving element 124 on the opposite-to-piston side of the shaft 129 reciprocates. Further, when the interior of the compression chamber 105 assumes a low pressure condition, an expanded gas is taken through the suction valve 106 into the compression chamber 105, while, when assuming a high pressure condition, a compressed gas is discharged from the compression chamber 105 through a delivery valve 107, thus serving as a compressor 100.

In assembling the linear compressor 100, the cylinder 102 is attached to a base 122 and the piston 103 is inserted into the cylinder 102, and at the same time, the moving element 124 is put in a space 119 between an inner yoke 110 and an outer yoke 112 in a state where a predetermined clearance is maintained, and thereafter, a resonance spring 109 is set to an opposite-to-piston side of a shaft 129. In this case, through the first sliding section 135 and the non-sliding section 136, the second sliding section 137 is inserted while sliding within the cylinder 102. Accordingly, the manufacturing of the linear compressor 100 becomes facilitated.

Moreover, since the moving element 124 is shaped into a generally hexahedral configuration, and the reinforcement 138 for making a connection between the moving element 124 and the shaft 129 is additionally provided on a side (surface) of the generally hexahedral configuration other than the two sides put between the inner yokes 110 and the outer yokes 112, the moving element 124 becomes structurally firm, and sufficiently withstands the stress due to the attraction of the permanent magnets 125, 126 by the inner yokes 110 and the outer yokes 112.

As described above, in the linear compressor 100 according to this embodiment, in the moving element 124, the reinforcement 138 for making a connection between the moving element 124 and the shaft 129 is additionally provided on a side (surface) of the generally hexahedral configuration other than the two sides put between the inner yokes 110 and the outer yokes 112. This can offer a firmer structure.

Thirtieth Embodiment

Figure 31:
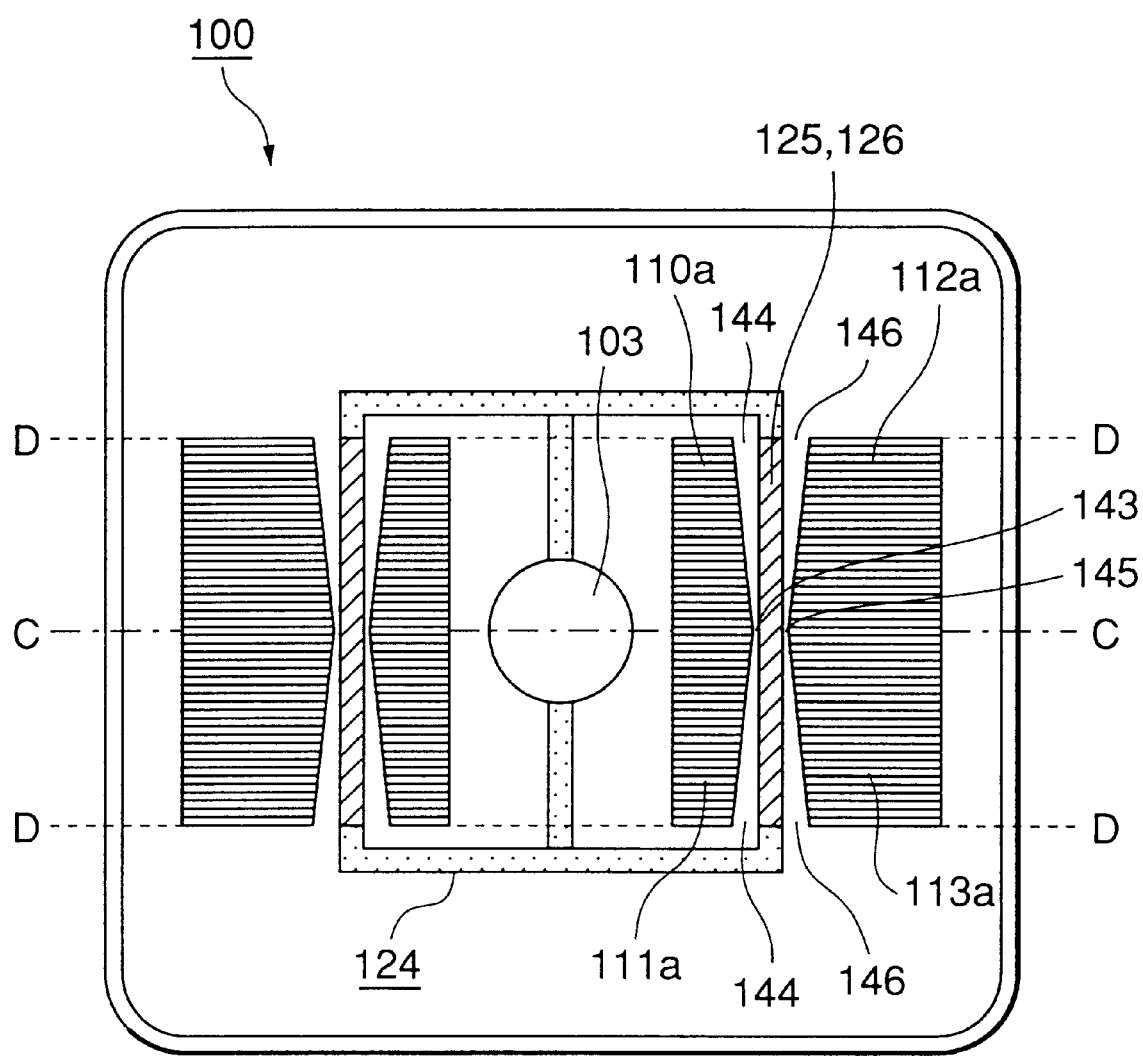
FIG. 31 is a plan cross-sectional view showing a linear compressor according to a thirtieth embodiment of this invention.
Figure 32:
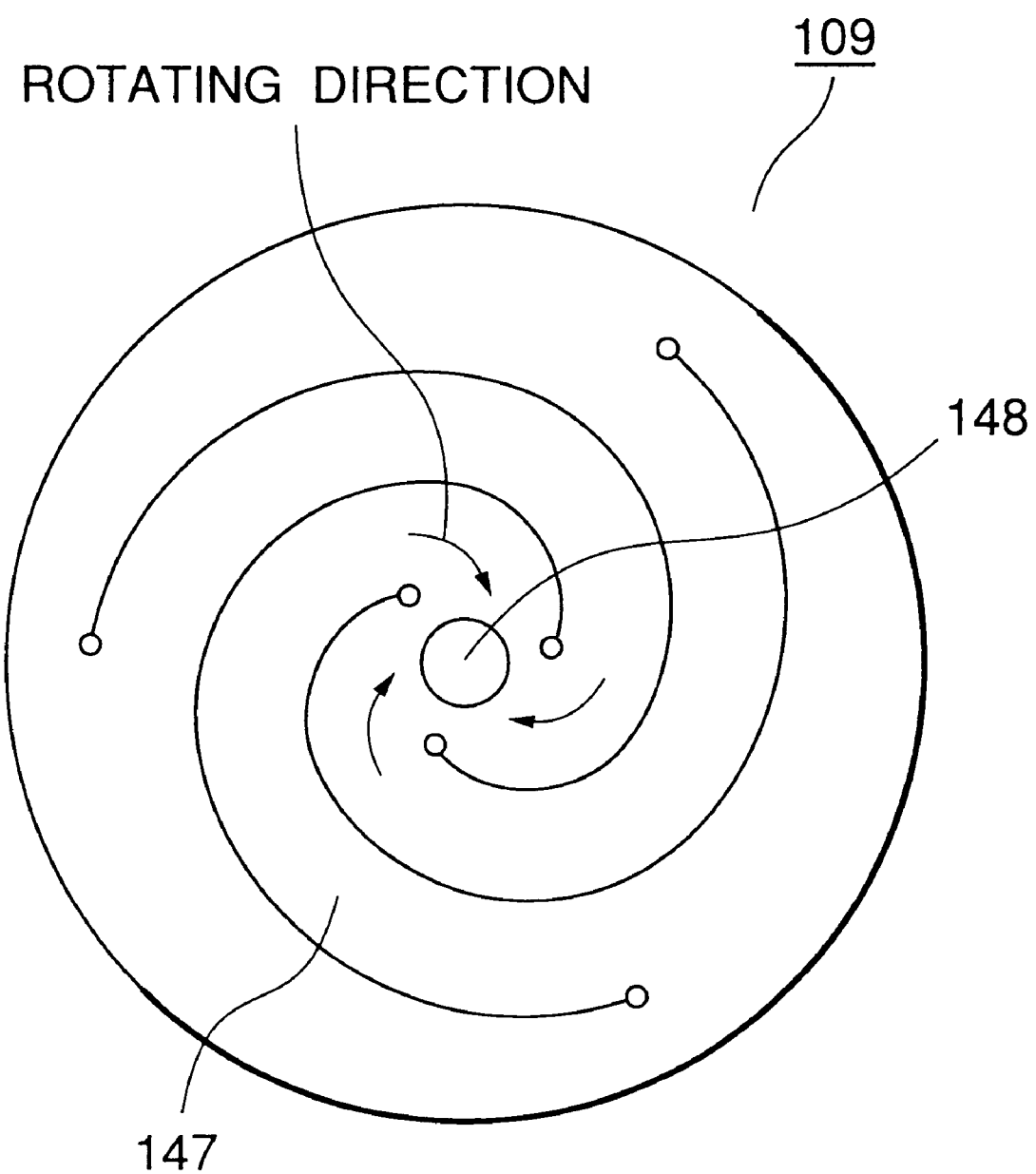
FIG. 32 is a plan view showing one example of a plate spring.
Figure 33:
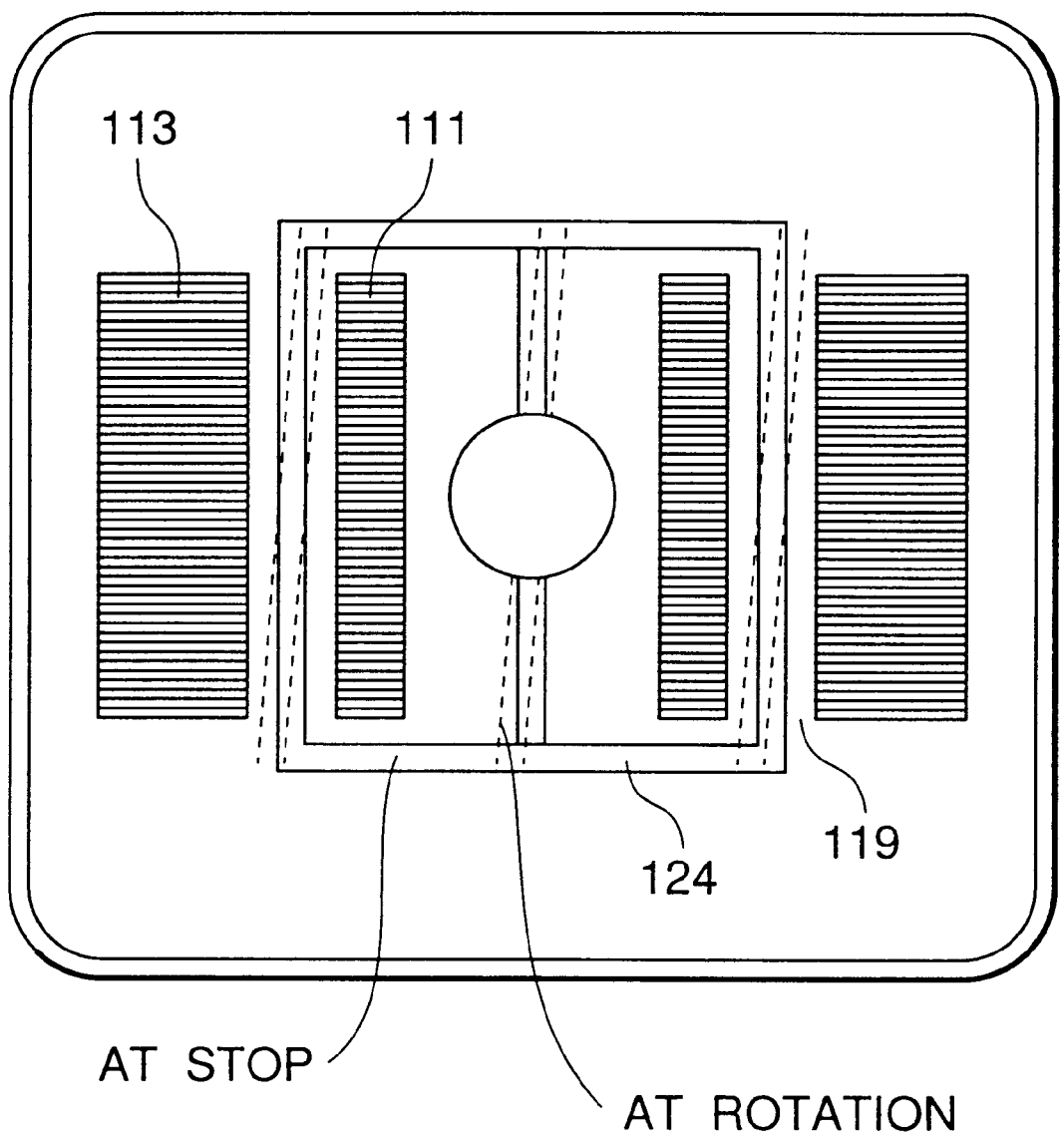
FIG. 33 is a plan cross-sectional view showing a linear compressor for describing the effects of the thirtieth embodiment.

FIG. 31 is a plan cross-sectional view showing a linear compressor according to a thirtieth embodiment of this invention. The front-elevational cross-sectional view of the linear motor of FIG. 31 is similar to FIG. 22. Further, FIG. 32 is a plan view showing one example of a plate spring, and FIG. 33 is a plan cross-sectional view showing a linear compressor for describing the effects of this embodiment.

This embodiment relates to the improvement of the configurations of inner yokes 110 and outer yokes 112 of the linear compressor 100 according to the twenty-third embodiment, and the other construction of the linear compressor 100 according to this embodiment is the same as that of the twenty-third embodiment, and hence, the description thereof will be omitted for simplicity.

In FIG. 31, each of inner yokes 110a is made such that a gap width (distance) 144 between the inner yoke 110a and permanent magnets 125, 126 gradually widens from a central position C—C toward both end positions D—D in piling-up directions of sheets 11a of the inner yoke 110a, that is, enlarges gradually with respect to a gap width (distance) 143 between the inner yoke 110a and the permanent magnets 125, 126 at the central position C—C.

In addition, each of outer yokes 112a is made such that a gap width 146 between the outer yoke 112a and the permanent magnets 125, 126 gradually widens from the central position C—C toward both the end positions D—D in piling-up directions of sheets 113a of the outer yoke 112a, that is, enlarges with respect to a gap width 145 between the outer yoke 112a and the permanent magnets 125, 126 at the central position C—C.

A description will be made hereinbelow of an operation of the linear compressor 100 constructed above described above.

On supply of an alternating current to a coil 123, a piston 103 constructed integrally with a moving element 124 reciprocates. Further, when the interior of a compression chamber 105 assumes a low pressure condition, an expanded gas is taken through a suction valve 106 into the compression chamber 105, while, when assuming a high pressure condition, a compressed gas is discharged from the compression chamber 105 through a delivery valve 107, thus serving as a compressor 100.

FIG. 32 shows a plate spring 109 such as a spiral type. When the plate spring 109 reciprocates concurrently with the reciprocating action of the position 103, a central axis 148 of the plate spring 109 rotates in a direction toward the center of an arm 147. Since the plate spring 109 is attached onto a shaft 129 and a moving element 124 is also attached to the shaft 129, the axis of the moving element 124 also rotates simultaneously with the axis rotation of the plate spring 109 as shown in FIG. 33.

A magnetic flux 130 emitted from the N pole of the permanent magnet 126 passes through a gap 119, the outer yoke 112a, the gap 119, the S pole of a permanent magnet 125, the N pole of a permanent magnet 125, the inner yoke 110a and the gap 119 to return to the S pole of the permanent magnet 126, and further, develops a static magnetic field in the gap 119. In the inner yokes 110a and the outer yokes 112a, it circulates in the planes of sheets 111a, 113a of the inner yokes 110a and the outer yokes 112a. In this case, when the width (distance) of the gap 119 enlarges, the magnetic flux density decreases in the gap 119, and for this reason, the thrust of the linear compressor 100 decreases. Thus, the width of the gap 119 is preferable to be as small as possible.

In the case that a plate spring is employed as the resonance spring, if, as shown in FIG. 33, the inner yoke and the outer yoke are formed into a prismatic configuration as taken in the above-described embodiments without being formed as the inner yoke 110a and the outer yoke 112a in this embodiment, since the plate spring 109 reciprocates simultaneously with the reciprocation of the piston 103, there is a need to enlarge the width 119 between the outer yoke 110 and the outer yoke 112 by a value corresponding to the rotation of the plate spring 109 in order to prevent the plate spring 109 from running into the inner yoke 110 and the outer yoke 112 when the axis of the plate spring 109 rotates.

For this reason, the inner yoke 110a and the outer yoke 112a are constructed such that the gap width 144 between the inner yoke 110a and permanent magnets 125, 126 and the gap width 146 between the outer yoke 112a and the permanent magnets 125, 126 gradually widen from the central position C—C toward both the end positions D—D in the piling-up directions of the sheets 111a of the inner yoke 110a and in the piling-up directions of the sheets 113a of the outer yoke 112a with respect to the gap width 143 between the inner yoke 110a and the permanent magnets 125, 126 at the central position C—C and the gap width 145 between the outer yoke 112a and the permanent magnets 125, 126 at the central position C—C in the piling-up directions of the sheets 111a and 113a of the inner yoke 110a and the outer yoke 112a, respectively, that is, the configuration of the inner yoke 110a and the outer yoke 112a are determined to the rotational angle of the plate spring 109.

Accordingly, even if the axis of the plate spring 109 rotates resulting from the fact that the plate spring 109 reciprocates concurrently with the reciprocation of the piston 103, the moving element 124 can be prevented from colliding against the inner yoke 110a and the outer yoke 112a.

In addition, the gap widths between the inner yoke 110a and the permanent magnets 125, 126 and between the outer yoke 112a and the permanent magnets 125, 126 are reducible averagely, and the influence of the drop of the magnetic flux density becomes less, and further, the fall of the thrust of the linear compressor 100 is suppressible.

Besides, if each of the inner yoke 110a and the outer yoke 112a is divided at the central position C—C into two sections, the result is equivalent to a combination of two divided yokes identical in configuration, which contributes to the facilitation of the fabrication of the linear compressor 100.

As described above, in the linear compressor 100 according to this embodiment, the inner yoke 110a is constructed such that the gap width 144 between the inner yoke 110a and the permanent magnets 125, 126 gradually widens from the central position C—C toward both the end positions D—D in the piling-up directions of the sheets 111a of the inner yoke 110a with respect to the gap width 143 between the inner yoke 110a and the permanent magnets 125, 126 at the central position C—C, and the outer yoke 112a is constructed such that the gap width 146 between the outer yoke 112a and the permanent magnets 125, 126 gradually widens from the central position C—C toward both the end positions D—D in the piling-up directions of the sheets 113a of the outer yoke 112a with respect to the gap width 145 between the outer yoke 112a and the permanent magnets 125, 126 at the central position C—C, and therefore, even when the plate spring 109 rotates at the reciprocation of the piston 103, the moving element 124 does not collide against the inner yoke 110a and the outer yoke 112a, and the fall of the thrust of the linear compressor 100 is suppressible.

Thirty-First Embodiment

Figure 34:
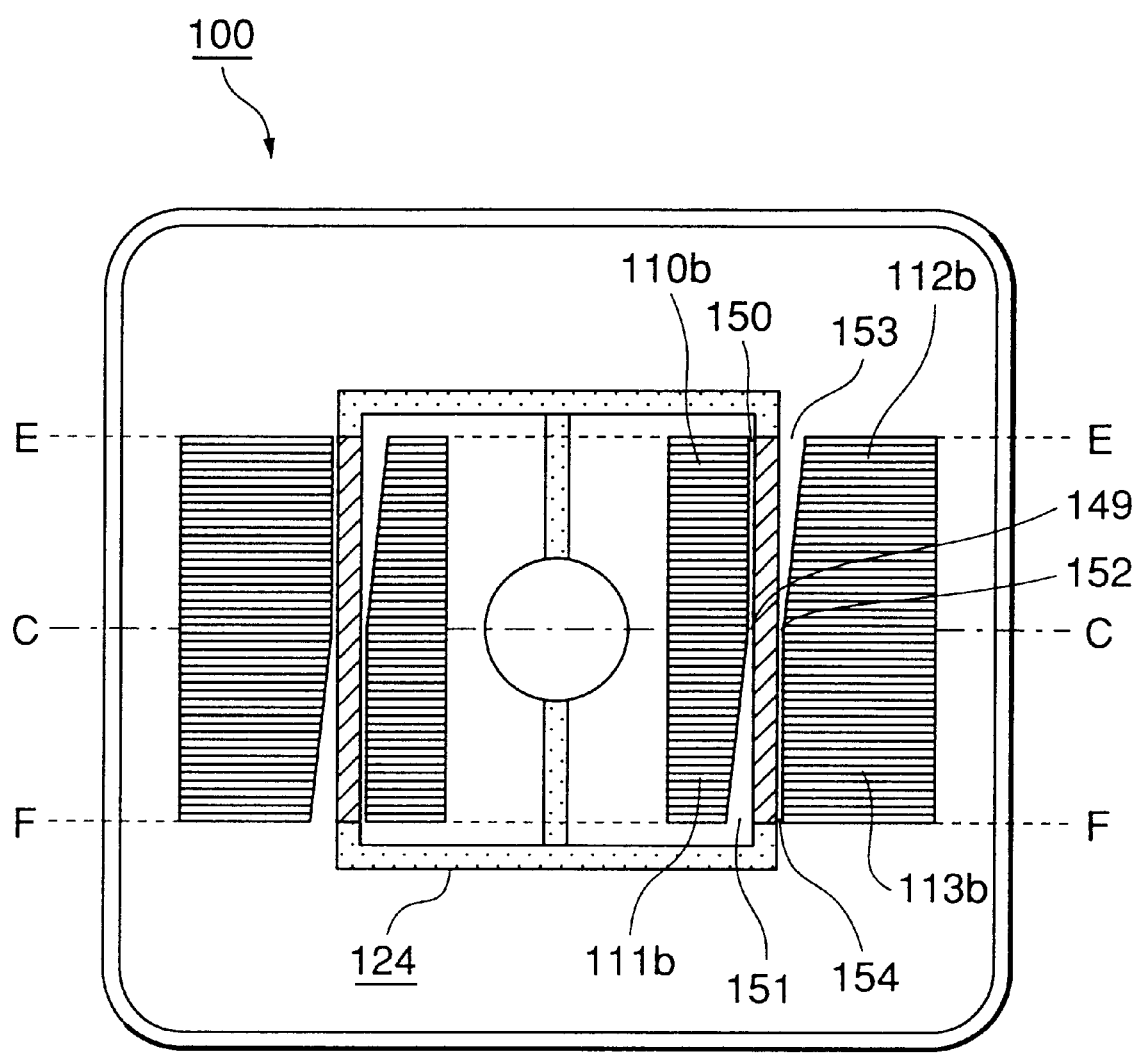
FIG. 34 is a plan cross-sectional view showing a linear compressor according to a thirty-first embodiment of this invention.

FIG. 34 is a plan cross-sectional view showing a linear compressor according to a thirty-first embodiment of this invention. The front-elevational cross-sectional view of this linear compressor is similar to that of FIG. 22. Further, the structure of its plate spring is similar to that shown in FIG. 32.

This embodiment relates to the improvement of the configurations of inner yokes 110 and outer yokes 112 of the linear compressor 100 according to the twenty-third embodiment, and the other construction of the linear compressor 100 according to this embodiment is the same as that of the twenty-third embodiment, and hence, the description thereof will be omitted for simplicity.

In FIG. 34, one of inner yokes 110b is made such that a gap width 149, 150 between the inner yoke 110b and permanent magnets 125, 126 is constant in a range from a central position C—C to one end position E—E in piling-up directions of sheets 111b of the inner yoke 110b, but a gap width 149, 151 between the inner yoke 110b and the permanent magnets 125, 126 gradually enlarges from the central position C—C toward the other end position F—F in the sheets 111b piling-up directions. Thus, the configuration of the inner yoke 110b is determined to the rotational angle of the plate spring 109. On the other hand, the other inner yoke 110b produces a gap width being constant in the range from the central position C—C to the other end position F—F and creates a gap width gradually enlarging from the central position C—C toward the one end position E—E.

Furthermore, one of outer yokes 112b is made such that a gap width 152, 153 between the outer yoke 112b and the permanent magnets 125, 126 gradually enlarges from the central position C—C toward the one end position E—E in piling-up directions of sheets 113b of the outer yoke 112b and a gap width 152, 154 between the outer yoke 112b and the permanent magnets 125, 126 is constant in a range from the central position C—C to the other end position F—F in the sheets 113b piling-up directions. Likewise, the configuration of the outer yoke 112b is determined to the rotational angle of the plate spring 109. On the other hand, the other outer yoke 112b produces a gap width being constant in the range from the central position C—C to the one end position E—E and creates a gap width gradually enlarging from the central position C—C toward the other end position F—F.

On supply of an alternating current to a coil 123, a piston 103 constructed integrally with a moving element 124 reciprocates. Further, when the interior of a compression chamber 105 assumes a low pressure condition, an expanded gas is taken through a suction valve 106 into the compression chamber 105, while, when assuming a high pressure condition, a compressed gas is discharged from the compression chamber 105 through a delivery valve 107, thus serving as a compressor 100.

In this instance, a plate spring 109 is of a spiral type shown in FIG. 32. When the plate spring 109 reciprocates concurrently with the reciprocating action of the position 103, the central axis 148 of the plate spring 109 rotates in a direction toward the center of the arm 147. Since the plate spring 109 is attached onto a shaft 129 and a moving element 124 is also attached to the shaft 129, the axis of the moving element 124 also rotates simultaneously with the axis rotation of the plate spring 109 as shown in FIG. 33.

A magnetic flux 130 emitted from the N pole of the permanent magnet 126 passes through a gap 119, the outer yoke 112b, the gap 119, the S pole of a permanent magnet 125, the N pole of a permanent magnet 125, the inner yoke 110b and the gap 119 to return to the S pole of the permanent magnet 126, and further, develops a static magnetic field in the gap 119. In the inner yokes 110b and the outer yokes 112b, it circulates in the planes of sheets 111b, 113b of the inner yokes 110b and the outer yokes 112b. In this case, when the width (distance) of the gap 119 enlarges, the magnetic flux density decreases in the gap 119, and for this reason, the thrust of the linear compressor 100 decreases. Thus, the width of the gap 119 is preferable to be as small as possible.

In the case that a plate spring is employed as the resonance spring, if the inner yoke and the outer yoke are formed into a prismatic configuration as taken in the above-described embodiments as shown in FIG. 33 without being formed as the inner yoke 110a and the outer yoke 112a in this embodiment, since the plate spring 109 reciprocates simultaneously with the reciprocation of the piston 103, there is a need to enlarge the width 119 between the outer yoke 110 and the outer yoke 112 by a value corresponding to the rotation of the plate spring 109 in order to prevent the plate spring 109 from running into the inner yoke 110 and the outer yoke 112 when the axis of the plate spring 109 rotates.

For this reason, in this embodiment, the configurations of the inner yokes 110b and the outer yokes 112b are designed as mentioned above. With this configuration, even if the axis of the plate spring 109 rotates resulting from the fact that the plate spring 109 reciprocates concurrent with the reciprocation of the piston 103, the moving element 124 does not collide against the inner yokes 110b and the outer yokes 112b.

In addition, the gap widths between the inner yoke 110b and the permanent magnets 125, 126 and between the outer yoke 112b and the permanent magnets 125, 126 are further reducible averagely, and the influence of the drop of the magnetic flux density becomes little, and further, the fall of the thrust of the linear compressor 100 hardly occurs.

As described above, in the linear compressor 100 according to this embodiment, the inner yoke 110b is made such that a gap width between the inner yoke 110b and permanent magnets 125, 126 is constant in a range from a central position to one end position in piling-up directions of sheets 111b of the inner yoke 110b, but a gap width between the inner yoke 110b and the permanent magnets 125, 126 gradually enlarges from the central position toward the other end position in the sheets 111b piling-up directions, and further, the outer yoke 112b is made such that a gap width between the outer yoke 112b and the permanent magnets 125, 126 gradually enlarges from the central position toward one end position in piling-up directions of sheets 113b of the outer yoke 112b and a gap width between the outer yoke 112b and the permanent magnets 125, 126 is constant in a range from the central position to the other end position in the sheets 113b piling-up directions. With this configuration, even if the plate spring 109 rotates at the reciprocation of the piston 103, the moving element 124 does not collide against the inner yoke 110b and the outer yoke 112b, and the lowering of the magnetic flux density between the inner yoke 110b and the outer yoke 112b is suppressible, thus preventing the drop of the thrust of the linear compressor 100.

Thirty-Second Embodiment

Figure 35:
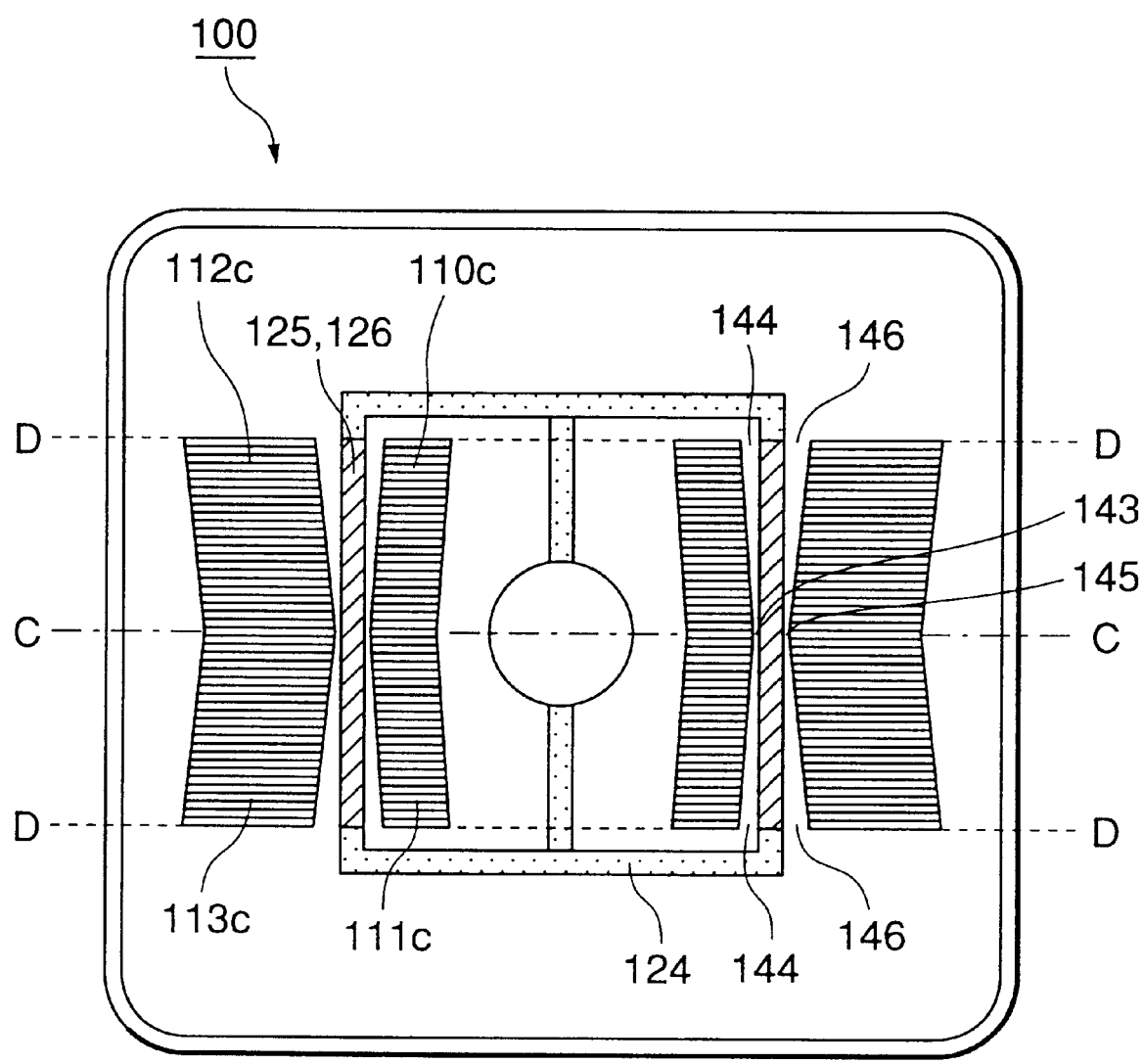
FIG. 35 is a plan cross-sectional view showing a linear compressor according to a thirty-second embodiment of this invention.

FIG. 35 is a plan cross-sectional view showing a linear compressor according to a thirty-second embodiment of this invention. The front-elevational cross-sectional view of this linear compressor is similar to that of FIG. 22.

This embodiment relates to the improvement of the configurations of inner yokes 110a and outer yokes 112a of the linear compressor 100 according to the thirtieth embodiment, and the other construction of the linear compressor 100 according to this embodiment is the same as that of the thirtieth embodiment, and hence, the description thereof will be omitted for simplicity.

In FIG. 35, each of inner yokes 110c is formed such that a gap width 144 between the inner yoke 110c and permanent magnets 125, 126 gradually increases from a central position C—C toward both end positions D—D in piling-up directions of sheets 111c of the inner yoke 110a, that is, enlarges gradually with respect to a gap width 143 between the inner yoke 110c and the permanent magnets 125, 126 at the central position C—C. That is, one surface of the inner yoke 110c facing an outer yoke 112c is formed to have a curved or convex configuration protruding toward the outer yoke 112c. In addition, the surface of the inner yoke 110c opposite to this curved surface is made to have a substantially identical curved or concave configuration parallel thereto. Thus, the inner yoke 110c is constructed by piling up a large number of sheets having the same configuration and dimension to provide the curved surface configuration as a whole.

Furthermore, each of outer yokes 112c is made such that a gap width 146 between the outer yoke 112c and the permanent magnets 125, 126 gradually widens from the central position C—C toward both the end positions D—D in piling-up directions of sheets 113c of the outer yoke 112c, that is, enlarges with respect to a gap width 145 between the outer yoke 112c and the permanent magnets 125, 126 at the central position C—C. That is, one surface of the outer yoke 112c facing the inner yoke 110c is formed to have a curved or convex configuration protruding toward the inner yoke 110c. In addition, the surface of the outer yoke 112c opposite to this curved surface is made to have a substantially identical curved or concave configuration. Thus, the outer yoke 112c is constructed by piling up a large number of sheets having the same configuration and dimension to provide the curved surface configuration as a whole.

For the manufacturing of each of the inner yoke 110c and the outer yoke 112c, a simple metal pattern is used for piling up a large number of sheets having the same shape and dimension. In fact, the divergence of the gap between the inner yoke 110c or the outer yoke 112c and the permanent magnets 125, 126 is slight, and hence there is no problem in winding the coil 123.

Accordingly, in addition to the effects of the above-described thirtieth embodiment, this embodiment facilitates the manufacturing of the inner yoke 110c and the outer yoke 112c.

As described above, in the linear compressor 100 according to this embodiment, each of inner yokes 110c is formed such that a gap width 144 between the inner yoke 110c and the permanent magnets 125, 126 gradually increases from a central position C—C toward both end positions D—D in piling-up directions of sheets 111c of the inner yoke 110a with respect to a gap width 143 between the inner yoke 110c and the permanent magnets 125, 126 at the central position C—C so that one surface of the inner yoke 110c facing an outer yoke 112c is formed to have a curved configuration protruding toward the outer yoke 112c, and the surface of the inner yoke 110c opposite to the curved surface is made to have a curved configuration substantially identical to the first-mentioned curved surface configuration of the inner yoke 110c to allow the inner yoke 110c to be constructed by piling up a large number of sheets having the same configuration and dimension to provide the curved surface configurations as a whole, and further, each of outer yokes 112c is made such that a gap width 146 between the outer yoke 112c and the permanent magnets 125, 126 gradually widens from the central position C—C toward both the end positions D—D in piling-up directions of sheets 113c of the outer yoke 112c with respect to a gap width 145 between the outer yoke 112c and the permanent magnets 125, 126 at the central position C—C so that one surface of the outer yoke 112c facing the inner yoke 110c is formed to have a curved configuration protruding toward the inner yoke 110c, and the surface of the outer yoke 112c opposite to this curved surface is made to have a curved configuration substantially identical to the first-mentioned curved surface configuration of the outer yoke 112c to allow the outer yoke 112c to be constructed by piling up a large number of sheets having the same configuration and dimension to provide the curved surface configurations as a whole. With this construction, even when the plate spring 109 rotates at the reciprocation of the piston 103, the moving element 124 does not collide against the inner yoke 110c and the outer yoke 112c, and further, it is possible to prevent the drop of the thrust of the linear compressor 100 because the lowering of the magnetic flux density in the gap between the inner yoke 110c and the outer yoke 112c is suppressible, and even, the manufacturing of the inner yoke 110c and the outer yoke 112c becomes easy.

Thirty-Third Embodiment

Figure 36:
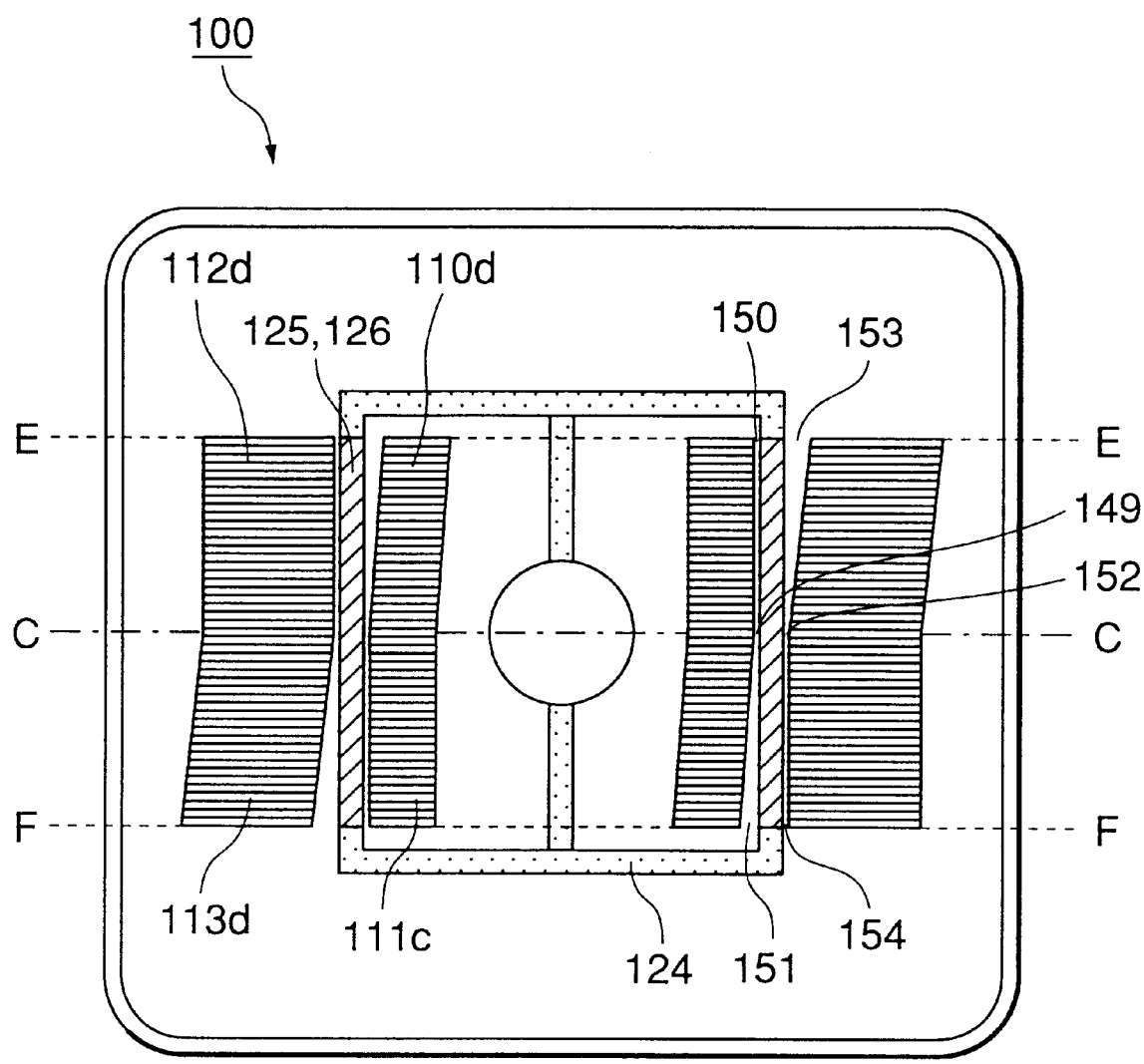
FIG. 36 is a plan cross-sectional view showing a linear compressor according to a thirty-third embodiment of this invention.
Figure 37:
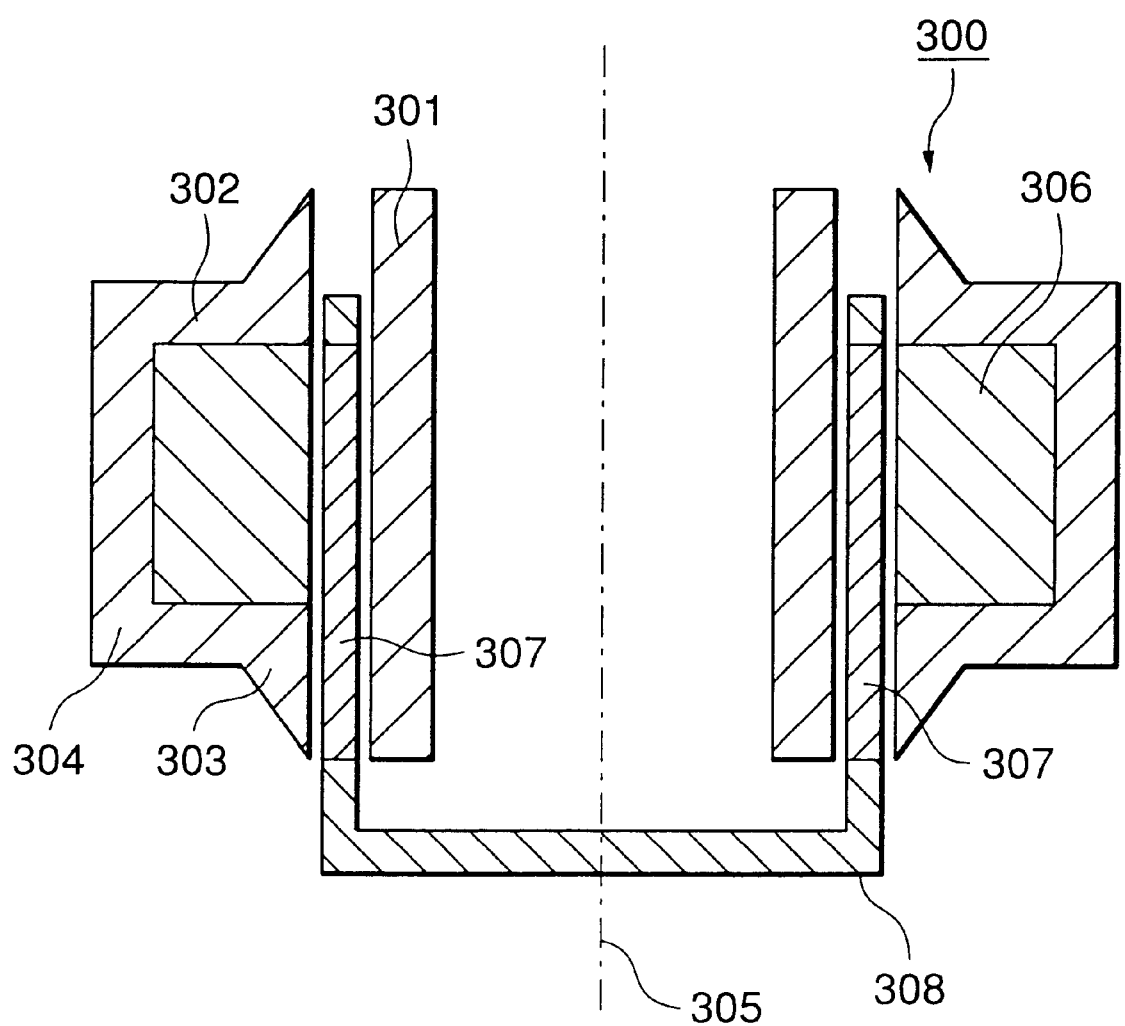
FIG. 37 is a cross-sectional view showing a conventional linear motor.
Figure 38:
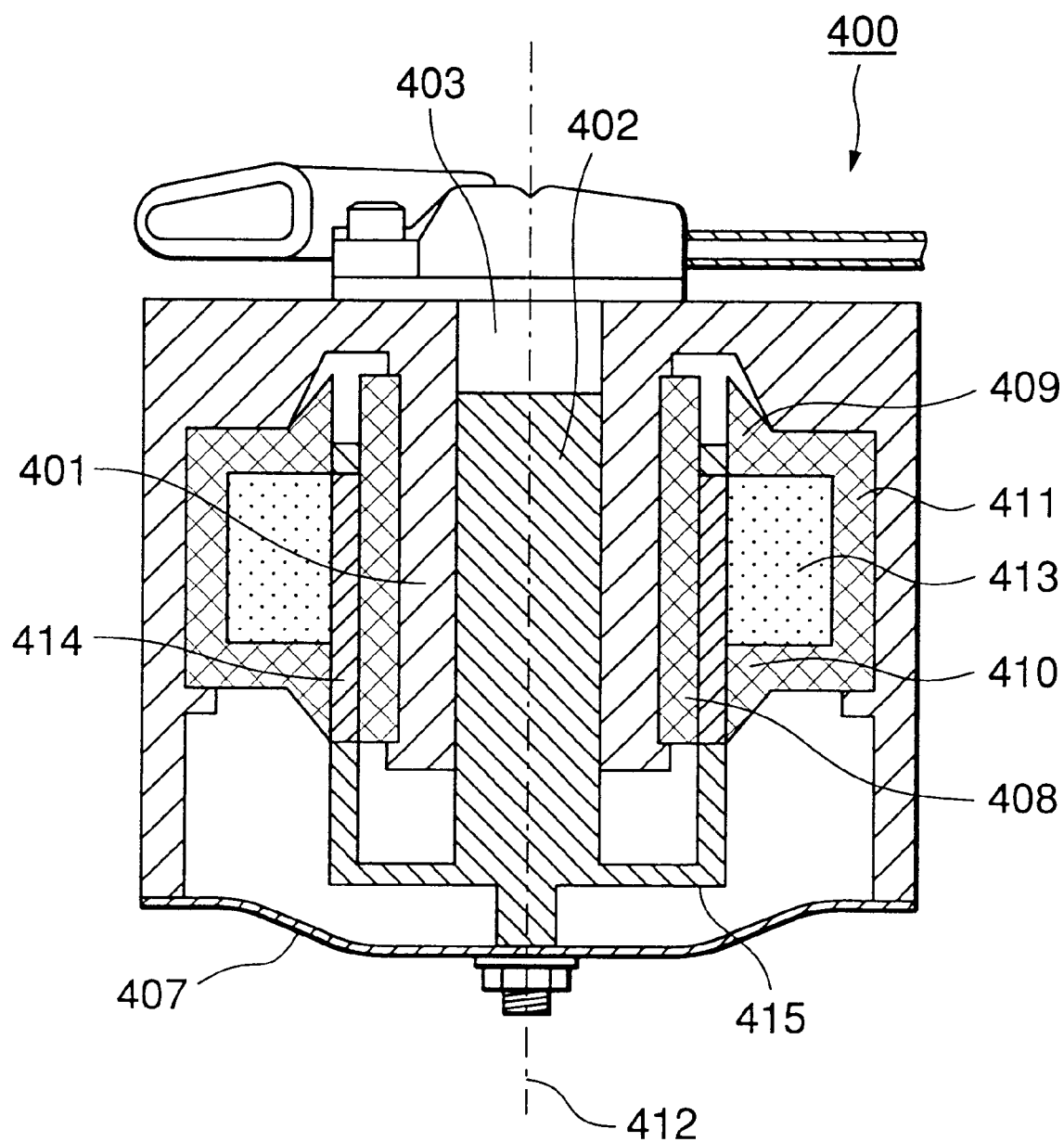
FIG. 38 is a cross-sectional view showing a construction of a conventional linear compressor.

FIG. 36 is a plan cross-sectional view showing a linear compressor according to a thirty-third embodiment of this invention. The front-elevational cross-sectional view of this linear compressor is similar to FIG. 22.

This embodiment relates to the improvement of the configurations of inner yokes 110b and outer yokes 112b of the linear compressor 100 according to the thirty-first embodiment, and the other construction of the linear compressor 100 according to this embodiment is the same as that of the thirty-first embodiment, and hence, the description thereof will be omitted for simplicity.

In FIG. 36, one of inner yokes 110d is made such that a gap width 149, 150 between the inner yoke 110b and permanent magnets 125, 126 is constant in a range from a central position C—C to one end position E—E in piling-up directions of sheets 111d of the inner yoke 110d, but a gap width 149, 151 between the inner yoke 110d and the permanent magnets 125, 126 gradually enlarges from the central position C—C toward the other end position F—F in the sheets lld piling-up directions. That is, one surface of the inner yoke 110d facing an outer yoke 112d is formed so that its portion from the central position C—C to the other end position F—F has a configuration inclined in a direction separated from the outer yoke 112d. In addition, the surface of the inner yoke 110d opposite to the one surface is made to have a substantially identical inclination parallel thereto. Thus, the inner yoke 110d is constructed by piling up a large number of sheets having the same configuration and dimension to provide the inclined surface configurations as a whole.

On the other hand, the other inner yoke 110d produces a gap width being constant in the range from the central position C—C to the other end position F—F and creates a gap width gradually enlarging from the central position C—C toward the one end position E—E. Likewise, the other inner yoke 110d is constructed by piling up a large number of sheets having the same configuration and dimension to the same inclined surface configurations as a whole.

Furthermore, one of outer yokes 112d is made such that a gap width 152, 153 between the outer yoke 112d and the permanent magnets 125, 126 gradually enlarges from the central position C—C toward the one end position E—E in piling-up directions of sheets 113d of the outer yoke 112b and a gap width 152, 154 between the outer yoke 112b and the permanent magnets 125, 126 is constant in a range from the central position C—C to the other end position F—F in the sheets 113b piling-up directions. That is, one surface of the outer yoke 112d facing the inner yoke 110d is formed so that its portion from the central position C—C to the one end position E—E has a configuration inclined in a direction separated from the inner yoke 110d. In addition, the surface of the outer yoke 112d opposite to the one surface is made to have a substantially identical inclination parallel thereto. Thus, the outer yoke 112d is constructed by piling up a large number of sheets having the same configuration and dimension to provide the inclined surface configurations as a whole.

Meanwhile, the other outer yoke 112d produces a gap width being constant in the range from the central position C—C to the one end position E—E and creates a gap width gradually enlarging from the central position C—C toward the other end position F—F. Likewise, the other outer yoke 112d is constructed by piling up a large number of sheets having the same configuration and dimension to the same inclined surface configurations as a whole.

For the manufacturing of each of the inner yoke 110d and the outer yoke 112d, a simple metal pattern is used for piling up a large number of sheets having the same shape and dimension. In fact, the divergence of the gap between the inner yoke 110d or the outer yoke 112d and the permanent magnets 125, 126 is slight, and hence there is no problem in winding the coil 123.

Accordingly, in addition to the effects of the above-described thirty-first embodiment, this embodiment facilitates the manufacturing of the inner yoke 110d and the outer yoke 112d.

As described above, in the linear compressor according to this embodiment, the inner yokes 110d is made such that a gap width 149, 150 between the inner yoke 110b and permanent magnets 125, 126 is constant in a range from a central position C—C to one end position E—E in piling-up directions of sheets 111d of the inner yoke 110d, but a gap width 149, 151 between the inner yoke 110d and the permanent magnets 125, 126 gradually enlarges from the central position C—C toward the other end position F—F in the sheets 111d piling-up directions so that one surface of the inner yoke 110d facing an outer yoke 112d is formed to include its portion having a configuration inclined in a direction separated from the outer yoke 112d in a range from the central position C—C to the other end position F—F, and the surface of the inner yoke 110d opposite to the one surface is made to have a substantially identical inclination parallel thereto to allow the inner yoke 110d to be constructed by piling up a large number of sheets having the same configuration and dimension to provide the inclined surface configurations as a whole, and the outer yokes 112d is made such that a gap width 152, 153 between the outer yoke 112d and the permanent magnets 125, 126 gradually enlarges from the central position C—C toward the one end position E—E in piling-up directions of sheets 113d of the outer yoke 112b and a gap width 152, 154 between the outer yoke 112b and the permanent magnets 125, 126 is constant in a range from the central position C—C to the other end position F—F in the sheets 113b piling-up directions so that one surface of the outer yoke 112d facing the inner yoke 110d is formed to include its portion having a configuration inclined in a direction separated from the inner yoke 110d in a range from the central position C—C to the one end position E—E, and the surface of the outer yoke 112d opposite to the one surface is made to have a substantially identical inclination parallel thereto to allow the outer yoke 112d to be constructed by piling up a large number of sheets having the same configuration and dimension to provide the inclined surface configurations as a whole. With this construction, even if the spring plate 109 rotates at the reciprocation of the piston 103, the moving element 124 does not run into the inner yoke 110d and the outer yoke 112d, and the drop of the magnetic flux density in the gap between the inner yoke 110d and the outer yoke 112d is suppressible to prevent the decrease in the thrust of the linear compressor 100, and further, the inner yoke 110*d* and the outer yoke 112*d* are more easily producible.

It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A linear motor comprising:
   a central axis;
   prismatic inner yokes each constructed in a manner that a number of sheets each having a generally rectangular configuration and having a high magnetic permeability are piled up each other; and
   outer yokes each constructed in a manner that a number of sheets each having a generally rectangular configuration and having a high magnetic permeability are piled up each other, with each of coils being wound around a central portion of three magnetic pole portions of said outer yoke to alternately establish different magnetic poles along a direction of said central axis, wherein a surface of said outer yoke, which has said three magnetic pole portions, is disposed in an opposed relation to the corresponding inner yoke to define a predetermined gap therebetween so that said inner yoke and said outer yoke form each of a plurality of yoke blocks, and said plurality of yoke blocks are placed around said central axis to form a polygonal configuration so that the sheet piling-up direction is perpendicular to a diametrical direction of a shaft including said central axis, and a moving element having a pair of flat-plate-like permanent magnets magnetized radially so that their magnetizing directions are opposite to each other and located between said inner yoke and said outer yoke in a state of being arranged at a predetermined interval along a direction of said central axis is placed to be movable alone a direction of the central axis.

2. A linear motor as defined in claim 1, wherein each of said pair of flat-plate-like permanent magnets is disposed to always cross magnetic poles due to two of said three magnetic pole portions of said outer yoke at the same time.

3. A linear motor as defined in claim 1, further comprising:
   a flat-plate-like base for holding said yoke blocks in a state where inner yoke sides of said yoke blocks are disposed in an opposed relation to each other to define a predetermined interval therebetween; and
   a bearing fitted to said base to be between said inner yokes,
   wherein said shaft is constructed integrally with said moving element and inserted into said bearing.

4. A linear motor as defined in claim 1, wherein each of said outer yokes is composed of three divided blocks corresponding to said three magnetic pole portions of said outer yoke, and after said coil is fitted over said central magnetic pole portion thereof, said three blocks are unified with each other.

5. A linear motor as defined in claim 3, wherein said base for holding said yoke blocks is made of a non-magnetic material.

6. A linear motor as defined in claim 3, wherein said base for holding said yoke blocks is made of a non-magnetic material having a high specific resistance.

7. A linear motor as defined in claim 3, wherein a projecting portion having a width equal to a width of said predetermined gap between said inner yoke and said outer yoke is formed on said base, and said inner yoke and said outer yoke are fixed to said base by being pressed against said base in a state where said projecting portion is put in said predetermined gap.

8. A linear motor as defined in claim 1, wherein said moving element is made of a non-magnetic material.

9. A linear motor as defined in claim 1, wherein said moving element is made of a non-magnetic material showing a high specific resistance.

10. A linear motor as defined in claim 1, wherein said moving element includes:
    a pair of rectangular moving section bases;
    a plurality of supporting columns for supporting said moving section bases to form said moving element into a generally cubic configuration;
    pairs of permanent magnets, each pair being put between said pair of moving section bases in two sides of said generally cubic configuration, which are in an opposed relation to each other, with a spacer being provided between said pair of permanent magnets to establish a predetermined interval therebetween; and
    a supporting section for making a connection of said moving section and said shaft in a space between said inner yokes.

11. A linear motor as defined in claim 10, wherein said moving section bases and said spacer are made of a non-magnetic material exhibiting a high specific resistance, and said supporting section is made of a non-magnetic material.

12. A linear motor comprising:
    prismatic inner yokes each formed by piling up a number of sheets each having a generally rectangular configuration and having a high magnetic permeability;
    outer yokes each formed by piling up a number of sheets each having a generally rectangular configuration and having a high magnetic permeability, each of said outer yokes having first and second slots formed by cutting in a piling-up direction of said sheets to establish first magnetic pole portion, a second magnetic pole portion and a third magnetic pole portion, with a surface of said outer yoke, holding said magnetic pole portions, being placed in an opposed relation to said inner yoke to define a predetermined gap therebetween to constitute each of a set of yoke blocks so that a magnetic path is established along surfaces of said sheets;
    coils each wound around said second magnetic pole portion for alternately establishing different magnetic poles in said first magnetic pole portion, said second magnetic pole portion and said third magnetic pole portion,
    a flat-plate-like base for holding said set of yoke blocks in a state where their inner yoke sides are placed in an opposed relation to each other to define a predetermined space;
    a bearing fitted to said base to be positioned between said inner yokes;
    a moving element including pairs of first and second lat-plate-like permanent magnets magnetized in directions of opposing of said inner yokes and said outer yokes and each placed within said gap in a state of being arranged at a predetermined interval along an axial direction of said bearing so that their magnetizing directions are opposite to each other, where, when said moving element shifts along said axial direction, said first flat-plate-like permanent magnet always crosses said first magnetic pole portion and said second magnetic pole portion while said second flat-plate-like permanent magnet always crosses said second magnetic pole and said third magnetic pole portion; and a shaft fitted integrally to said moving element and inserted into said bearing.

13. A linear motor as defined in claim 12, wherein holes are made in said first and third magnetic pole portions of said outer yoke in piling-up directions of said sheets of said outer yoke, and said outer yoke is fixedly secured to said base in a manner that bar-like members are inserted into said holes.

14. A linear motor as defined in claim 12, wherein through-holes are made in said first and third magnetic pole portions of said outer yoke in piling-up directions of said sheets of said outer yoke, and said outer yoke is fixedly secured to said base in a manner that penetrating bars are inserted into said through-holes.

15. A linear motor as defined in claim 12, wherein said base has holes at its portions coming into contact with said outer yoke and said inner yoke, respectively.

16. A linear motor as defined in claim 12, wherein said outer yoke is composed of a first magnetic pole block constituting a first magnetic pole side wall surface of said first slot, a second magnetic pole block constituting a second magnetic pole side wall surface and inner yoke opposing wall surface of said first slot and a second magnetic pole side wall surface and inner yoke opposing wall surface of said second slot, and a third magnetic pole organizing a third magnetic pole side wall surface of said second slot, with said three blocks being unified after said coil is wound around said second magnetic pole block.

17. A linear motor as defined in claim 12, wherein said outer yoke made up of a side yoke block constituting a first magnetic pole side wall surface and inner yoke opposing surface of said first slot and a third magnetic pole side wall surface and inner yoke opposing wall surface of said second slot, and a center yoke block organizing a second magnetic pole side wall surface of said first slot and a second magnetic pole side wall surface of said second slot, with said two blocks being unified after said coil is fitted over said center yoke block.

18. A linear motor as defined in claim 12, wherein said moving element is configured with a frame having a hexahedral shape, and is constructed such that said first and second flat-plate permanent magnets are disposed at said predetermined interval in said axial direction in each of two sides of said frame to be put between said inner yoke and said outer yoke, with said moving element and said shaft being connected through supporting sections to each other within a space between said inner yokes.

19. A linear motor as defined in claim 12, wherein said moving element is composed of a pair of moving permanent magnet sections each comprising said first and second flat-plate-like permanent magnets surrounded by a rectangular moving section base and disposed at said predetermined interval in a state where a spacer is interposed therebetween, and a plurality of supporting columns for supporting said pair of moving permanent magnet sections to form a generally cubic frame configuration for said moving element, with said moving element and said shaft being connected through supporting sections to each other in a space between said inner yokes.

20. A linear motor as defined in claim 19, wherein each of said moving permanent magnet sections is made up of a rectangular frame comprising a U-shaped frame having a groove on its inner side and a bar-like presser, said first and second flat-plate-like permanent magnets made to be inserted into said rectangular frame, and said spacer positioned between said first and second flat-plate-like permanent magnets, said first and second flat-plate-like permanent magnets having projections to be fitted in said groove, and said spacer having projections to be fitted in said groove.

21. A linear motor comprising:

prismatic inner yokes each formed by piling up a number of sheets each having a generally rectangular configuration and having a high magnetic permeability;

outer yokes each formed by piling up a number of sheets each having a generally rectangular configuration and having a high magnetic permeability, each of said outer yokes including a plurality of slots formed by cutting said outer yoke in a sheets piling-up direction to establish a plurality of magnetic pole portions;

coils respectively wound around all said magnetic pole portions other than said magnetic pole portions positioned at both ends of said outer yoke and made to alternately establish different magnetic poles in the adjacent magnetic pole portions;

a set of yoke blocks each composed of said inner yoke, said outer yoke and said coils and each made such that a surface of said outer yoke, holding said magnetic pole portions, is placed at a predetermined gap in an opposed relation to said inner yoke to allow formation of a magnetic path along surfaces of said sheets;

a flat-plate-like base for holding said set of yoke blocks in a state where their inner yoke sides are located in an opposed relation to each other to define a predetermined space;

a bearing fitted to said base to be between said inner yokes of said set of yoke blocks;

a moving element in which each of sets of flat-plate-like permanent magnets equal in number to said slots and magnetized in directions of facing of said inner yoke and said outer yoke are placed within a gap between said inner yoke and said outer yoke in a state of being arranged at a predetermined interval along an axial direction of said bearing so that their magnetizing directions are opposite to each other, where, when said moving element shifts along said axial direction, each of said flat-plate-like permanent magnets always crosses said adjacent magnetic pole portions of said outer yoke at the same time; and a shaft fitted integrally to said moving element and inserted into said bearing.

22. A linear motor according to this embodiment comprising:

prismatic inner yokes each formed by piling up a number of sheets each having a generally rectangular configuration and having a high magnetic permeability;

outer yokes each formed by piling up a number of sheets each having a generally rectangular configuration and having a high magnetic permeability, where a plurality of slots are formed by cutting the outer yoke in sheets piling-up direction to establish a plurality of magnetic pole portions;

coils respectively wound around all the even-number magnetic pole portions of said plurality of magnetic pole portions and made to alternately establish different magnetic poles in the adjacent magnetic pole portions;

a set of yoke blocks each including said inner yoke, said outer yoke and said coils and each made such that a surface of the outer yoke, holding said plurality of magnetic pole portions, is placed at a predetermined gap in an opposed relation to said inner yoke to allow formation of a magnetic path along surfaces of said sheets;

a flat-plate-like base for holding said set of yoke blocks in a state where their inner yoke sides are located in an opposed relation to each other to define a predetermined space;

a bearing fitted to said base to be between said inner yokes of said set of yoke blocks a moving element in which each of sets of flat-plate-like permanent magnets equal in number to said slots and magnetized in directions of facing of said inner yoke and said outer yoke are placed within a gap between said inner yoke and said outer yoke in a state of being arranged at a predetermined interval along an axial direction of said bearing so that their magnetizing directions are opposite to each other, where, when said moving element shifts along said axial direction, each of said flat-plate-like permanent magnets always crosses the adjacent magnetic pole portions of said outer yoke at the same time; and a shaft fitted integrally to said moving element and inserted into said bearing.

23. A linear compressor comprising:

prismatic inner yokes each formed by piling up a large number of sheets each having a high magnetic permeability;

outer yokes formed by piling up a large number of sheets each having a high magnetic permeability, where two slots are made in sheets piling-up directions to establish three magnetic pole portions therein;

coils each wound around the central magnetic pole portion of said three magnetic pole portions of said outer yoke for alternately establishing different magnetic poles in said three magnetic pole portions;

a set of yoke blocks each including said inner yoke and said outer yoke and made such that a surface of said outer yoke, carrying said magnetic pole portions, is placed in an opposed relation to said inner yoke to define a predetermined gap therebetween;

a flat-plate-like base for holding the yoke blocks so that their inner yoke sides are in an opposed relation to each other to produce a predetermined space therebetween;

a cylinder attached to said base to be positioned between said inner yokes;

a moving element including pairs of flat-plate-like permanent magnets magnetized in opposing directions of said inner yokes and said outer yokes and located within said gaps between said inner yokes and said outer yokes in a state of being disposed to define a predetermined interval therebetween so that their magnetization directions are opposite to each other;

a piston placed on a tip portion of a shaft constructed integrally with said moving element and inserted into said cylinder; and a spring connected to said shaft.

24. A linear compressor as defined in claim 23, wherein said moving element is formed into a generally hexahedral configuration, and each of said pairs of flat-plate-like permanent magnets are placed in each of two sides of said generally hexahedral configuration interposed between said inner yoke and said outer yoke in a state of being disposed at said predetermined interval along an axial direction of said piston, and a moving element support is provided which makes a connection between said moving element and said shaft on a side opposite to said piston.

25. A linear compressor as defined in claim 23, wherein said moving element is formed into a generally hexahedral configuration, and each of said pairs of flat-plate-like permanent magnets are placed in each of two sides of said generally hexahedral configuration interposed between said inner yoke and said outer yoke in a state of being disposed at said predetermined interval along an axial direction of said piston, and a moving element support is provided in a space between said inner yokes for making a connection between said moving element and said shaft.

26. A linear compressor as defined in claim 23, wherein said inner yokes and said outer yokes are made not to come into contact with other than said base.

27. A linear compressor as defined in claim 25, wherein said cylinder has a slit made axially to prevent said moving element support from coming into said cylinder when said moving element reciprocates.

28. A linear compressor as defined in claim 25, wherein said piston is composed of a first sliding section formed at its tip portion, a non-sliding section following said first sliding section and having a smaller diameter, and a second sliding section following said non-sliding section, and said moving element support for connecting said moving element to said piston is placed on said non-sliding section.

29. A linear compressor as defined in claim 24, wherein a reinforcement for making a connection between said moving element and said shaft is additionally provided on a side of said generally hexahedral configuration other than said two sides put between said inner yokes and said outer yokes.

30. A linear compressor as defined in claim 26, wherein said inner yoke is constructed such that a gap width between said inner yoke and said permanent magnets gradually widens from a substantially central position toward both end positions in piling-up directions of said sheets of said inner yoke with respect to a gap width between said inner yoke and said permanent magnets at said substantially central position, and said outer yoke is constructed such that a gap width between said outer yoke and said permanent magnets gradually widens from said substantially central position toward both said end positions in piling-up directions of said sheets of said outer yoke with respect to a gap width between said outer yoke and said permanent magnets at said substantially central position.

31. A linear compressor as defined in claim 26, wherein said inner yoke is made such that a gap width between said inner yoke and said permanent magnets is constant in a range from a central position to one end position in piling-up directions of sheets of said inner yoke, but a gap width between said inner yoke and said permanent magnets gradually enlarges from said central position toward the other end position in said sheets piling-up directions, and further, said outer yoke is made such that a gap width between said outer yoke and said permanent magnets gradually enlarges from a central position toward one end position in piling-up directions of sheets of said outer yoke and a gap width between said outer yoke and said permanent magnets is constant in a range from said central position to the other end position in said sheets piling-up directions.

32. A linear compressor as defined in claim 26, wherein each of said inner yokes is formed such that a gap width between said inner yoke and said permanent magnets gradually increases from a central position toward both end positions in piling-up directions of said sheets of said inner yoke with respect to a gap width between said inner yoke and said permanent magnets at said central position so that one surface of said inner yoke facing said outer yoke is formed to have a curved configuration protruding toward said outer yoke, and a surface of said inner yoke opposite to said curved surface is made to have a curved configuration substantially identical to the first-mentioned curved surface configuration of said inner yoke to allow said inner yoke to be constructed by piling up a large number of sheets having the same configuration and dimension to provide the curved surface configurations as a whole, and further, each of said outer yokes is made such that a gap width between said outer yoke and said permanent magnets gradually widens from said central position toward both said end positions in piling-up directions of sheets of said outer yoke with respect to a gap width between said outer yoke and said permanent magnets at said central position so that one surface of said outer yoke facing said inner yoke is formed to have a curved configuration protruding toward the inner yoke, and a surface of said outer yoke opposite to said curved surface is made to have a curved configuration substantially identical to the first-mentioned curved surface configuration of said outer yoke to allow said outer yoke to be constructed by piling up a large number of sheets having the same configuration and dimension to provide said curved surface configurations as a whole.

33. A linear compressor as defined in claim 26, wherein said inner yoke is made such that a gap width between said inner yoke and said permanent magnets is constant in a range from a central position to one end position in piling-up directions of said sheets of said inner yoke, but a gap width between said inner yoke and said permanent magnets gradually enlarges from said central position toward the other end position in said sheets piling-up directions so that one surface of said inner yoke facing said outer yoke is formed to include its portion having a configuration inclined in a direction separated from said outer yoke in a range from said central position to the other end position, and a surface of said inner yoke opposite to said one surface is made to have a substantially identical inclination parallel thereto to allow said inner yoke to be constructed by piling up a large number of sheets having the same configuration and dimension to provide the inclined surface configurations as a whole, and further, said outer yoke is made such that a gap width between said outer yoke and said permanent magnets gradually enlarges from said central position toward the one end position in piling-up directions of sheets of said outer yoke and a gap width between said outer yoke and said permanent magnets is constant in a range from said central position to the other end position in said sheets piling-up directions so that one surface of said outer yoke facing said inner yoke is formed to include its portion having a configuration inclined in a direction separated from said inner yoke in a range from said central position to the one end position, and a surface of said outer yoke opposite to the one surface of said outer yoke is made to have a substantially identical inclination parallel thereto to allow said outer yoke to be constructed by piling up a large number of sheets having the same configuration and dimension to provide the inclined surface configurations as a whole.

* * * * *